US006724811B2

(12) United States Patent
Kohli et al.

(10) Patent No.: US 6,724,811 B2
(45) Date of Patent: *Apr. 20, 2004

(54) PSEUDO-NOISE CORRELATOR FOR GPS SPREAD-SPECTRUM RECEIVER

(75) Inventors: Sanjai Kohli, Manhattan Beach, CA (US); Steven Chen, Cerritos, CA (US); Charles R. Cahn, Manhattan Beach, CA (US); Mangesh Chansarkar, Santa Clara, CA (US); Greg Turetsky, San Jose, CA (US)

(73) Assignee: SiRF Technology, Inc., San Jose, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 10/099,497

(22) Filed: Mar. 13, 2002

(65) Prior Publication Data

US 2002/0146065 A1 Oct. 10, 2002

Related U.S. Application Data

(63) Continuation of application No. 09/655,633, filed on Sep. 5, 2000, now Pat. No. 6,400,753, which is a division of application No. 08/846,067, filed on Apr. 25, 1997, now Pat. No. 6,393,046, which is a continuation-in-part of application No. 08/637,457, filed on Apr. 25, 1996, now abandoned, and a continuation-in-part of application No. 08/638,021, filed on Apr. 25, 1996, now Pat. No. 5,901,171, and a continuation-in-part of application No. 08/637,537, filed on Apr. 25, 1996, now Pat. No. 6,041,280, and a continuation-in-part of application No. 08/638,882, filed on Apr. 25, 1996, now Pat. No. 5,897,605.
(60) Provisional application No. 60/042,868, filed on Mar. 28, 1997.

(51) Int. Cl.[7] .................................................. H04B 1/69
(52) U.S. Cl. ..................... 375/150; 375/130; 375/134; 375/137; 375/140; 375/142

(58) Field of Search ................................. 375/130, 134, 375/140, 142, 147, 148, 150; 701/201; 702/343, 149; 342/352, 357.12

(56) References Cited

U.S. PATENT DOCUMENTS 4,426,712 A    1/1984   Gorski-Popiel (List continued on next page.)

FOREIGN PATENT DOCUMENTS

EP    0 462 648 A2    11/1991
EP    0 501 829 A1    2/1992

OTHER PUBLICATIONS

Andreas Polydoros et al., *Code Synchronization: A Review of Principles and Techniques,* Electrical Engineering Dept., University of Southern California, Los Angeles, CA, USA.

*Primary Examiner*—Shuwang Liu
(74) *Attorney, Agent, or Firm*—Shemwell Gregory & Courtney LLP

(57) ABSTRACT

A terrestrial C/A code GPS receiver system digitally samples, filters and stores a segment of 11 half chips of the received composite as a binary number and multiplexes this number for parallel correlation with each of a series of multibit code replicas for the satellites to be tracked. Each of the time delay specific correlation products are accumulated in a cell of a memory matrix so that at least twenty two delays for each satellite may be evaluated each code period providing fast reacquisition, even within a city intersection, as well as correction of multipath tracking and multipath interference. All cells of the memory matrix may be used for an acquisition of a single satellite in about 4 ms. Two satellite tracking, in addition to altitude hold, uses cross track hold alternating with clock hold to update the cross track estimate. Single satellite tracking uses cross track and clock hold together. Navigation data is updated with detected changes in motion including turns.

19 Claims, 24 Drawing Sheets

U.S. PATENT DOCUMENTS

| | | |
|---|---|---|
| 4,731,613 A | 3/1988 | Endo et al. |
| 5,245,628 A * | 9/1993 | LaPadula, III et al. ..... 375/148 |
| 5,414,729 A * | 5/1995 | Fenton ....................... 575/149 |
| 5,452,211 A | 9/1995 | Kyrtsos et al. |
| 5,579,014 A * | 11/1996 | Brooksby et al. ...... 342/357.12 |
| 6,400,753 B1 * | 6/2002 | Kohli et al. ................. 375/134 |

* cited by examiner

FIG. 13
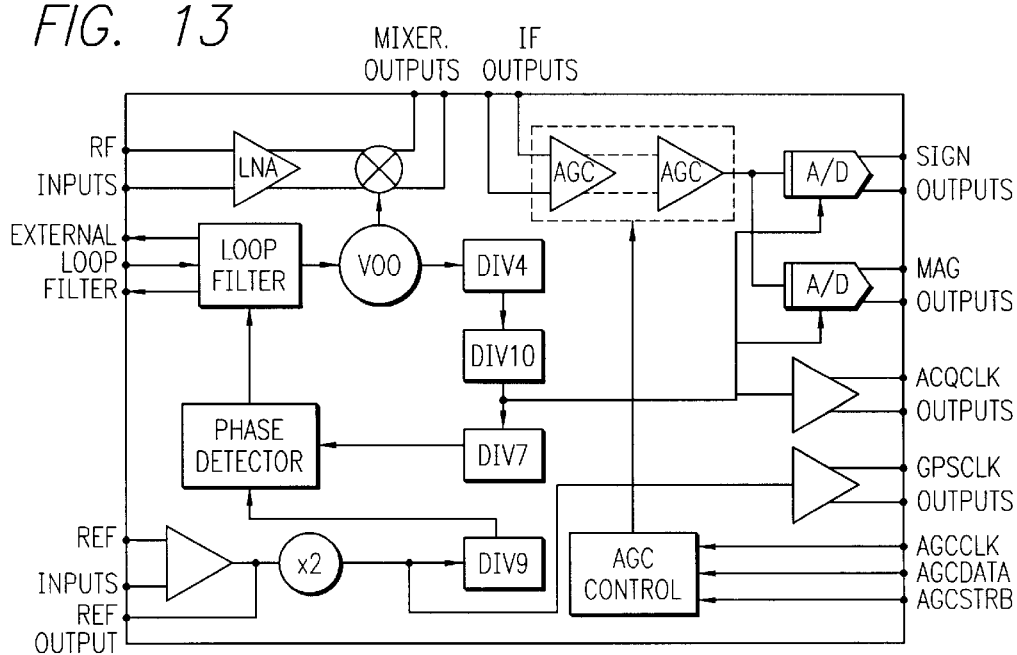
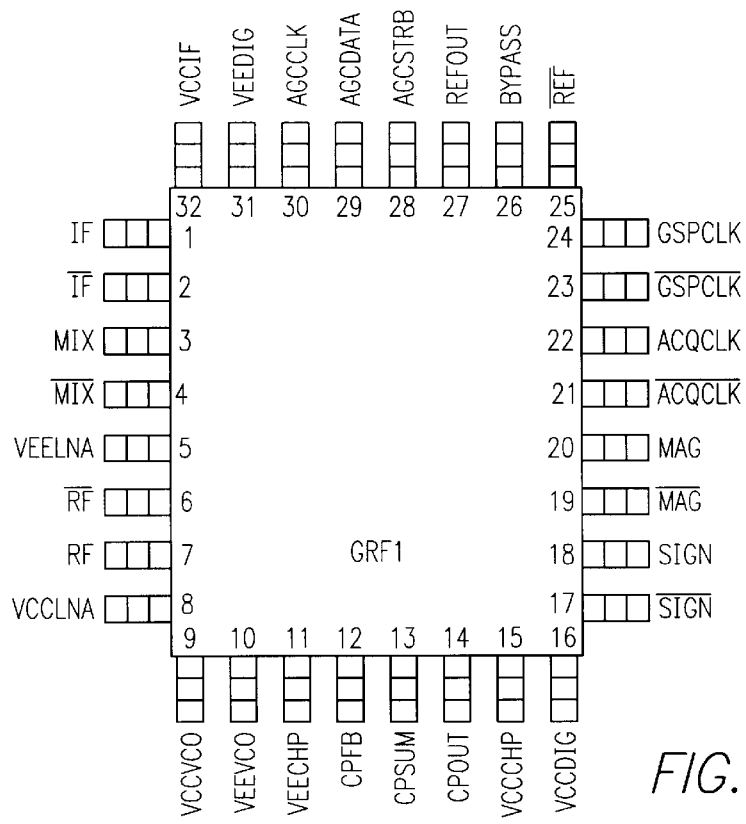
FIG. 14

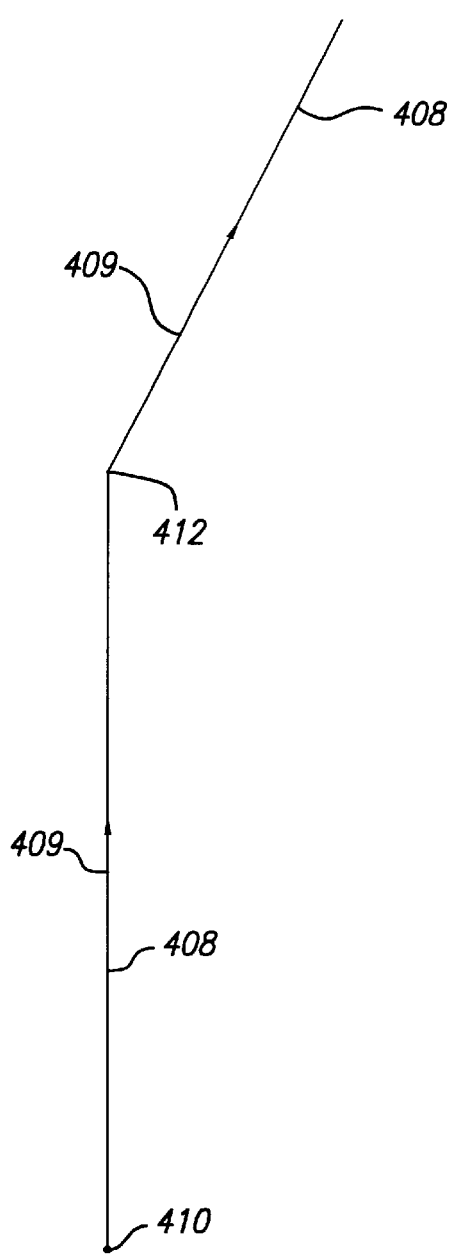
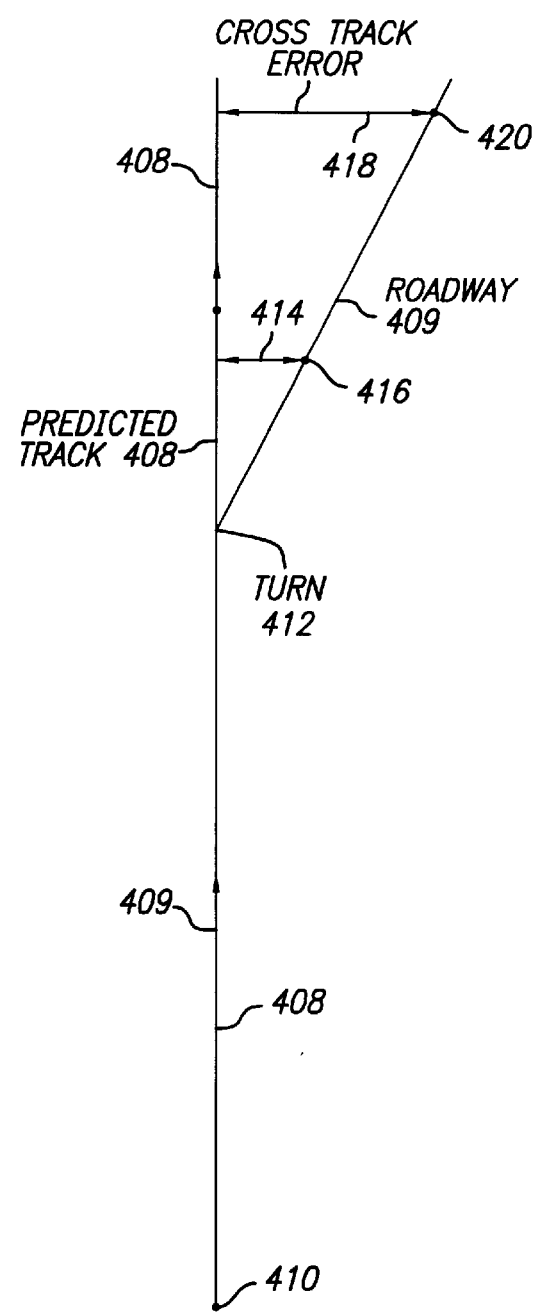
FIG. 25A
FIG. 25B

PSEUDO-NOISE CORRELATOR FOR GPS SPREAD-SPECTRUM RECEIVER

RELATED APPLICATIONS

This application is a continuation of Ser. No. 09/655,633, filed Sep. 5, 2000, now U.S. Pat. No. 6,400,753, which is a divisional of Ser. No. 08/846,067, filed Apr. 25, 1997, now U.S. Pat. No. 6,393,046, which is a continuation-in-part of Ser. Nos. 08/637,457, abandoned; 08/638,021, now U.S. Pat. No. 5,901,171; 08/637,537, now U.S. Pat. No. 6,041,280, and 08/638,882, U.S. Pat. No. 5,897,605, all filed Apr. 25, 1996, now U.S. Pat. No. 5,897,605 and claims the priority of provisional patent application No. 60/042,868 filed Mar. 28, 1997.

BACKGROUND OF THE INVENTION

1. Field of the Invention

This invention relates in general to spread spectrum receivers and in particular to GPS navigation systems such as those used in terrestrial navigation for cars, trucks and other land vehicles.

2. Description of the Related Art

Car navigation is conventionally performed using highway and street maps aided, to some degree, by distance measurements from external sensors such as odometers. Improvements over the last 10 years in Global Positioning System, or GPS, satellite navigation receivers has spawned several GPS car navigation systems.

Conventional GPS car navigation systems use the last known position of the vehicle, and the destination data, to compute a route data base, including route and turning data derived from a pre-existing map data base. GPS receivers are conventionally operated with a minimum of 3 or 4 satellites distributed across the visible sky in order to determine, or at least estimate, the four necessary unknowns including $x_{user}$, $y_{user}$ and $z_{user}$ which provide three orthogonal coordinates to locate the user as well as $t_{user}$ which provides the required satellite time. Techniques such as time or clock hold and altitude hold, in which the unknown time or altitude is assumed to remain predictable from a previously determined value, e.g., $z_{est}$ and/or $t_{est}$, have permitted operation of GPS receivers with less than four satellites in view. In particular, terrestrial GPS receivers have been operated with as few as two satellites to provide a two dimensional position solution using both clock and altitude hold.

Because continuous reception from four GPS satellites is often difficult to maintain in a car navigation environment, and known clock and altitude hold techniques can only permit operation with at least two satellites, known conventional car navigation systems have typically augmented the GPS position information with information from external sensors to provide dead reckoning information. The dead reckoning information is often provided by an inertial navigation system such as a gyroscope.

Augmenting GPS data with inertial navigation data has permitted the use of GPS car navigation even when less than 4 satellites are visible, such as in tunnels and in urban situations between tall buildings. However, the resultant increased complexity and costs for such combined systems have limited their acceptance.

Conventional GPS receivers use separate tracking channels for each satellite being tracked. Each tracking channel may be configured from separate hardware components, or by time division multiplexing of the hardware of a single tracking channel, for use with a plurality of satellites. In each tracking channel, the received signals are separately Doppler shifted to compensate for the relative motion of each satellite and then correlated with a locally generated, satellite specific code.

During a mode conventionally called satellite signal acquisition, delayed versions of the locally generated code for the satellite being acquired are correlated with the Doppler rotated received signals to synchronize the locally generated code with the code, as received for that satellite, by determining which delay most accurately correlates with the code being received. Once synchronization has been achieved for a particular satellite, that satellite channel progresses to a tracking mode in which the Doppler rotated, received signal is continuously correlated with the locally generated code for that satellite to determine position information including pseudorange information. During tracking, conventional receivers also correlate the Doppler shifted received signal with one or more versions of the locally generated code at different relative delays, such as one half C/A code chip width early and late relative to the synchronized or prompt version of the code. These early and late correlations are used to accurately maintain the synchronization of prompt correlation.

When, after tracking has begun for a particular satellite, the satellite signal has been lost so that the required timing of the locally generated code for synchronization is no longer accurately known, conventional receivers reenter the acquisition mode, or a limited version of this mode, to reacquire the satellite signals by multiple correlations to resynchronize the locally generated code with the code as received. Once the locally generated code has been resynchronized with the signals as received, position information data is again derived from the signals from that satellite.

GPS systems, as well as many other radio frequency (RF) communication systems utilizing frequencies high enough to be considered line of sight systems in which there must be a substantially direct line of sight between the transmitter(s) and receivers(s) for optimum operation, often suffer from multipath effects in which the receiver(s) must process signals received over a multiplicity of different paths. A common example is a simple broadcast TV system in which a TV receiver with an antenna receives multiple copies of the signal being transmitted.

The multiplicity of signals being received results from additional, typically unwanted, signals paths including one or more reflections. When the signal path from the transmitter to receiver includes a reflection, this signal path must by definition be longer than the direct path. Multipath signals present a problem in systems, such as GPS systems, in which the time of arrival of the signal is to be measured or used because the time of arrival of the multipath signals depends on the length of the path(s) taken.

The straightforward processing of all signals, including multipath or reflected signals, often degrades the processing performed by the receiver. In the simple broadcast TV transmission system described above, the processing of unmodified multipath signals by the receiver results in the commonly experienced degradation called "ghosting" in which multiple signals are displayed offset in the TV image. The multiplicity of displayed offset video signals results from the difference in path lengths of the various multipath signals received.

The direct path is the shortest and therefore requires the least travel time from transmitter to receiver while the various unwanted multipath signals have various greater lengths, and therefore various longer travel times, than the direct path signals. Signals are processed in part in a TV receiver in accordance with their time of arrival and therefore the resultant video display may include a plurality of images slightly displaced in space on the TV monitor in accordance with their different path lengths.

Many conventional partial solutions to the problems of multipath reception exist. In the TV broadcast example, a highly direction antenna is often used for the receiver to reduce the number of multipath signals processed by the receiver. In addition, various discrimination techniques have been developed which use the knowledge that the amplitude of the direct path signal is typically substantially greater than that of the unwanted multipath signals because signal amplitude is degraded by the square of the path length.

In other types of systems, such as the GPS systems using PRN encoded spread spectrum signals, certain conventional techniques are difficult or impossible to use. For example, GPS transmitters are positioned on satellites with complex orbital paths so that the position of the multiple transmitters are constantly changing. This makes a highly directional antenna system almost completely unusable. Similarly, digital receivers, including those used in a GPS receiver, often do not rely solely on the amplitudes of the signals received, but rather rely on other signal characteristics, such as time of arrival.

Multipath processing techniques currently used for complex receivers, such as GPS receivers, are often quite complex and subject to inaccuracies. An example of one such conventional technique is described in U.S. Pat. No. 5,414,729 issued on May 9, 1995 to Patrick Fenton and assigned as issued to NovAtel Communications Ltd., Canada. In this technique, an autocorrelation function of a partially processed received signal, including multipath components, is compared to an estimated autocorrelation function of an estimated direct path signal to attempt to discern direct path signals from multipath signals for further processing. This technique of comparing processed and estimated correlation power, is complex and may be subject to error in that the partially processed signals relied on are themselves subject to degradation from many effects in addition to multipath effects including receiver limitations, which may reduce the accuracy or effectiveness of the multipath processing techniques.

For example, in tracking a GPS C/A signal to determine position information from GPS satellite transmitters, it is typically important to derive an accurate estimate of the time of arrival, known as code phase, of the PRN modulation of the direct path component of the C/A signals received from each of the various GPS satellites. It is also important to derive an accurate estimate of the phase of the underlying carrier signals transmitted from the satellites on which the modulation is applied, known as the carrier phase. However, as apparently shown for example in FIGS. 6, 7 and 8 of the above referenced Fenton patent, the delayed multipath components degrade the tracking of the code and carrier phase estimates by distorting the correlation functions used is such tracking.

What is needed is an improved spread spectrum receiver, such as one for use with GPS navigation systems, which avoids the limitations of conventional designs and provides improved results in a wide range of reception conditions, including multipath interference.

SUMMARY OF THE INVENTION

In one aspect, the present invention provides an improved terrestrial navigation system using a GPS receiver which can continue to navigate with continuous GPS data from less than the 3 or 4 GPS satellites commonly required. The GPS data is augmented with data from another source. The source of the augmentation data may include data from external sensors, data bases including map data bases, and/or knowledge of the physical environment within which the vehicle is to be navigated. The use of such augmentation data permits GPS satellite navigation solutions for stand-alone GPS systems as well as for GPS systems integrated with external sensors and/or map databases with less than 3 or 4 continuously visible GPS satellites.

In other aspect, the present invention provides a GPS system which uses a digital ASIC and RF chipset and a relatively wide IF band. A simple, 2-pole LC IF filter is associated with the RF chip while a decimator or digital filter associated with the digital chip to run the system at a reduced clock rate. The simple 2-pole filter is used in lieu of the more complex and expensive 5 or 6 pole filter that would otherwise, be used in a conventional receiver system of this type.

In another aspect, the present invention provides a GPS receiver in which map data used to determine routing is also used as a source of data augmentation for a single satellite solution by providing direction of travel information.

In still another aspect, the present invention provides a method of augmenting GPS data using information from the physical environment. For example, vehicles are usually constrained to tracks no wider than the width of the roadway—and often to tracks only half the width of the roadway—and trains are constrained to the width of their tracks. This cross track constraint data may be used to provide augmentation data and allow the vehicle to continue to navigate with only a single satellite in view. The cross track constraint data permits the computation of along track data useful for calculating total distance traveled to provide a GPS based odometer measurement.

The present invention permits the computation of distance along track for use as an odometer reading while tracking only one satellite. Cross track hold provides along-track data directly which, in the case of a vehicle, directly provides distance traveled information useful in lieu of a conventional odometer reading.

In addition to clock and altitude hold, the present invention uses a technique which may be called cross-track hold in which the single satellite in view is used for determining the progress of a vehicle such as a car along its predicted track, such as a roadway. The data conventionally required from a second satellite is orthogonal to the track and therefor represents the appropriate width of the roadway. This value may be assumed and or constrained to a sufficiently small value to permit an estimate of the value, e.g. $y_{est}$ to provide a mode described herein as cross-track hold while obtaining useful GPS navigation from a single satellite in view.

In other words, in accordance with the present invention, single satellite navigation may be achieved by using the data from the single satellite for on-track navigation information while holding or estimating the time, altitude and/or cross-track navigation data.

The required augmentation data may additionally, or alternatively, be derived from other sources in the physical environment, such as turns made by the vehicle during on-track travel. In accordance with another aspect of the present invention, the vehicle may detect turns made during travel and update the current position of the vehicle at the turn in accordance with the timing of the turn. Turn detection may be accomplished by monitoring changes in the vehicle vector velocity derived from changes in the GPS derived position information or by monitoring changes in the compass heading or by any other convenient means.

In another aspect, the present invention provides a GPS system for navigating a vehicle along a track, including means for tracking at least one GPS satellite to provide on-track information related to progress of the vehicle along a selected track, means for providing an estimate of cross track information related to motion of the vehicle perpendicular to the track, and means for providing vehicle navigation data, such as vehicle position or vehicle velocity, from the on-track information and the cross-track estimate.

In still another aspect, the present invention provides a method of deriving position information from a single GPS satellite by tracking at least one GPS satellite to provide on-track information related to progress of the vehicle along a selected track, providing an estimate of cross track information related to motion of the vehicle perpendicular to the track, and determining the position of the vehicle from the on-track and the cross-track estimates.

In still another aspect, the present invention provides a method of updating GPS position information for a vehicle navigating on roadways by deriving an indication that the vehicle has made a turn at a particular point along a predetermined track, comparing the turn indication with stored navigation data to select data related to one or more predicted turns at or near the particular point, comparing the turn indication with the predicted turn data to verify that the indicated turn corresponds to the predicted turn, and updating GPS position information to indicate that the vehicle was at the predicted turn location at a time corresponding to the turn indication.

In still another aspect, the present invention provides a GPS system for navigating a vehicle, the system including means for tracking at least one GPS satellite to provide on-track information related to the direction of travel of the vehicle along a selected track, and means for deriving vehicle navigation data from changes in the direction of travel of the vehicle along the selected track.

In a still further aspect, the present invention takes advantage of the typical improvement in satellite visibility possible in urban roadway intersections by providing a fast satellite reacquisition scheme which permits data from otherwise obscured satellites to aid in the navigation solution even though visible only for a short time, for example, as the vehicle crosses an intersection in an urban environment in which tall buildings obscure the satellites from view except in the intersection.

In a further aspect, the present invention provides a spread spectrum receiver having means for providing a plurality of versions of a locally generated signal related to a spread spectrum signal to be received, means for combining at least two of the versions of the locally generated signal with the spread spectrum signal to produce a product signal related to each of the at least two versions, means for evaluating the at least two product signals to adjust a parameter of the third version of the local signal, means for combining the adjusted third version of the local signal with the spread spectrum signal to produce a data signal, means for determining a predicted value of the parameter when the spread spectrum signal becomes unavailable, means for combining an additional plurality of versions of the locally generated signal related to the predicted value with received signals to produce additional product signals related to each of the additional plurality of versions of the locally generated signal, means for evaluating the additional product signals to produce a reacquired data signal.

In another aspect, the present invention provides a method of operating a receiver for coded GPS signals from satellites by correlating early, prompt and late versions of a locally generated model of the code with signals received from GPS satellites to adjust a delay of the prompt version to track a selected satellite, maintaining a predicted value of the delay when the selected satellite is unavailable, correlating a plurality of different early versions of the locally generated code with signals received from satellites to produce correlation products, correlating a plurality of different late versions of the locally generated code with signals received from satellites to produce correlation products, and reacquiring the previous unavailable selected satellite by selecting the version producing the largest correlation product above a predetermined threshold as a new prompt version of the code to track the satellite.

In a still further aspect, the present invention provides a spread spectrum receiver for a spectrum spreading code having a fixed number of bits repeated during a fixed length time period from a plurality of transmitters having a first time slicing level for slicing the time period of the transmitted code into a number of time segments evenly divisible into the twice the number of samples, a second multiplexing level for dividing each time segment into a number of channels, each of the channels being used for tracking one of the transmitters, and a third level dividing each of the channels in one of the segments into a number of code phase delay tests.

In another aspect, the present invention provides a receiver for processing signals from a plurality of sources, each modulated by a different spectrum spreading code repeating at a common fixed interval, including a sampler for deriving digitally filtered I and Q samples from a composite of spread spectrum signals received from the plurality of sources, means for segregating samples of the signals being received during each interval into a number of time segments, a time division multiplexer for segregating different versions of the sequential samples into each of a number of channels, each channel representing one of the plurality of sources, a correlator for correlating the version of the sample in each channel with a series of sequentially delayed versions of the spectrum spreading code applied to the signals from the source represented by that channel, and an accumulator associated with each of the series of delays in each of the channels for processing the results of correlations performed during one or more intervals to derive information related to the signals.

In another aspect, the present invention provides a GPS receiver in which the residual code phase tracking, or pseudorange, error due to simultaneous reception of multipath signals is detected, estimated and corrected. In particular, the distortion of the correlation function of the multi- and direct path signal composite as received with the internally generated code is detected by comparison of an aspect of resultant correlation function with a model of the correlation function expected in the absence of multipath distortion. The comparison provides an indication of the sign of the residual error.

It has been determined that the composite of a direct path and one or more multipath signals distorts the correlation function. If, as in most common cases, the multipath signal(s) are weaker than the direct path signals, the interference between such signals as received results in a predictable distortion of the correlation function. If the carrier phase(s) of the multipath signal(s) are shifted from between about 0° to 90° from the carrier phase of the direct path signal, the signals tend to reinforce each other resulting in a widening of the correlation function. Similarly, if the carrier phase(s) of the multipath signal(s) are shifted from between 90° to about 180° from the carrier phase of the direct path signal, the signals tend to cancel each other resulting in a narrowing of the correlation function.

The correlation products are used in a code tracking loop to track and determine code phase. The most common scheme is to track points of equal magnitude (or power) separated by one C/A code chip width and estimate the time of arrival of the direct path signal as the mid-point between these points of equal magnitude. The points of equal magnitude on either side of the direct path arrival time are known as the early and late correlation time and the estimated arrival time of the direct path is called the punctual correlation time. In the presence of multipath signals, the correlation function has been found to be distorted so that the mid-point between the early and late correlations, that is the prompt correlation, is not an accurate estimation of the arrival time of the direct path signal.

When the correlation function of the composite is distorted to be wider than the correlation function expected for a direct path only signal, the distortion results in a lag error in which the prompt correlation lags the actual direct path signal received. Similarly, when the correlation function of the composite is narrower than expected, the distortion results in a lead error in which the prompt correlation leads the time of arrival of the direct path signal.

The prompt correlation therefore leads or lags the actual time of arrival of the direct path signal by an amount designated herein as the residual code tracking error. The magnitude of the error can be approximated by the degree of narrowing or widening of the correlation function. Reduction of this error, or detection and correction of the error, enhances the accuracy of the resultant position determination.

The present invention also provides an improved multipath signal processing technique which directly cancels the effect of multipath signals by processing the composite of direct and multipath signals as received to create a synthesized replica of the signal as received which may then be subtracted from the signals as received to cancel or eliminate the effects of the non-direct path, unwanted multipath signals. As a result of the steps required to create a replica which will actually cancel the signal as received, the actual carrier and code phases are accurately determined without degradation by multipath components. The cancellation may preferably occur after the received signals have been partially processed to reduce complexity of the system and required signal processing and enhance accuracy of further processing.

In another aspect, the present invention provides an improved technique for multipath signal processing in which a tracking loop applied to the signal as received is used to synthesize an accurate replica of the signals as received, including multipath components. The replica is then canceled from the signal being processed to decode the signal as received without multipath degradation. The replica signal is synthesized to approximate, using least squares or similar approximation techniques, the GPS signal as received including distortions caused by multipath. This provides a useful estimate of the multipath signal profile. From this estimate, relatively accurate measurements of code and carrier phase of the direct path GPS signal received are derived.

In still another aspect, the present invention provides a spread spectrum receiver including a multi-bit digital correlator for correlating each sequential segment of a spread spectrum signal with at least one series of differently time delayed code replicas and matrix means responsive to the correlator to derive code source specific information. The multibit correlator may be configured from a set of correlators for simultaneously correlating portions of each sequential segment with portions of a segment of a code replica. The series of differently time delayed code replicas may be sequential or interlaced.

For efficient C/A GPS operation, each segment should include a signal sample having a duration of an integral number of half chip widths proportional to a number selected from 3, 11 and 31 while the number of satellite channels and time delays are proportional to the others of those numbers. The multi-bit correlator operates upon a first sequential segment while the sample register collects a subsequent sequential segment. The matrix means includes m times n data cells for storing data related to the correlation of the spread spectrum signal and the receiver may be selectively operated to form either n different code specific sets of m different time delayed correlation products or n times m different time delayed correlation products for one code.

The series of time delayed code replicas covers a tracking window of time sufficient to track a prompt time delay from a selected code transmitter as well as additional time delayed code replicas covering a recapture window of time separate from the tracking window. The recapture window is sufficiently large to include a prompt time delay correlation product for each code after predictable periods of code transmitter obscuration during normal operation of the receiver.

Multipath performance is improved by use of tracking means responsive to the matrix means for tracking a prompt delay from a source of the code together with means for monitoring correlation products representing lesser time delays than the prompt delay to detect the inaccurate tracking of a multipath signal from the source of the code. In addition, multipath errors are reduced by analyzing the ratios of correlation products surrounding the prompt correlation to correct for interference using means for causing correlation products of two of the time delayed replicas to be equal together with means for selecting the prompt delay in response to the ratio of the amplitude of the equal correlation products to a correlation product having a time delay therebetween. The prompt time delay is selected to be less than half way between the time delays of the equal correlation products if the ratio of the amplitudes of the equal correlation products to a correlation product having a time delay half way between the time delays of the equal correlation products is greater than one or more than half way between the time delays of the equal correlation products if the ratio of the amplitudes of the equal correlation products to a correlation product having a time delay half way between the time delays of the equal correlation products is less than one.

IF bandwidth improvement is provided by use of sampling means for forming digitized samples of signals received from code sources at a first rate and digital filtering means for forming the sequential segments from the digitized samples at a second rate substantially slower than the first rate.

Hand held operation is aided by use of means for temporarily interrupting correlation for multiple code periods to reduce receiver energy consumption and means for resuming correlation to continue deriving code source specific information. The correlation may be resumed periodically to provide an apparently continuous display. The periods of interruption are a multiple of the code period and short enough so that unmodeled clock drift is less than the difference in time between the time delays used for the correlation of signals from a code source. Correlation may also be resumed in response to means for modeling clock drift for synchronizing a local clock with a clock associated with a single source of the code or in response to operator interaction.

In a still further aspect, the present invention provides a method of operating a GPS C/A code receiver by forming x multibit digital segment values per C/A code period, each representing a sequential segment of a received composite of satellite signals, correlating each digital segment value with n satellite specific sets of m differently time delayed segments of C/A code modulation to form at least n times m time delay specific correlation values, and determining navigation information from the correlation values, where x, m and n are each prime factors of the number code chips per C/A code period.

Multipath performance is improved by comparing the magnitudes of two equal correlation values to the magnitude of a correlation value therebetween to select a prompt delay more than half way between the time delays represented by the equal correlation values when the magnitude of the equal correlation products is equal to less than half of a peak correlation value therebetween or less than half way between the time delays represented by the equal correlation values when the magnitude of the equal correlation products is equal to more than half of a peak correlation value therebetween.

Battery operation is improved by interrupting the step of correlating for a series of code periods to reduce receiver energy consumption. The interruption period is less than the time required for an internal receiver clock to drift the time delay represented by the series of time delay segments related to one particular satellite. Correlation is resumed periodically to update the display or to update the internal clock or in response to operator intervention in a push-to-fix mode.

BRIEF DESCRIPTION OF THE DRAWINGS

FIG. 13 is a block diagram description of GRF1 204.

FIG. 14 is a pin out of GRF1 204.

FIGS. 25A and 25B are diagrams illustrating cross track error resulting from the use of a straightline predicted track.

DETAILED DESCRIPTION OF THE PREFERRED EMBODIMENT

Figure 1:
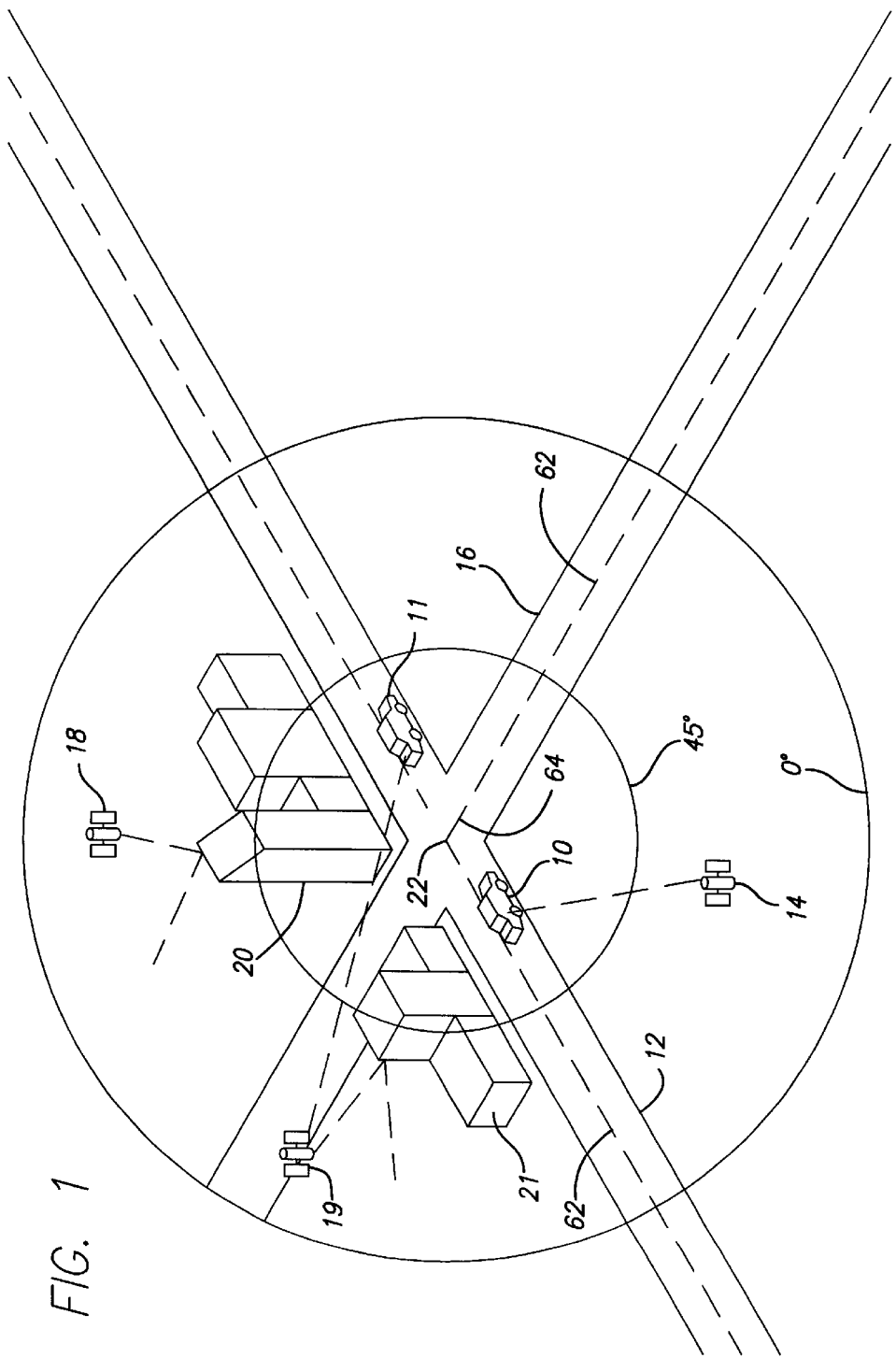
FIG. 1 is an overview illustration of the operation of a car navigation system according to the present invention.
Figure 2:
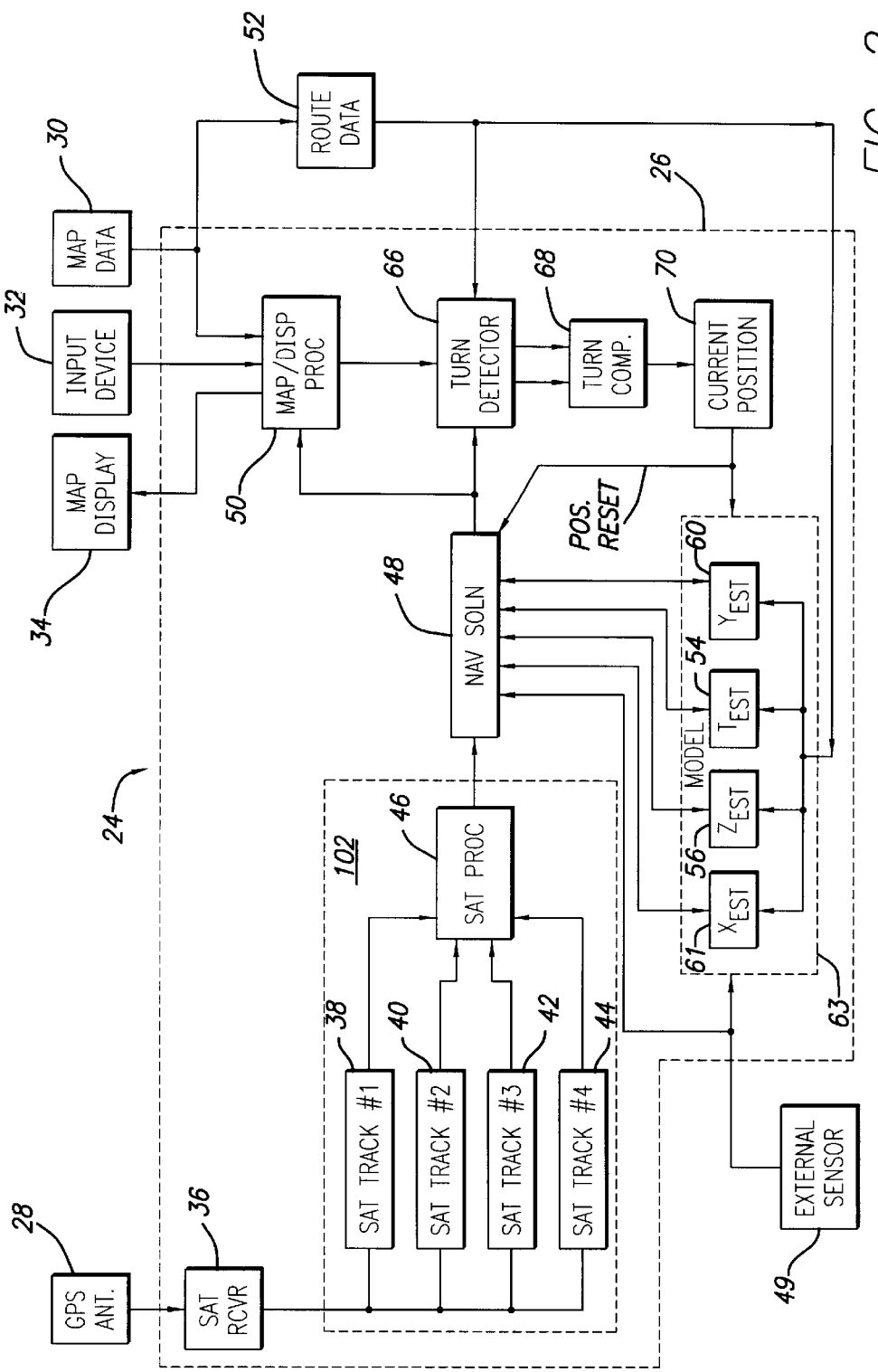
FIG. 2 is a block diagram of the GPS car navigation system depicted in FIG. 1, used for improved navigation during reduced satellite visibility.

FIG. 1 is an overview illustration of the operation of a GPS car navigation system according to the present invention. The GPS car navigation system, described below in greater detail with respect to FIG. 2, is mounted in car 10 which is moving along the center of roadway 12. NAVSTAR satellite 14, in the lower left quadrant of the figure, is in view of car 10. A simulated GPS circular overhead display, positioned approximately over intersection 22 of roadway 12 and roadway 16 indicates that satellite 14 is between 0° and 45° degrees of elevation above the horizon as viewed from car 10.

For the purposes of illustration, satellite 18 is positioned overhead between the elevation angles of 0° and 45° degrees. However, the line of sight between satellite 18 and car 10 is obscured by buildings 20 so that satellite 18 is not in view of car 10 at the position along roadway 12 as shown. Similarly, the line of sight between satellite 19 and car 10 is obscured by buildings 21. However, as will be discussed below, when car 10 crosses intersection 22, the line of sight between satellite 19 and car 10, when the car is in position 11 within intersection 22, may momentarily be clear.

Turning now to FIG. 2, GPS car navigation system 24 is a first embodiment of a car navigation system according to the present invention which may be installed in car 10 of FIG. 1. GPS car navigation system 24 includes GPS car system module 26 which is provided with signals received from satellites by GPS antenna 28, data related to the then current—and expected future—physical environment of car 10 by for example map data base 30 and data input from the operator of the car by for example input device 32. GPS car system module 26 provides output to the operator, for example, in the form of a GPS map display, via display unit 34, which may include both visual display as well as a voice interface announcing information as required to supplement or even partially replace visually presented data.

The present invention may be configured for use with only a GPS receiver, a GPS receiver aided by map data from, for example, map data base 30, and/or a GPS receiver aided by both a map data base as well as an external source of information, for example, from an external sensor. This external source of information may be used for maintaining position information by dead reckoning during those times when a sufficient number of satellites are not in view to provide the desired information.

In operation, a composite of all signals received from NAVSTAR satellites is applied by GPS antenna 28 to satellite receiver section 36 of GPS car system module 26. Signals from individual NAVSTAR satellites are then tracked in satellite specific tracking channels such as SatTRAK channels 38, 40, 42 and 44. Although it is quite conventional to track 4 to 12 satellites and therefore use 1 to 12 satellite tracking channels, only 4 such channels are shown herein for clarity. The outputs of these satellite specific tracking channels are processed by SatProcessor 46 to provide $x_{user}$, $y_{user}$, $z_{user}$ and $t_{user}$ data via appropriate logic control to a GPS position processor, such as PosProcessor or Nav Soln 48 which determines the navigation solution to determine position data. Position data is then applied by PosProcessor 48 to an appropriate display for the operator of the car, such as display unit 34.

External sensor 49, in FIG. 2, may conveniently provide sensor data, or local or satellite position information, or position information which provided local position or satellite position information directly to PosProcessor 48 for comparison with the position information determined by SatProcessor 46 and/or Map/Display Processor 50. External sensor 49 may conveniently be any sensor which provides information useful for updating position information for dead reckoning including direction, speed, velocity or acceleration or other data from which dead reckoning data may be derived. Conventional sensors include inertial navigation systems, with magnetic or optical gyroscopes, fluxgate compasses, odometer or wheel sensors or the like. Alternatively, external GPS format signals, such as those provided by a pseudolite, may be used to update current satellite or position information.

At the beginning of a navigated trip, the operator of car 10 would typically provide data concerning the physical environment surrounding the intended route to GPS car system module 26 by inserting an appropriate data storage device such as a CD ROM, into map data base 30, and/or by entering the data via input device 32 which conveniently may be a keypad, keyboard, pointing device, track ball, touch screen, graphical pad, a voice recognition interface and/or a combination of such input devices. The operator of car 10 would also enter the intended destination into GPS car system module 26 via a data entry device such as a mouse or track ball interacting with display unit 34 and/or via input device 32. Map/Display Processor 50 of GPS car system module 26 would then develop the desired route, typically from the then current location as a point of origin to the desired destination, in accordance with the rules of navigation and details of the locale provided by map data base 30. The appropriate route data is stored in Route Data Base 52, including the routing in the form of roadways and turns between roadways. Additional information, such as altitude, width of the roadways and etc. may also be contained within map data base 30 and/or Route Data Base 52. These data bases may be contained within GPS car navigation system 24 and/or be made available to GPS car system module 26 from outside storage media such as diskettes positioned in appropriate disk drives.

During navigation, each satellite in view may be tracked in a satellite tracking channel. If, for example, 4 or more satellites are in view, each of the satellites in view will be tracked in an individual channel, such as SatTRAK channels 38, 40, 42 and 44. The output of the satellite tracking channels is then applied to SatProcessor 46 which would provide satellite based solutions of the four unknowns, such as $x_{user}$, $y_{user}$, $z_{user}$ and $t_{user}$. The data represented by $x_{user}$ and $y_{user}$ are conventionally used as the two dimensional orthogonal components of the surface of the earth such as north and east. However, in accordance with the present invention, $x_{user}$ and $y_{user}$ are preferably used to represent data for a pair of orthogonal directions specific to the direction of vehicle travel called the on-track and cross-track directions.

Conventional bearing, such as north, south, east and west are relative to the magnetic or true north poles of the earth, while on-track and cross-track, as used in the present invention, are bearings made relative to the expected direction of travel of car 10 at any particular point in the route. For example, while a 90° turn from a heading of due north would change the angle of the vehicle velocity vector from 0° to 90° if bearings relative to the Earth's surface such as north and east are used, the same turn would show no change in the 0° angle of the vehicle velocity vector before or after the turn as long as car 10 remained on the expected track.

The data represented by $z_{user}$ is typically surface elevation, such as the elevation above sea level, while the data represented by $t_{user}$ is the exact time as determined from one or more of the satellite tracking channels.

Solutions for all 4 unknowns of position information may be derived from signals from 4 satellites in view, so that exact position information within the limit of the accuracy then available from the GPS satellite constellation in view can therefore be applied by PosProcessor 48 to Map/Display Processor 50. The position information determined from the satellites is processed with the physical data from map data base 30, and/or the desired routing data from Route Data Base 52, to provide appropriate navigation information to the operator of car 10 via display unit 34.

If less than 4 satellites are in view, the $t_{user}$ solution applied to PosProcessor 48 may be replaced by $t_{est}$ 54 estimated solution derived for example from an internal clock model 54 in position estimate or model 63. Similarly, the $z_{user}$ solution may be replaced by $z_{est}$ 56 solution derived from elevation estimate 56, also in position model 63, in accordance with routing data derived from Route Data Base 52 in accordance with then current GPS position information applied to Map/Display Processor 50. $T_{est}$ 54 and $z_{est}$ 56 are applied to PosProcessor 48, and used in lieu of $t_{user}$ and $z_{user}$, when only two satellites are in view. The use of estimated or modeled solutions for the t and z variables, that is the use of $t_{est}$ 54 and $z_{est}$ 56 are conventionally known as clock hold and altitude hold, respectively.

It must be noted that the particular configuration of GPS car navigation system 24 as described so far is only one of the many known ways of configuring such systems any of which may be used without departing from the spirit or scope of the present invention as defined by the claims.

In accordance with the present invention, the width of the roadway, either known or estimated, may be used to provide $y_{est}$ 60 for use in lieu of $y_{user}$ when only one satellite is visible. $y_{est}$ 60 may be derived from Route Data Base 52 and/or map data base 30. Since the x and y unknowns are orthogonal, $x_{user}$ may be used to describe the on-track information, that is, the progress of car 10 along its predetermined track while $y_{est}$ 60 represents the cross track information, that is, how far car 10 has strayed from the center of the roadway.

Referring therefore to FIG. 1, $x_{user}$ is used to indicate the progress of car 10 along roadway 12 while $y_{est}$ 60 is used to represent the width of roadway 12. The actual width of the roadway may be derived from map data base 30, or assumed because the actual value of the width of the roadway is relatively small and often therefore insignificant compared to the distances to be measured along the navigation route. Since the maximum allowable cross-track error, i.e. the maximum allowable appropriate value for y, is constrained by the physical width of the roadway, $y_{est}$ 60 is relatively easy to accurately estimate.

By using $y_{est}$ 60, $z_{est}$ 56 and $t_{est}$ 54, it is possible to provide useful navigation data for car 10 along a known roadway using signals from only a single satellite in view. It is important to note that reasonably accurate prior or initial position information may be required and that not all visible NAVSTAR satellites will be suitable for single satellite navigation, depending upon the position of the satellite with respect to the path of car 10. The position information determined during single satellite navigation is along track position information which may be accumulated and used for determining accumulated along track distance traveled. This data provides, and may be used in place of, the distance traveled information conventionally provided in a vehicle by an odometer.

Referring now to both FIGS. 1 and 2, turning data may be used to improve terrestrial GPS navigation by using the detection of a known turn to update progress along a predetermined route. When at least 4 satellites are in view, the position of car 10 may be known to the accuracy of the GPS system. When using clock, altitude or cross-track hold, or some combination thereof, the known position of the car is degraded by any inaccuracy of the estimate or estimates used. For example, during clock hold, internal clock model 54 drift and inaccuracy of the source of $t_{est}$ 54 will degrade the accuracy to which the position is known as a function of the magnitude of the inaccuracy. Similarly, any change in altitude from the estimated or fixed altitude, that is, any inaccuracy of $z_{est}$ 56, will degrade the accuracy of the known position. Changes in roadway width and inaccuracies in the map data with regard to the roadway width, that is, any inaccuracy in $y_{est}$ 60, may also degrade the position information.

Even with 4 satellites in view, the geometry of the visible satellites may make it difficult to determine position by measurement of GPS signals. Further, during terrestrial navigation, it is not uncommon for satellites to be temporarily obscured from view during navigation by, for example, being blocked by buildings and other obstructions.

It may therefor be desirable to update the accuracy with which the current position of the vehicle is known with actual position information whenever possible. The update information will sometimes be useful when 4 satellites are in view, but will always be useful as supplemental data when less than 4 satellites are in view. Update information is extremely useful during single satellite navigation to avoid the accumulation of errors in position information.

In operation, an original position and a destination were provided to the system which then determined the track to be followed. The track to be followed, or routing information, may be provided in the form of a data base of route information such as Route Data Base 52. In the example used, track 62 follows the centerline of roadway 12 to intersection 22 and then makes turn 64 to follow the centerline of roadway 16. Track 62, roadways 12 and 16, intersection 22 and turn 64 are provided to Route Data Base 52 during the preparation of the route by Map/Display Processor 50 from the then current position and the destination entered via input device 32.

The physical position of car 10 is very accurately known when car 10 turns at turn 64. This accurate knowledge of the car's position at a particular time may conveniently be used to update the GPS navigation information by providing a position reset which is similar to a known initial position. Update information from turns will most likely be useful if the angle of turn 64 is sufficiently large to provide an unambiguous position determination. It is expected that any turn greater than 45° may be detected. As the speed of the vehicle increases, smaller turn angles may also provide useful information. The position update information is applied to position model 63 to update internal clock or $t_{est}$ model 54, elevation or $z_{est}$ model 56, $y_{est}$ model 60 as well as $x_{est}$ 61 which is a model of the along-track position of the car. These four estimates together for position model 63, which may be updated by information from map data base 30, Route Data Base 52, current position processor 70, PosProcessor 48 and/or external sensor 49, to form the most accurate available position model 63. Position model 63 may also be used to provide estimates to the same data sources.

The actual turning of the car may be detected by a change in the vehicle velocity vector determined from the GPS data or from other conventional means such as a magnetic compass or an inertial navigation sensor. In accordance with the rapid reacquisition system described below with respect to FIG. 3, GPS data alone may conveniently detect such turns even when single satellite navigation is required. The turn as detected by turn detector 66 is correlated with data from Route Data Base 52 to determine the actual position of the car to the accuracy of the map data base 30. The accuracy of the data in map data base 30 may easily and conveniently be much greater than the accuracy available from the GPS system especially if single satellite navigation, or any combination of clock, altitude or cross-track hold, is used. Therefore the position update may provide a substantial increase in the accuracy of the then current position determination.

The benefit of the approach of this embodiment of the present invention is similar to the identification and use of a known waypoint during a dead reckoning navigation run. The cumulative error is reduced substantially at the known waypoint so that additional, future position determination errors do not carry the burden of an accumulation of past errors.

As shown in FIG. 2, Route Data Base 52 provides data related to track 62, typically from Map Data Base 30, to Map/Display Processor 50 to display the current GPS position and may also provide similar information to turn detector 66, turn comparator 68 and/or current position processor 70 in order to update PosProcessor 48 with a position reset.

Turn detector 66 may be configured in many different ways and is used to detect turns actually made by car 10 and select turns, such as turn 64, from Route Data Base 52 for later comparison with the detected turn. In accordance with a preferred embodiment of the present invention, turn detector 66 may operate on the current GPS position provided by PosProcessor 48 to develop a vehicle velocity vector position indicating both the direction and speed of travel. Substantial changes in the direction portion of the vehicle velocity vector would indicate a change in direction, such as a turn. Turn detector 66 may therefore detect turns directly from the GPS information by determining the vehicle velocity vector and detecting changes in the vehicle velocity vector which represent a turn.

Turn detector 66, or another unit if convenient, also operates on the route information provided by Route Data Base 52 to determine the expected position of car 10 along track 62 based on the then current GPS position information. Once the expected location of car 10 along the route is determined, one or more turns in the area of the expected position of car 10 can be selected for comparison with the indications of a physical turn derived from the GPS data.

When changes in the actual vehicle velocity vector, as derived for example from the GPS position data, compare appropriately with the changes predicted at a particular turn as derived from Route Data Base 52, the actual position of car 10 at the time of the turn can be very accurately determined and used to update the GPS data at the turn. For example, if an actual turn is detected from a change in the vehicle velocity vector from the GPS position of car 10 near the time predicted for that turn, the actual position of car 10 at the time of the turn can be determined and used to update the then current GPS position for use as a position reset applied to PosProcessor 48.

Alternatively, turn detector 66 may use non GPS measurements for determining the occurrence of an actual turn of car 10, such as compass headings or inertial navigation determinations derived for example from external sensor 49, and applied directly to turn detector 66 or via PosProcessor 48 as shown in FIG. 2.

Detection of turns from GPS signals may easily be accomplished as long as 2 satellites are in view and provide appropriate geometries for determining two dimensional coordinates of the car's position. During single satellite navigation, as described above, the use of turn information for updating the last known position information becomes even more important, but the location of the single satellite in view, relative to track 62, becomes of even greater importance so that actual turns may be accurately detected.

Turn detection may also be provided by monitoring changes between acquired and obscured satellites. If, for example, only satellite 14 was visible to car 10 on roadway 12 before intersection 22, and upon entering intersection 22, satellite 19 suddenly became visible while satellite 14 was momentarily obscured, the change over from satellite 14 to satellite 19 could be used to indicate a turn in accordance with the data from each satellite. Using a rapid reacquisition scheme, as described herein below, the actual position at which the change of direction, that is, the position at which the switch between satellites occurs, can be sufficiently accurately determined to permit precise position update information at the turn.

Similarly, turn comparator 68 may conveniently be implemented within Another component of the system, such as PosProcessor 48, Map/Display Processor 50 and/or SatProcessor 46, so that a candidate turn may be selected from the route data for track 62 for comparison with the detected turn data.

Figure 3:
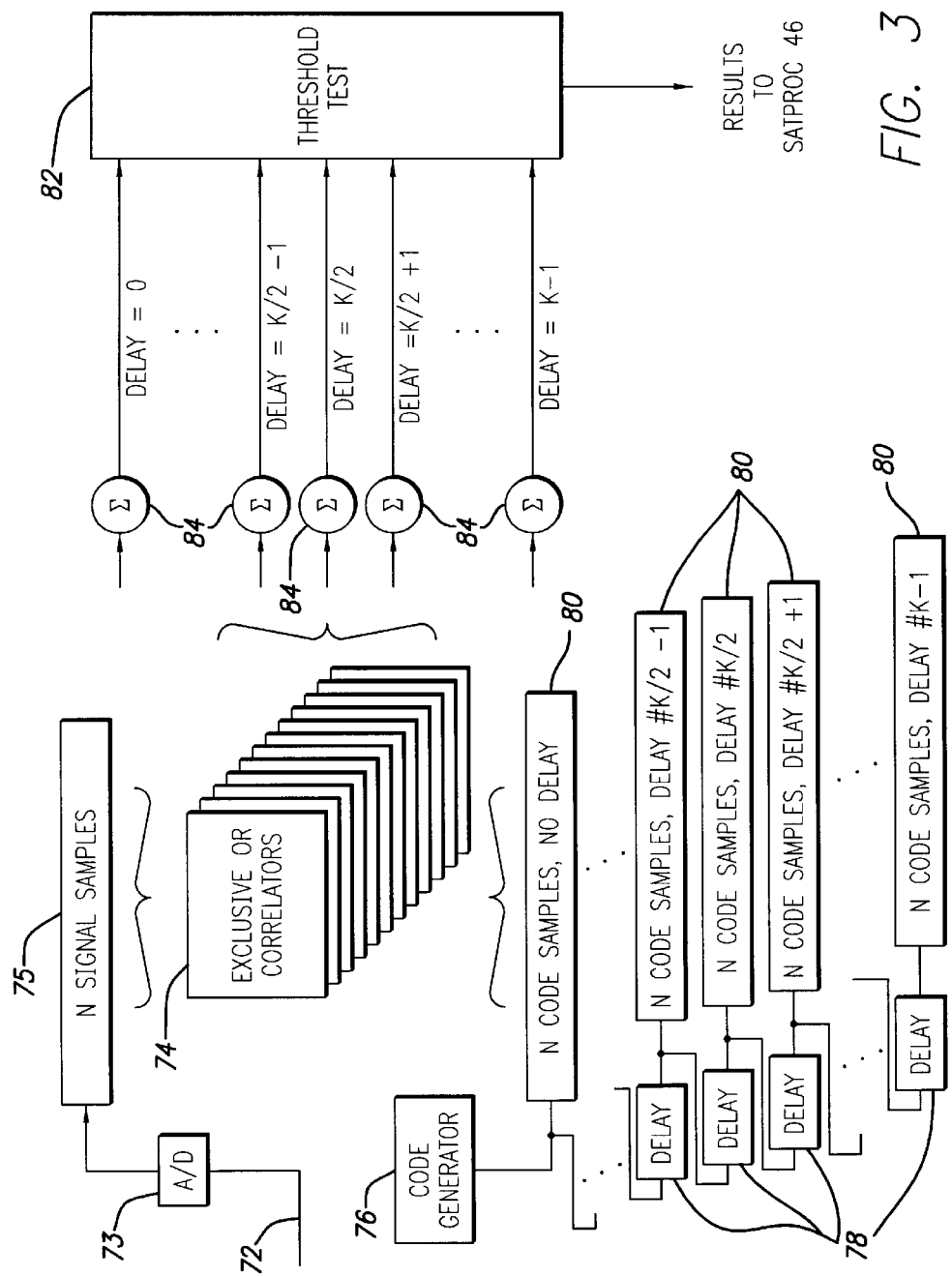
FIG. 3 is a schematic representation of a single satellite channel of a GPS receiver used for fast satellite reacquisition.

Referring now to FIG. 3, in another embodiment, the present invention provides for fast reacquisition of satellite signals, useful for example when a previously acquired satellite is obscured and then appears perhaps for only a short time, for example, as a car travels through an intersection.

Referring to the line of sight between car 10 and satellite 19 as shown in FIG. 1, it is common in an urban environment for the buildings along the sides of the street to act as a barrier wall obscuring the lines of sight to many GPS satellites. However, the barrier wall formed by buildings 20 and 21 is commonly breached at intersections such as intersection 22. For example, car 10 while traversing intersection 22 may reach position 11 in which the previously obscured line of sight to a satellite, such as satellite 19, is momentarily not obscured because of the break between buildings 20 and 21 at intersection 22. This momentary visibility of a previously obscured satellite may occur while car 10 is in the intersection or at the edges of the intersection.

The length of the momentary contact with satellite 19 is relatively short. For example, if intersection 22 is 60 feet wide and car 10 is traveling at 30 mph, the time taken to cross the intersection may be as short as 1.3 seconds. Conventional GPS navigation systems would not reacquire and derive useful data from satellite 19, even if previously acquired, during this short time interval.

In accordance with another embodiment, the present invention makes maximum use of such reacquisition opportunities by minimizing the time required for reacquisition, the collection of data and processing of the collected data for position determination. Referring now to FIG. 3, a portion of SatTRAK channel 38 is shown in greater detail as an example of the configuration of each of the satellite tracking channels. After original acquisition, SatTRAK channel 38 tracks a single satellite by operating on satellite signals 72 received by GPS antenna 28. Satellite signals 72 include the signals from the satellite being tracked by SatTRAK channel 38 and are demodulated and selected by being multiplied, in one of the correlators 74, by a copy of the 1023 chip pseudorandom, spread spectrum code applied to satellite signals 72 by the GPS satellite. Correlators 74 may be configured from exclusive OR NOR gates to minimize the time required for providing a correlation result.

During tracking, the copy of the code produced by code generator 76 and applied to exclusive OR correlators 74 by delay 78 is synchronized with the code in satellite signals 72, as received, so that the copy of the code correlates with satellite signals 72. This may be accomplished in several different manners known in the art, including by shifting the time of generation of the code in code generator 76 and/or adjusting the amount of delay applied by an external delay. In any event, the code applied to exclusive OR correlators 74 when SatTRAK channel 38 is locked to the selected satellite, is synchronized with the code being received from that selected satellite. This correlation is commonly called the on-time or prompt correlation to indicate this synchronization.

Conventional GPS receivers maintain a lock on a satellite signal after acquisition by performing additional correlations, often called early and late correlations or correlations performed by early and late correlators. These correlations are displaced in time by a certain delay such as one half the width of a C/A code chip from the on-time or prompt correlator. That is, if the time of occurrence of a particular chip in the satellite signals is time t0, the prompt correlator under ideal conditions would multiply satellite signals 72 with a replica of the code with the same chip at time t0. The early correlation would be performed at time t0−½ chip and the late correlation would be performed at a time equal to t0+½ chip. Whenever the synchronization between code generator 76 and satellite signals 72 as received begins to drift, the correlation results begin to change in favor of either the early or late correlation at the expense of the prompt correlation.

One conventional approach to maintaining lock on the signals from a particular satellite is to adjust the timing of code generator 76 with a feed back loop used to maintain the power in the correlation products in the early and late correlators to be equal. In this way, code generator 76 may be continuously resynchronized with satellite signals 72 so that the accuracy of the system is within one half chip in either direction (early or late) of the signals received.

When satellite signals 72 are temporarily lost, for example, because the satellite signals are temporarily obscured by buildings 20 and 21 as shown in FIG. 1, various techniques are used to attempt to synchronize code generator 76 with satellite signals 72 as received so that SatTRAK channel 38 can reacquire the signals from-the desired satellite. As noted above, conventional techniques include clock and altitude hold and one embodiment of the present invention provides another technique called cross-track hold.

However, unless the obscuration of the satellite signals is very brief, the accuracy of prediction of such techniques is not enough to maintain synchronization exception for a very brief period of obscuration.

In accordance with another embodiment of the present invention, massively parallel correlation is used to create an expanded capture window of correlation capture around the then current predicted synchronization time in order to immediately reacquire a previously acquired, and then obscured, satellite signal. In particular, the speed of reacquisition is made sufficiently fast according to the present invention so that useful GPS position data may be acquired during the time car 10 travels through intersection 22 even though, for example, the signals from satellite 19 were obscured by buildings 20 until car 10 was within intersection 22.

To this end, an expanded series of correlations are performed with a series of delays a fixed fraction of a chip width, such as ½ chip width, apart extending both early and late of the predicted prompt correlation. As shown in FIG. 3, satellite signals 72 are devolved into a fixed number of samples, by for example analog to digital conversion in A/D Converter 73, to provide n Signal Samples 75. A similar number of code samples are provided through k fixed ½ chip width delays 78 to provide k-1 sets of n Code Samples 80, progressing from a first set of n Code Samples 80 with no delay to the k-1st set of n Code Samples 80 which have been delayed by a total of k delays 78. It is convenient to use ½ chip delays for each delay 78, but other fractions of a chip width may be used.

The k/2th set of n Code Samples 80, or the set nearest k/2, may conveniently be delayed the correct amount to perform the prompt correlation in one of the exclusive OR correlators 74 with n Signal Samples 75 from A/D Converter 73 during tracking. The k/2th −1 set of n Code Samples 80 may then be used to perform the early correlation while the k/2th +1 set of n Code Samples 80 may then be used to perform the late correlation while tracking. The additional correlations may also be performed during tracking, but provide a substantial advantage when used during reacquisition.

That is, in the present invention, the early, prompt and late correlations conventionally used in tracking may also be used during reacquisition mode, aided by a substantial number of correlations using additional delays. Whether or not the early and late correlations are used, a convenient number of additional delays on each side of the prompt delay results from (k-1)=20 so that nine or ten ½ chip delays are provided on each side of the k/2th prompt delay. In this way, correlations are performed during reacquisition at time delays of 5 chip widths on either side of the predicted prompt or on-time delay. This represents an expanded capture window of on the order of ±5×300 meters of potential error. That is, if the predicted synchronization with satellite signals 72 modeled by GPS car system module 26 drifted by as much as the equivalent of a ±1500 meter position error during signal loss from a particular satellite resulting from, for example obscuration in an urban setting, at least one of the plurality of exclusive OR correlators 74 would provide the required prompt correlation to immediately lock onto satellite signals 72.

Once the correlations are performed, the correlation results for each set of n Code Samples 80 are summed in summers 84 to produce a series of values each separately indicating the correlation of n Signal Samples 75 with each of the sets of n Code Samples 80. These correlation results are applied to threshold test 82, the output of which is applied to SatProcessor 46 only when satellite signals 72 have been successfully received. The output of threshold test 82 specifies the number of delays which represent the prompt correlation for the reacquired satellite signal. It is important to note that in accordance with the present invention, the satellite tracking and reacquisition modes are not separated functions but rather interact seamlessly. That is, by providing a substantially expanded capture window, the correlations used for tracking are also automatically useful for immediate reacquisition as long the capture window is sufficiently wide to include any position error accumulated during signal obscuration or other loss.

Because the speed of reacquisition is very important in order to maximize the opportunity to utilize the brief time during travel through intersection 22 when satellite 19 may temporarily be in view, it is advantageous to perform all such correlations in parallel. Further, it is advantageous to continuously perform all such correlations in the capture window in order to minimize time when a satellite signal is not being tracked. In accordance with the presently preferred embodiment, exclusive OR correlators 74 are implemented in hardware rather than software to maximize the speed of correlation and minimize any error accumulation by minimizing the time for reacquisition.

In operation, when car 10 follows track 62 along roadway 12, during at least part of the time buildings 21 obscure the line of sight between car 10 and satellite 19. If satellite 19 had previously been acquired by GPS car system module 26, an approximate time value to synchronize with the satellite signals will be predicted. This value is maintained as accurately as possible within GPS car system module 26 while satellite 19 is obscured. In order to maintain the prediction for the required delay as accurately as possible, that is, to minimize the position error accumulated during signal loss, the above described techniques for maintaining or updating position accuracy by using cross-track hold, resetting position at a determined turn and/or the use of external sensors for dead reckoning provide a substantial benefit for use with the combined, expanded tracking and reacquisition windows described above.

Present technology makes it convenient to provide ½ chip delays between correlators, but other delay values may be used. Similarly, it is convenient to expect that the prompt correlation can be maintained within plus or minus 5 chips of the timing of the satellite signals. FIG. 3 therefore portrays a series of 9 or 10 early and 9 or 10 late correlators surrounding prompt correlator 74 to achieve the ±5 chip capture window surrounding prompt correlator 74 in 20 half chip steps. A different number of correlators and other delays would also work with the present invention.

Use of a plurality of fixed delays of one half chip width permit the immediate reacquisition of signals from a satellite to within an accuracy of one half chip width. In accordance with satellite signals 72 as presently provided by the NAVSTAR satellites, one half chip width represents about 150 meters of maximum position error. It is possible to substantially reduce the maximum position error, and/or the speed of processing the data, by using fixed delays of a different amount of delay, e.g. fixed delays of one third, one quarter, one fifth or some other value of a chip width.

Figure 4:
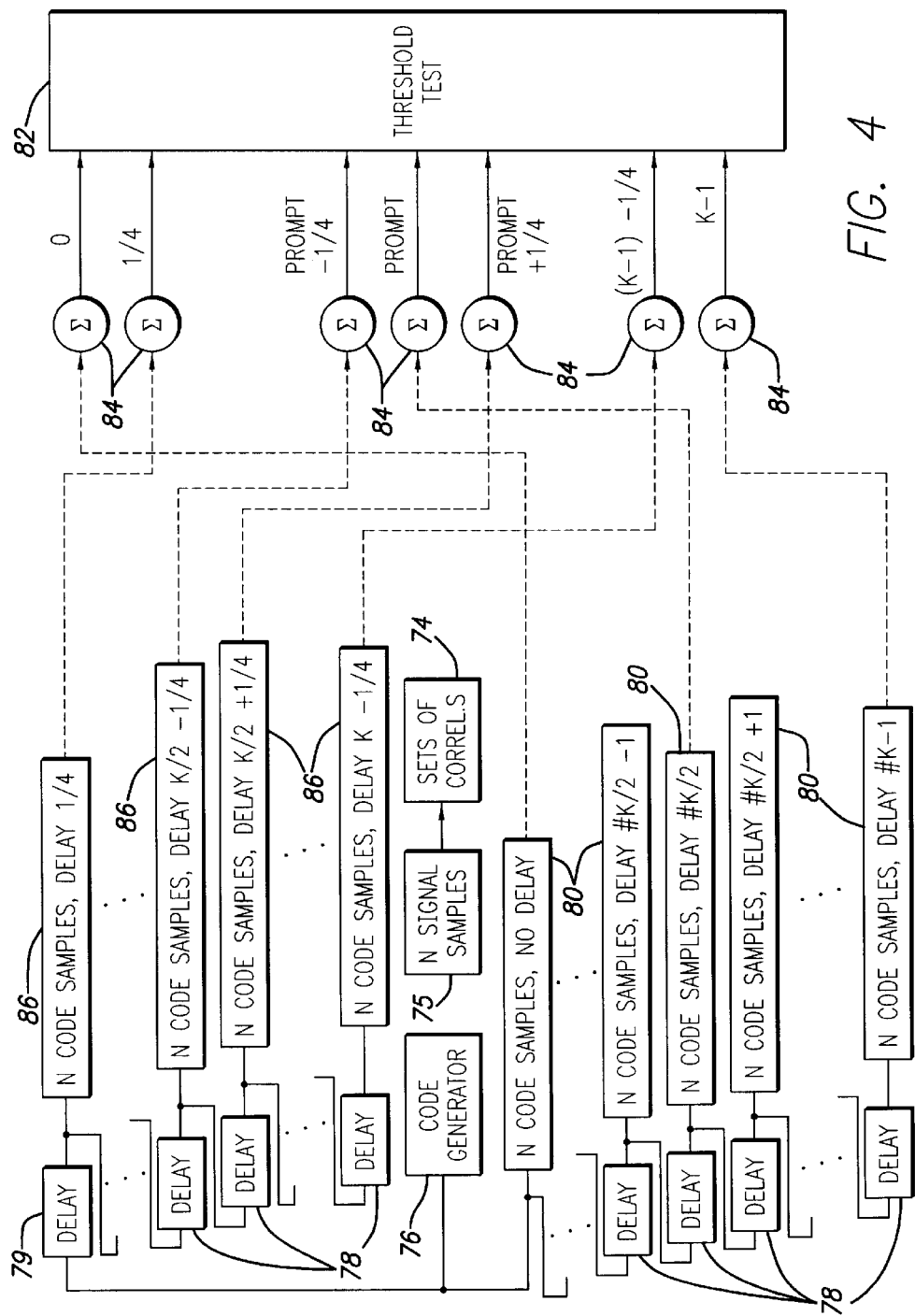
FIG. 4 is a schematic representation of a portion of the single satellite channel shown in FIG. 3 in which an additional plurality of sets of delayed code samples are correlated to provide a finer gradation of correlation intervals.

Conventional approaches for different modes of operation, switch between wide and narrow delays at acquisition and/or reacquisition in order to provide a compromise between the width of the capture window and the number of correlations required for the desired range. In accordance with the present invention, a new technique is used which permits the convenient use of fixed, chip width delays to provide a finer gradation of correlation steps. In particular, as shown in FIG. 4, two sets of half width delays are used to provide the equivalent of a set of quarter width delays. The number of sets of fixed delays and the offset between them may be selected in accordance with the requirements of the application being addressed.

Referring now to FIG. 4, a first plurality of sets of n Code Samples 80 are derived directly from code generator 76, delayed from each other by ½ chip width delays 78 and correlated with n Signal Samples 75 in exclusive OR (or NOR) correlators 74 as provided in FIG. 3. For convenience of explanation and drawing, the outputs from this first set of set of n Code Samples 80 are shown applied to summers 84 to indicate that the correlation products produced in exclusive OR correlators 74 from each such set of n Code Samples 80 are applied to threshold test 82 via summers 84. All such correlation products are applied, but for clarity only the correlation products having no delay, the predicted prompt or k/2th delay and the kth delay are depicted. The correlation products from this first plurality of sets of n Code Samples 80 are spaced apart by ½ chip width delay as noted above.

In addition, in accordance with the present invention, additional sets of correlation products at different spacings are available by use of one or more additional sets of ½ chip delays 78 by, for example, tracking the same satellite in two or more channels offset in time from each other. It is important to note again that other delays and/or offsets may also conveniently be used and the delays need not all be the same.

In particular, a second plurality of sets of n Code Samples 86 are derived from code generator 76 and delayed from each other by ½ chip width delays 78. However, the delays in the second sets of n Code Samples 86 are offset from the delays in the first sets of n Code Samples 80 by a fixed amount, such as a ¼ chip width delay, by insertion of ¼ chip width delay 79 between code generator 76 and the first set of n code samples in sets of n Code Samples 86. This results in each of the samples in sets of n Code Samples 86 falling halfway between two of the sets of n Code Samples 80. As shown in FIG. 4 only k-1 sets of n Code Samples 86 are required with k sets of n Code Samples 80.

Each of the sets of n Code Samples 84 are correlated with n Signal Samples 75 in exclusive OR correlators 74 as provided in FIG. 3 to produce correlation products which are then summed by additional summers 84. As noted above, the dashed lines between each of the sets of code samples and summers 84 are used to indicate that the correlation product between that set of code samples and n Signal Samples 75 is applied to a particular one of summers 84. As can then easily be understood from FIG. 4, correlation products separated from each other by ¼ chip width delays, from the 0th delay to kth delay, are produced using sets of ½ chip width delays and a single ¼ chip delay (which may represent the offset delay between two channels) and after individual summation are applied to threshold test 82 to determine which delay represents the currently prompt delay of satellite signals 72 from a satellite being reacquired by GPS car system module 26.

The second set of ½ chip delays may easily be implemented by having a second channel track the same satellite, offset, however by ¼ chip width delay 79.

In this way, the range of delay within which a satellite signal lock may be acquired, maintained and/or reacquired may be reduced from ±½ chip width, to about ±¼ chip width, which permits faster pull in to lock, i.e. when the tracking has been optimized and range error reduced to minimum.

It is important to note the seamless integration of tracking and reacquisition provided by the present invention in that the same correlations are used for tracking and reacquisition and the related speed of capture and lock and simplicity provided thereby. The ability to rapidly reacquire within a capture window so that one of the correlations may immediately be used as a prompt correlation, speeds up all data acquisitions thereafter. It is also convenient to utilize a first plurality of sets of n Code Samples 80 for tracking and, when satellite signals 72 are lost, provide additional accuracy in reacquisition by using a second plurality of sets of n Code Samples such as sets of n Code Samples 84. In particular, the same plurality of sets of n Code Samples 84 may be used for reacquisition of signals 72 for different satellites at different times in order to reduce the total number of components and steps required to produce all the necessary correlations and summations.

In operation, GPS car system module 26 continuously attempts to track and reacquire the signals from satellite 19 in SatTRAK channel 38 while satellite 19 is obscured from view. As car 10 passes through intersection 22, the line of sight to satellite 19 is momentarily not obscured by buildings 21. Whenever any of the correlations performed in SatTRAK channel 38 indicate that the satellite signals are being received with sufficient strength so that the correlation products from some of the correlators are above threshold, reacquisition is immediately accomplished. Reacquisition occurs when the correlator output indicating the largest magnitude is selected as the new prompt correlator. Conventional techniques for improving the quality of the data are then employed.

The data from satellite 19 is used to immediately, after a settling time for lock, update the GPS data and correct the currently known position information derived therefrom. Even if satellite 19 is then again immediately obscured, the update information derived during travel through the intersection by fast reacquisition provides a substantial improvement in accuracy of the GPS determined position. This will permit GPS car system module 26 to continue accurate navigation even through otherwise very difficult areas, such as city streets.

Although the use of single satellite navigation data by cross-track hold and then updating a satellite data by detecting turns and/or immediately reacquiring satellite signals in intersections have all been described separately, they are also very useful in combination. Terrestrial navigation systems, using GPS receivers in a stand alone mode, aided by map displays and data bases and/or aided by external sensors such as inertial navigation systems may benefit from the use of combinations of one or more such modes. In a preferred embodiment of the present invention, all three techniques are combined to maximize the ability of the car navigation system to provide accurate and useful navigation data while traversing a difficult environment such as city streets.

Figure 5:
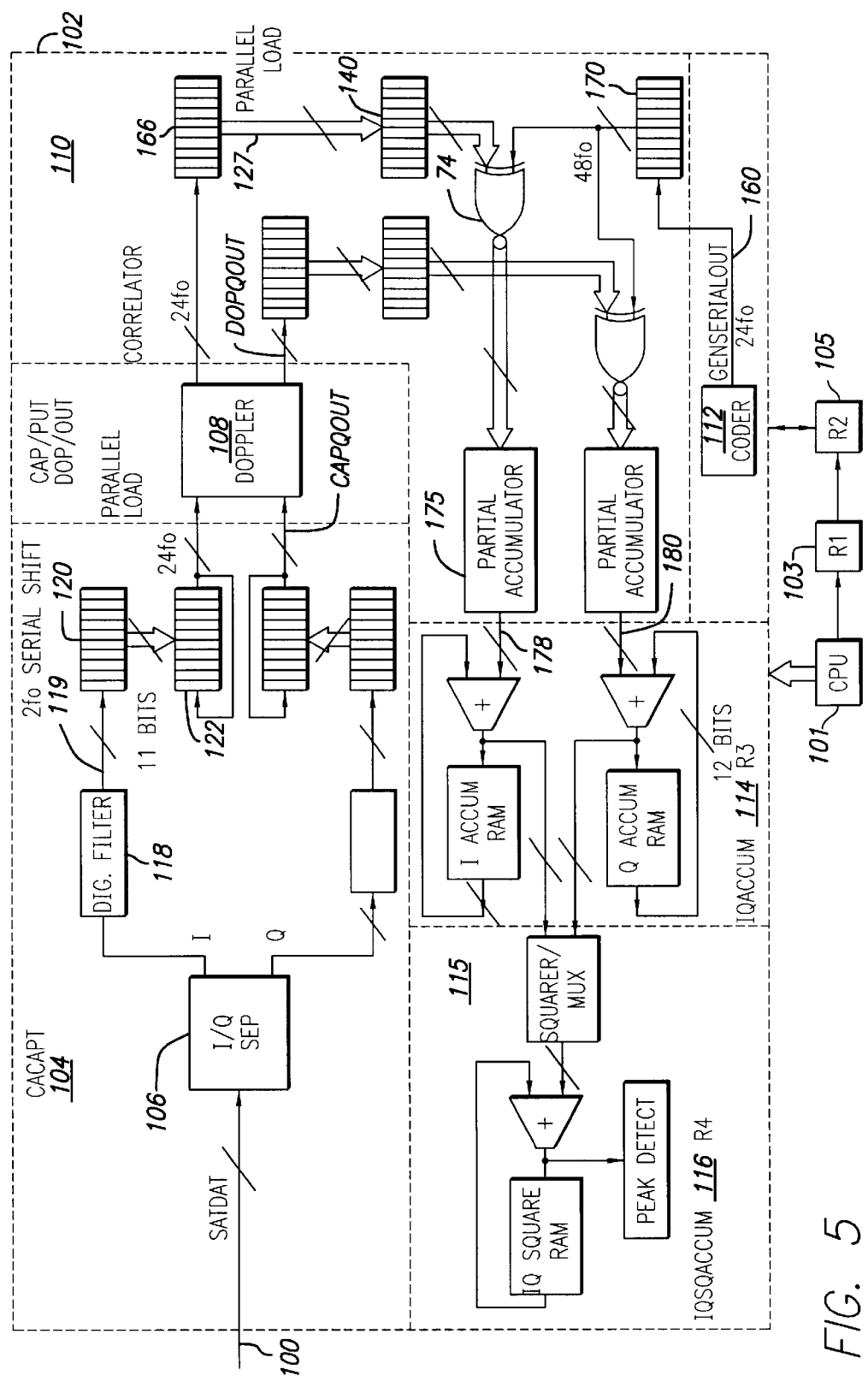
FIG. 5 is a functional block diagram of a preferred implementation, on an ASIC, of the satellite tracking channels and associated processing components of the GPS car navigation system shown in FIG. 1.

Referring now to FIG. 5, a preferred embodiment of the present invention is described in which major portions of SatTRAK channels 38, 40, 42 and 44 and SatProcessor 46 of the present invention are implemented in an Application Specific Integrated Circuit or ASIC 102. Many of the functions of a conventional satellite processor may still, however, be performed in software. The particular implementation depicted provides a 12 channel GPS acquisition and tracking system with fast reacquisition capabilities as described above while substantially reducing the number of gates required on the ASIC to implement this system.

The signals received by GPS antenna 28 are digitized and form a digital composite of signals received from all satellites in view to produce sample data 100 which is at a frequency of 37.33 $f_0$ where $f_0$ is the chip rate of the C/A code applied to each GPS satellite. For convenience, the frequencies described below will be designated in terms of multiples of $f_0$. Each of 12 Space Vehicles (SVs) or satellites are tracked in ASIC 102 under the control of Central Processing Unit, or CPU, 101 which provides control signals and data to ASIC 102. In particular, CPU 101 provides data regarding the predicted Doppler shifts and C/A code applied to each SV to Random Access Memory, or RAM, R1 103 associated with ASIC 102 which provides the data to RAM R2 105 at designated times. RAM R2 105 provides data to and receives data from ASIC 102, permitting CPU 101 data updating and ASIC 102 processing of old data to operate simultaneously. RAM R2 105 is used as a buffer by ASIC 102 primarily to store intermediate values of signals during processing. Other conventional portions of a microcomputer including a CPU are not shown but conveniently may include devices operating software implementing the single satellite, cross-track hold and other techniques described above as well as other functions of SatProcessor 46.

Sample data 100 is applied to C/A code acquisition, tracking and reacquisition block CACAPT 104 in ASIC 102 where it is split into in-phase and quadrature-phase, or I and Q, signals at baseband by I/Q splitter 106. After processing by CACAPT 104, the I,Q signals are rotated for Doppler shift in 12 channel Doppler Block 108 which separately compensates for the expected Doppler frequency shifts of each of the 12 SVs which can be tracked.

The Doppler rotated I,Q signals for each SV are then applied to Correlator Block 110 where each signal sample, which is from one of the 12 SVs, is correlated in a multiplexed fashion with 20 delayed versions of the C/A code, produced by 12 channel Coder Block 112, for that SV. During each segment of time, as described below with regard to FIG. 11 in greater detail, Correlator Block 110 performs 240 C/A code correlations in accumulator 175 to enhance the speed of acquisition and reacquisition. The output of Correlator Block 110 is applied to IQACCUM Block 114, and the output of IQACCUM Block 114 is applied to IQSQACCUM 116, in Accumulator Block 115. IQACCUM Block 114 is conveniently configured from another block of RAM associated with ASIC 102, identified herein as RAM 3. Similarly, IQSQACCUM 116 is conveniently configured from another block of RAM associated with ASIC 102, identified herein as RAM 4.

Accumulator Block 115 operates in different fashions during acquisition, tracking and reacquisition modes under the direction of CPU 101. During acquisition mode, Coder Block 112 is caused to sequence through as many sets of 240 different codes delays as necessary to acquire the satellite signals from a particular space vehicle. That is, as many sets of 240 different delays are correlated in Correlator Block 110 to provide IQSQACCUM 116 with an appropriate correlation output whose power indicates that correlation has been achieved with that satellite. The process is then repeated for each satellite to be acquired. For convenience, all delays may be tested.

During reacquisition, a single set of 20 delays are correlated in Correlator Block 110 to determine if one such delay provides a peak value above a predetermined threshold to indicate that a correlation has been achieved and the satellite thereby reacquired. The reacquisition mode operates transparently within the tracking mode in that a set of 20 delays are correlated in Correlator Block 110. If tracking is maintained, the peak signal may migrate from a particular delay to the next adjacent delay but will be maintained within the current set of 20 delays being correlated. It is convenient to consider the delay producing the signal with the greatest magnitude as the prompt delay, producing the prompt correlation product. The signals produced by one more and one less delay then become the early and late correlation products which may be processed in a conventional manner to maintain lock with each satellite.

If the signal from the satellite is temporarily obscured or lost for any other reason, the then current set of 20 delays is correlated and searched for a peak of sufficient magnitude to indicate reacquisition. The Doppler and code values are continuously updated based upon the last available position information including velocity, and the correlations are performed, until the satellite signal is reacquired or sufficient time has elapsed so that the satellite signal is considered lost.

The operation and configuration of ASIC 102 will now be described in greater detail with regard to the in-phase or I signal path. The quadrature phase or Q signal path is identical and need not be separately described.

Within CACAPT 104, sample data 100 is applied at 37.33$f_0$ to I/Q splitter 106 to produce a 2 bit signal at 18.67$f_0$ which is further reduced to 2$f_0$ by Digital Filter 118 which operates by adding sets of 10, 9 and 9 samples which are summed, quantized, and then stored serially in 11 sample deep buffer 120. When 11 sample deep buffer 120 is filled, the data is transferred in a parallel fashion to an identical buffer, called parallel block 122, for Doppler rotation. Data is therefore transferred out of 11 sample deep buffer 120 when 11 samples are received, that is, at a chip rate of 1/11th of 2$f_0$ or approximately 0.18$f_0$. 11 sample deep buffer 120 operates as a serial to parallel converter while parallel block 122 operates as a parallel to serial converter. This results in 186 parallel transfers per msec.

Data is shifted out of parallel block 122 at 24$f_0$ to 12 channel Doppler Block 108 so that the Least Significant Bit or LSB of the serial converter, parallel block 122, is the output of CACAPT 104 in the form of CapIOut and CapQOut which are applied as CACAPT Data output 123 to 12 channel Doppler Block 108. The increase in chip rate from 2$f_0$ to 24$f_0$ provides an operating speed magnification of 12 as will be described below in greater detail.

Figure 6:
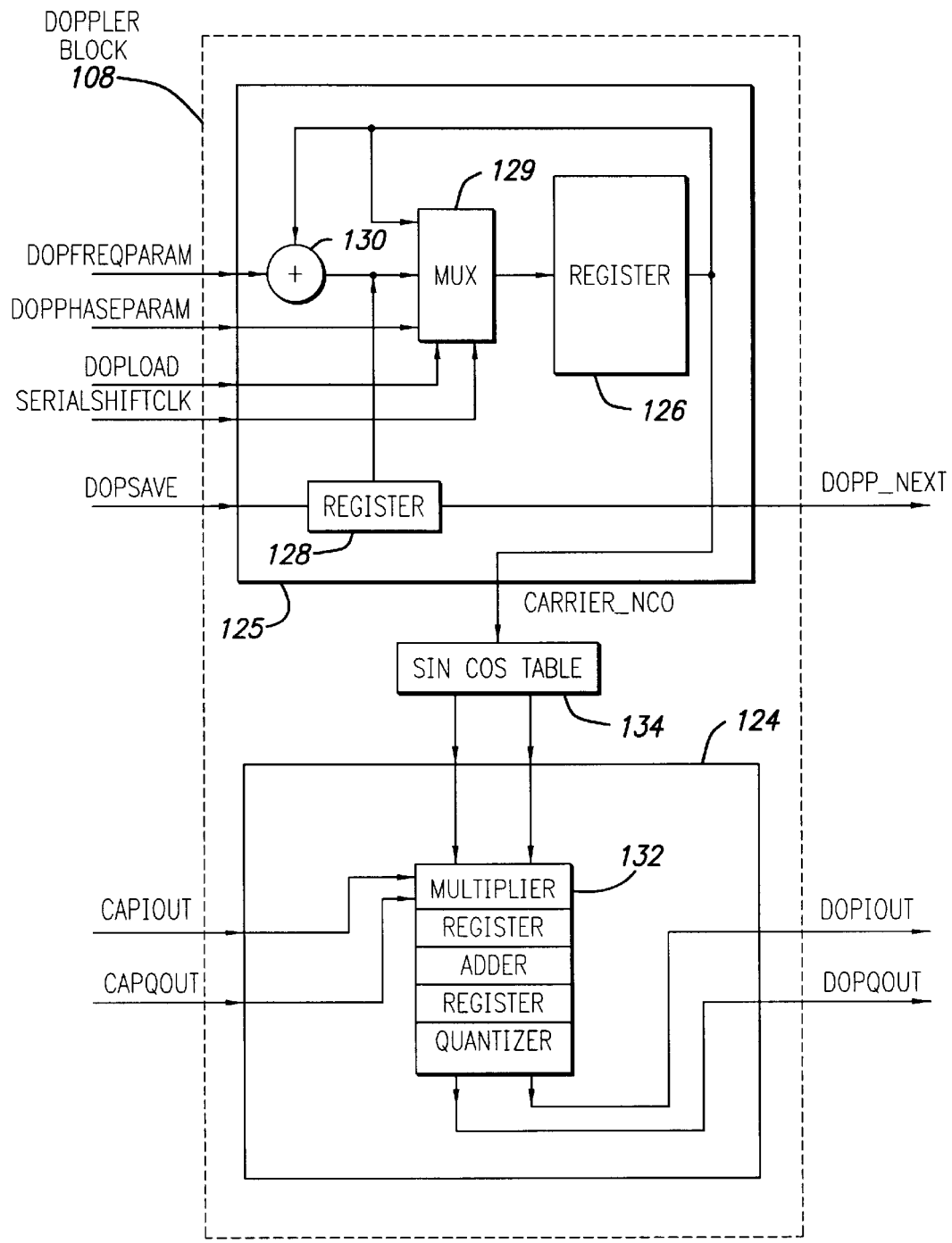
FIG. 6 is a functional block diagram of the Doppler Block of the GPS car navigation system shown in FIG. 1.

Referring now also to FIG. 6, 12 channel Doppler Block 108 is now described in greater detail. Doppler Block 108 receives satellite specific CACAPT Data output 123 including CapIOut and CapQOut from CACAPT 104 for storage in Doppler Register 124. Satellite or source specific predicted Doppler phase, after processing by Carrier Numerical Control Oscillator or NCO 125 and sine/cosine look-up table 134, is also applied to Doppler Register 124 where it is added to CapIOut and CapQOut for the same SV (or other source) to form dopIOut and dopQOut. Within Doppler Block 108, Carrier_NCO 125 operates at an effective rate of 2$f_0$ for each satellite channel because the data sample rate is 2$f_0$.

Figure 9:
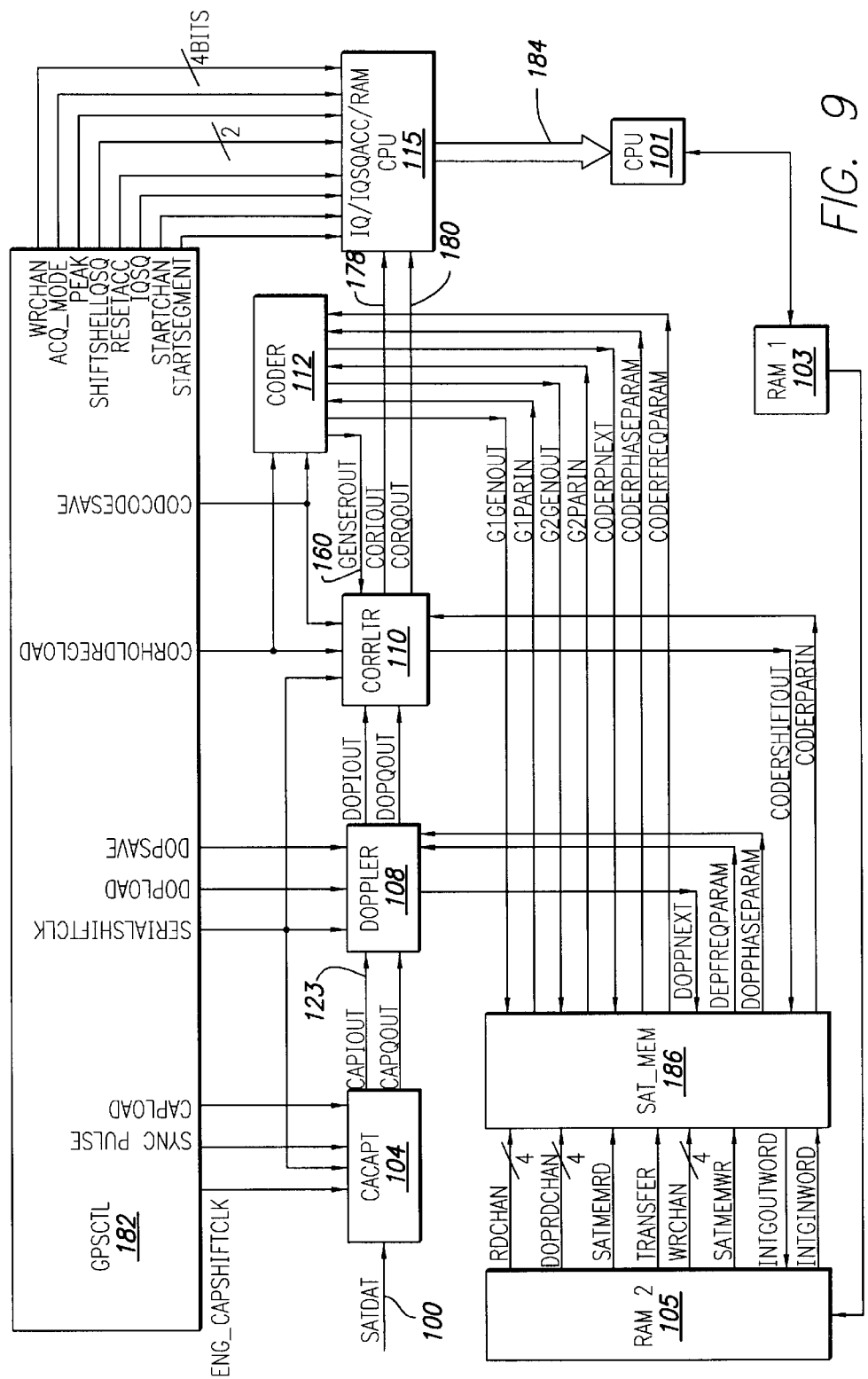
FIG. 9 is a function block diagram overview showing the interconnections between the Doppler, Code, Correlator and other blocks of the system described in FIG. 5.

For each SV, CPU 101 stores the satellite specific predicted carrier phase dopPhaseParam, and predicted carrier frequency dopFreqParam, in RAM R2 105. Sat_Mem 186 then transfers the dopPhaseParam and dopFreqParam as shown in FIG. 9 to Carrier Phase Register 126 and Carrier Phase Output Buffer 128, respectively, at each 1 msec boundary. In the drawings, the number of the first and last bit of the signal is provided in parenthesis, separated by a full colon, in accordance with current conventions. Therefore, dopFreqParam is a 24 bit digital value, the MSB of which is bit number 23 and the LSB of which is bit number 0. Adder 130 adds carrier phase to carrier frequency, derived from dopPhaseParam and dopFreqParam, to produce the current carrier phase value in Carrier Phase Register 126 shown as Carrier_NCO.

Figure 11:
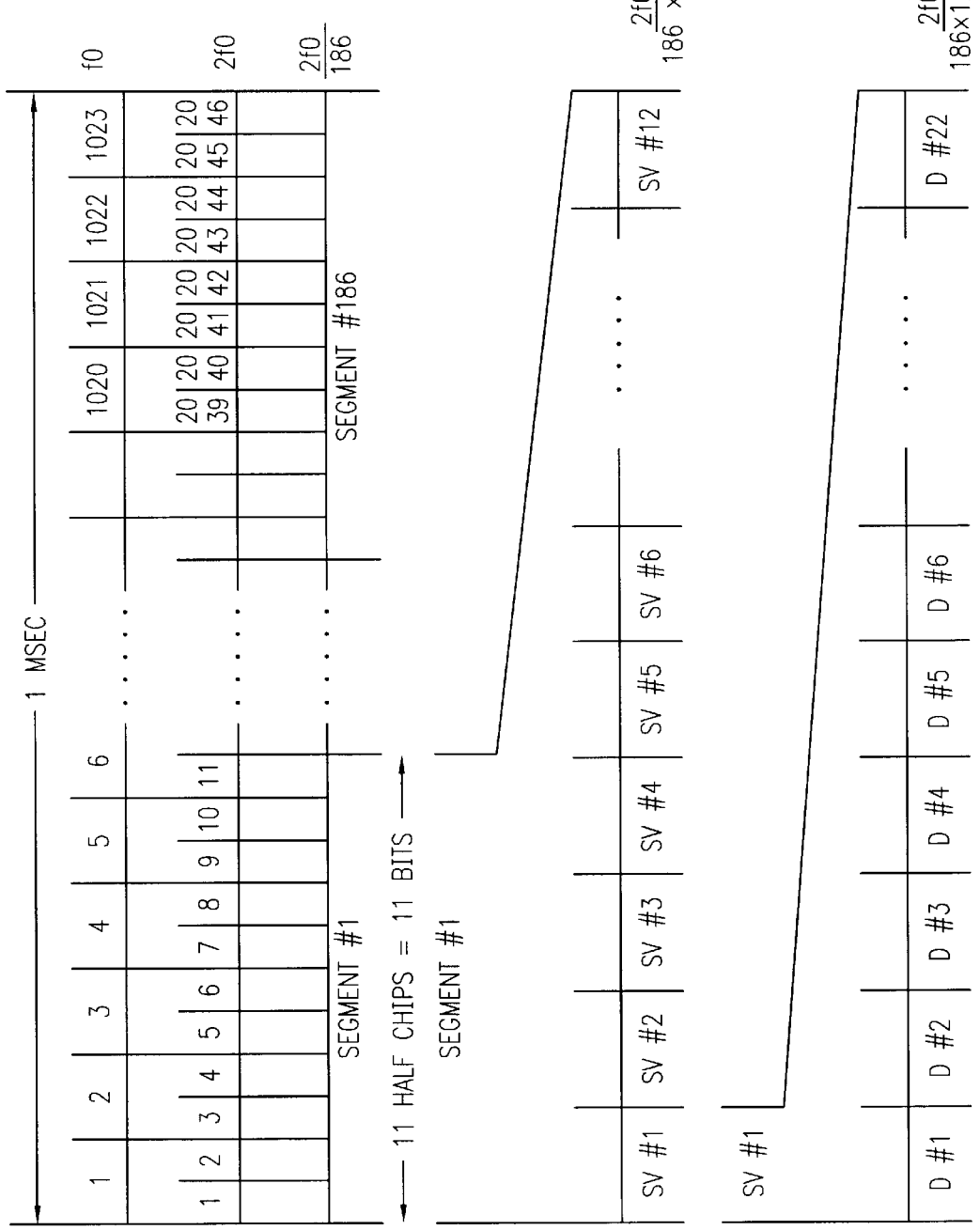
FIG. 11 is a series of exploded time segments illustrating the operation of the data path of the present invention.

The four Most Significant Bits or MSBs of Carrier_NCO in Carrier Phase Register 126 are applied to sine/cosine look-up table 134 which includes 24-bit registers for storing its output. The output of sine/cosine look-up table 134 is applied to Doppler Multiplier 132 in Doppler Register 124 for Doppler rotation of CACAPT Data output 123 (CapIOut and CapQOut) to produce rotated SV output signals dopIOut and dopQOut. Doppler Register 124 uses Doppler Multiplier 132, as well as four 4-bit registers, two adders, another pair of 5-bit registers and a quantizer to form dopIOut and dopQOut. Referring for a moment to FIG. 11, dopIOut and dopQOut are applied to parallel converter 166 and rotated SV output signal 127 is the output of serial to parallel converter 166 which is applied directly to 11 bit Holding Register 140.

During each segment of time, the beginning value for the Doppler phase of each SV is stored in RAM R2 105, retrieved therefrom by Doppler Block 108 for the rotation of the SV during that segment. At the end of each segment, the end value of Doppler phase is stored in RAM R2 105 for use as the beginning value for the next segment. Under the control of gpsCTl 182, Doppler phase value dopP_Next in Carrier Phase Output Buffer 128, saved at the end of each rotation for a particular SV by dopSave, is applied to Sat_Mem 186 for storage in RAM R2 105 for that SV, to be retrieved by Doppler Block 108 again during the next Doppler rotation of that SV in the following segment. The operation of Multiplexer Block 129 may be best understood from the description of the triple multiplexing of ASIC 102 associated with FIGS. 10 and 11.

Figure 7:
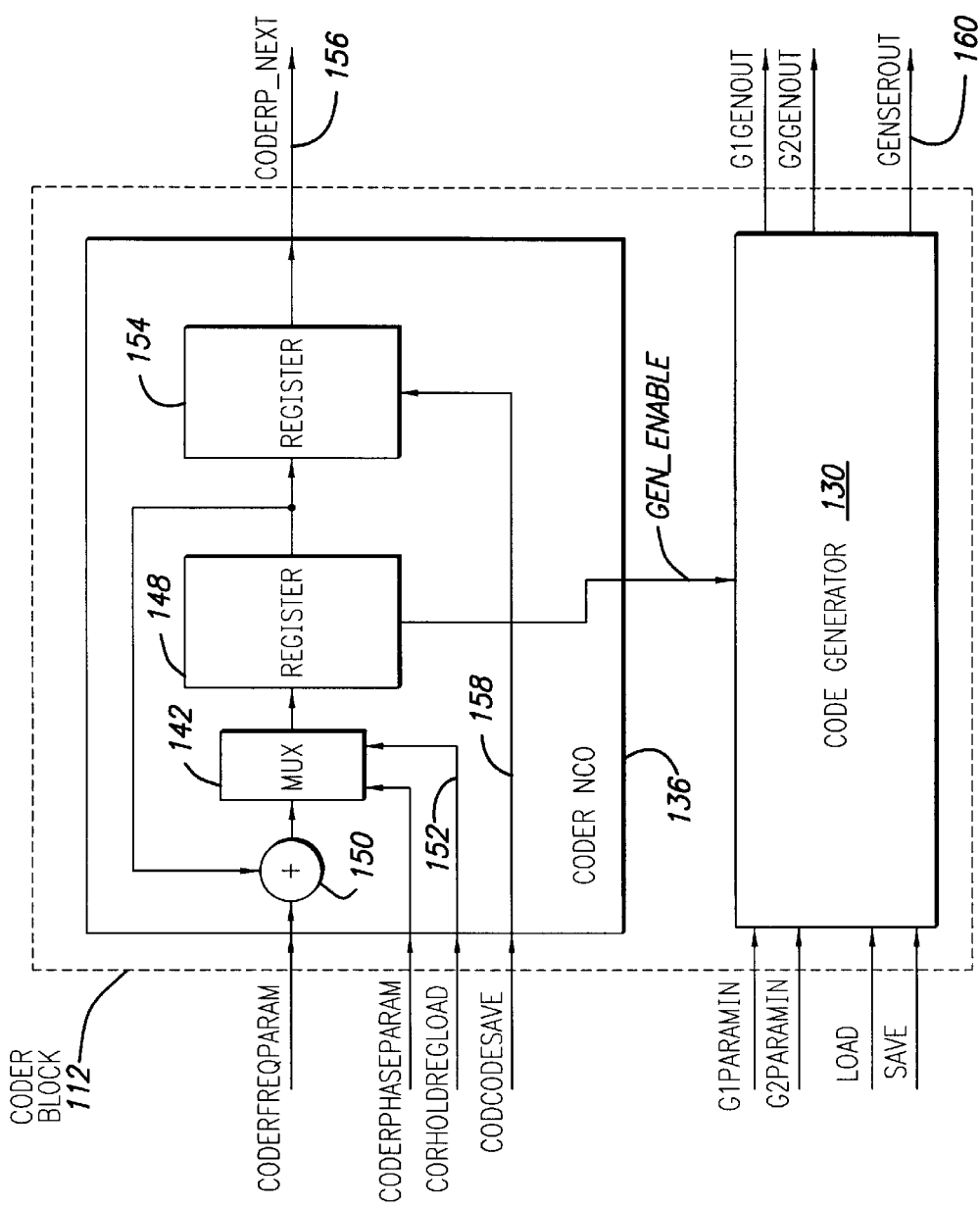
FIG. 7 is a functional block diagram of the Coder Block of the GPS car navigation system shown in FIG. 1.

Referring now also to FIG. 7, 12 channel Coder Block 112 includes Coder_NCO 136 and Code Generator 138. Coder_NCO 136, which is similar to Carrier_NCO 125 shown in FIG. 6, creates Gen_Enable whenever Phase Accumulator 148 overflows. Gen_Enable is the MSB of the output of Phase Accumulator 148 and is applied to Code Generator 138.

In particular, under the control of gpsCTl 182,Sat_Mem 186 applies the satellite specific 24 bit code frequency parameter, coderFreqParam, and the 24 bit satellite specific code phase parameter, codePhaseParam, at each 1 msec edge to Coder_NCO 136 from RAM R2 105. CoderFreqParam is added to codePhaseParam effectively at 4$f_0$ per channel in Phase Adder 150 even though codePhaseParam operates at 48$f_0$ during tracking and reacquisition. A pulse can be generated for Gen_Enable between 0 Hz and 4$f_0$ Hz. In order to generate Gen_Enable at 2$f_0$, the value of half the bits (23:0) of Phase Accumulator 148 must be loaded in as coderFreqParam.

The LSB of codePhaseParam represents 1/256th of a C/A code chip. CodePhaseParam initializes the contents of Phase Accumulator 148. Gen_Enable is generated whenever Phase Accumulator 148 overflows. Phase Accumulator 148 is a 25 bit register initialized by the value of codePhaseParam when corHoldRegLoad 152 from CPU 101 is active at each 1 msec edge when new data is written from CPU 101. The 24 LSBs of 25-bit Phase Accumulator 148 are then added to coderFreqParam in Phase Adder 150 and returned to Phase Accumulator 148. Phase Buffer Register 154 stores and buffers the contents of Phase Accumulator 148, to produce CoderPNext which is updated whenever codCodeSave 158 from gpsCtl 182 is active. CoderPNext is applied to Sat_Mem 186 for storage in RAM R2 105. The operation of multiplexer 142 may be best understood from the description below of the triple multiplexing of ASIC 102 provided with FIGS. 10 and 11.

Gen_Enable is applied to Code Generator 138 to cause a new code to be generated. C/A Codes parameters G1 and G2 are parallel loaded from RAM R2 105 by Sat_Mem 186 as g1ParIn and g2ParIn into Code Generator 138 to produce g1GenOut and g2GenOut which are returned to RAM R2 105 by Sat_Mem 186. The bit-0 of both G1 and G2 generators in Code Generator 138 are internally XOR=d and generate genSerOut 160 which is serially applied to 11 bit Code Shift Register 170 in Correlator Block 110, as shown in FIG. 5. Code Generator 138 generates the following C/A codes:

$$G1=1+X3+X10$$

$$G2=1+X2+X3+X6+X8+X9+X10.$$

The output of Code Shift Register 170 is applied to correlators 74, 11 bits at a time at $48f_0$ so that at least 20 code delays, separated by one half chip width, are correlated against each Doppler rotated sample from each SV. The increase in chip rate from $2f_0$ to $48f_0$ provides a magnification factor of 24 as will be described below in greater detail.

Values of G1 and G2 are be stored in RAM R2 105 during each segment after correlation with the Doppler rotated sample in correlators 74 for that SV so that they may then be retrieved by Coder Block 112 during the next time segment for correlation of the next 11 bit sample from the same SV.

Figure 8:
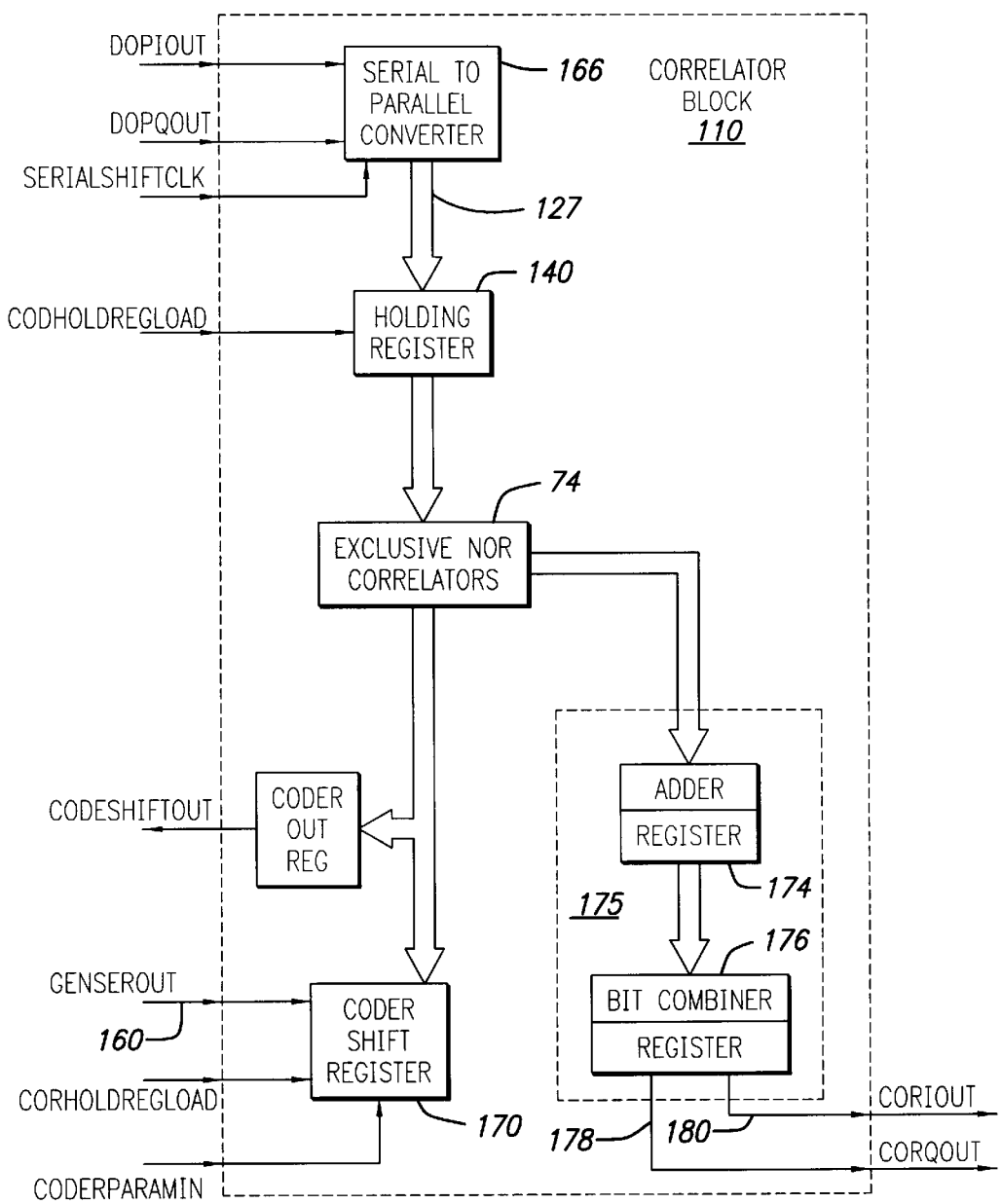
FIG. 8 is a functional block diagram of the Correlator Block of the GPS car navigation system shown in FIG. 1.

Referring now also to FIG. 8, Correlator Block 110 is shown in greater detail. DopIOut and dopQOut in the rotated SV output from Doppler Block 108 are applied to serial to parallel converter 166 which is then parallel loaded to Holding Register 140. GenSerOut 160 from Coder Block 112 is applied to Code Shift Register 170 in Correlator Block 110. These data sets represent the Doppler shifted data received from the SV, as well as the locally generated code for that SV, and are applied to Exclusive NOR gate correlator 74 for correlation under control of gpsCtl 182.

The output of correlator 74 is applied to Adder 174 and combined in Bit Combiner 176 to corIOut 178 and corQOut 180 which are applied to IQACCUM Block 114 and IQSQACCUM 116 shown in FIG. 5. Adder 174 and Bit Combiner 176 operate as a partial accumulator as indicated by accumulator 175 in FIG. 5.

Referring now also to FIG. 9, on overview of the operation of ASIC 102 is shown. A dedicated set of on-chip logic controls the operation of ASIC 102 and is identified herein as gpsctl 182. In particular, under the control of gpsctl 182, sample data 100 from the GPS satellites is applied to CACAPT 104 where it is separated and decimated into I and Q data streams to form CACAPT Data output 123. SV data 123 is rotated for the predicted Doppler shift of each SV to produce rotated SV output signals dopIOut and dopQOut which are correlated with genSerOut 160 from Coder Block 112 in correlators 74. CorIOut 178 and corQOut 180 from correlators 74 are accumulated in IQACCUM Block 114 and IQSQACCUM 116 to produce output 184 to CPU 101.

As will be further described below in greater detail, a portion of memory is used for Sat_Mem 186 which stores and provides the Doppler shift and code information required during multiplexing.

In operation, every millisecond is divided into 186 segments, each of which includes 264 clocks. Within these 264 clocks, 12 channels are processed with each channel taking 22 clocks to compute 22 different correlations or delays. Only 20 of these 22 correlations are stored and used for subsequent processing. For each channel, gpsCtl 182 controls the loading of Carrier_NCO 125 in Doppler Block 108 using dopLoad and dopSave. Similarly, gpsctl 182 controls the loading of Coder_NCO 136 in Coder Block 112 via corHoldRegLoad and corCodeSave. The flow of data through Correlator Block 110 is controlled with serialShiftClk, and also corHoldRegLoad and codCodeSave.

Control signals are applied to IQACCUM Block 114 and IQSQACCUM 116 for each channel and include startsegment, startChan, resetAcc, peak, iqsq, wrchan, ShiftSelIqSq and acq_mode. Within each segment, gpsCtl 182 provides the periodic signals eng_capShiftClk, capLoad, syncpulse, serialShiftClk to CACAPT 104 to repackage incoming satellite data samples into groups of 11 half chip samples.

All accesses initiated by gpsCtl 182 are processed by Sat_Mem 186 to generate read/write control and address signals for RAM R1 103 and RAM R2 105. GpsCtl 182 controls the flow of data through all data paths together with Sat_Mem 186 and manages the access of channel parameters stored in RAM R1 103 and RAM R2 105. RAM R1 103 is written to by the user to define the channel parameters that will be loaded to RAM R2 105 at the end of the corresponding integration or accumulation time. RAM R2 105 is used by the data path as a scratchpad to store the intermediate values of the various channel parameters during processing.

Data read out of RAM R2 105 is sent to the various parameter registers in Doppler Block 108, Coder Block 112, Correlator Block 110 and gpsCtl 182 under the control of Sat_Mem 186. Data from these blocks and RAM1 190 are multiplexed at the input to the write port of RAM R2 105. RAM R1 103 is a 16×108 asynchronous dual port ram used for the parameters for all 12 channels while RAM2 192 is another 16×108 asynchronous dual port ram used for storing intermediate values of the satellite parameters during processing, while switching from one channel to the next.

Figure 10:
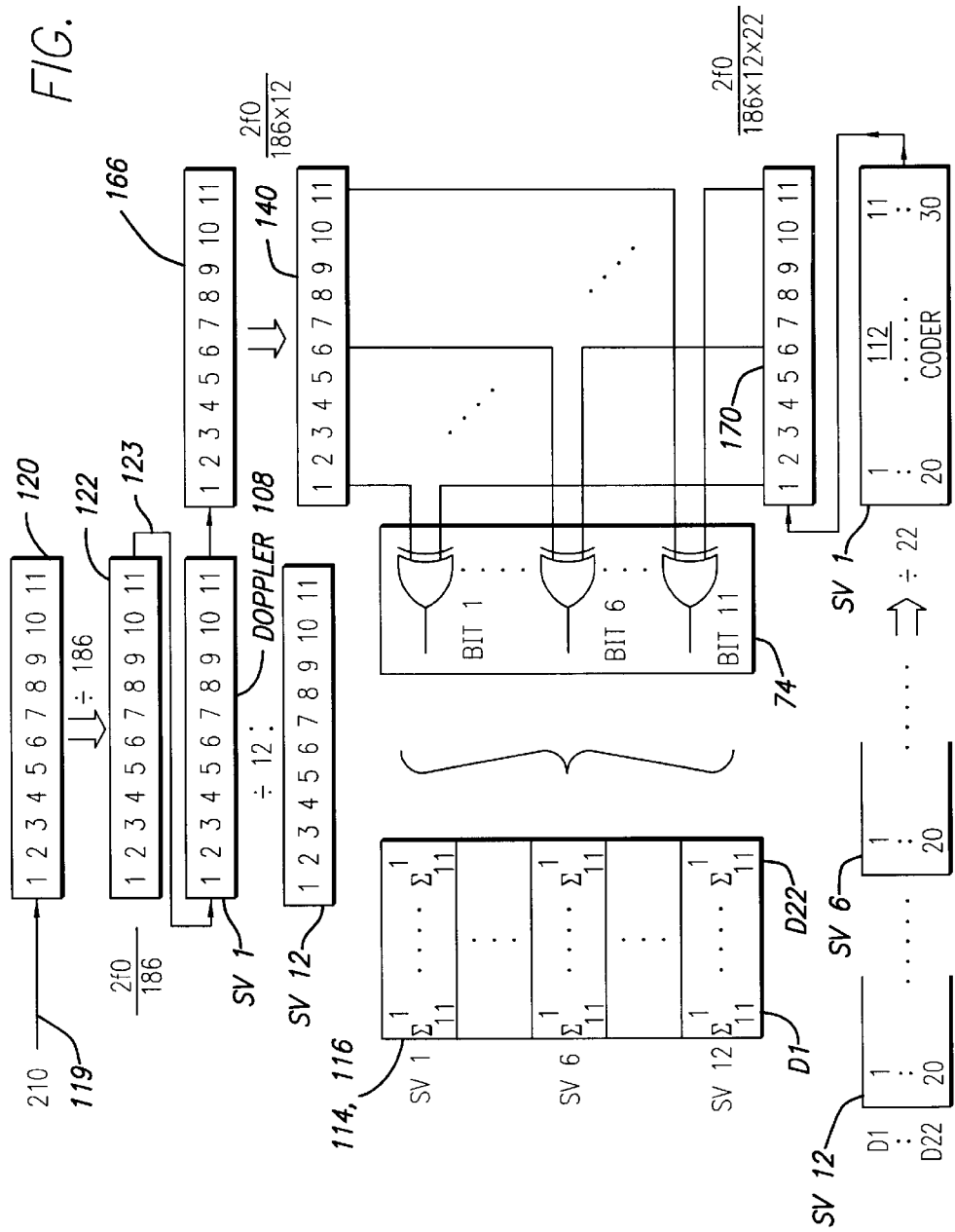
FIG. 10 is a block diagram of the operation of the system, shown in FIGS. 5 and 9, illustrating the data path of the present invention.

Referring now to FIG. 10, the system of the present invention includes a multiplexed data path in order to reduce the size and complexity of ASIC 102 on which the majority of the parts of the system can be provided. Conventional receiver designs have multiplexed a single set of correlators for use for each of the separate channels in which an SV is tracked in order to reduce the number of correlators required. The use of the system of the present invention reduces the million or more gates that would be required-for a conventional configuration down to a manageable number, on the order of about less than 100,000.

In accordance with the present invention, in addition to multiplexing the satellite channels in a manner in which no data is lost, the code delay correlations are also multiplexed. That is, conventional receivers use two or three correlators to provide early, late and/or prompt correlations for each SV. The present invention multiplexes a plurality of code delays in order to provide far more code delay correlations than have been available in conventional systems without substantially multiplying the hardware, or chip area on ASIC 102 required by the number of gates used.

The multiplexing of code delays permits the wide capture window described above with regard to FIGS. 3 and 4 that permits rapid SV reacquisition. In particular, 20 delays such as ½ chip delays are provided and constantly monitored for each SV so that GPS data can be acquired even during brief glimpses of the SV, for example, when car 10 is in intersection 22 as shown in FIG. 1. The SV can be reacquired and useful data obtained because the modeling of the vehicle's position on roadway 12 is sufficiently accurate to keep the predicted code and Doppler values for a previous acquired and currently obscured SV within a window of ±10 half chip code delays. In this way, data obtained during reacquisition can be used directly as GPS data. That is, the reacquisition mode is transparent to the tracking mode. The GPS data is acquired whenever available without substantial lost time for reacquisition.

Further, the operation of satellite tracking is itself multiplexed for each set of data for all 12 channels in order to further substantially reduce the ASIC gate count. That is, only a small portion of the bits in the C/A code is processed at one time for all 12 SVs. In order to digitally process the signals received, the digital representations of these signals must be processed in registers and buffers capable of storing the digital data. The C/A code contains 1023 bits in each repetition which lasts 1 msec. If all 1023 bits were to be processed at once, registers 1023 bits wide would be required. Such registers would be expensive in cost and gate count and quite cumbersome. In accordance with the third level of multiplexing used in the triply multiplexed receiver configuration of the present invention, a smaller register is multiplexed to handle different portions of the 1023 bits of the C/A code. This means the smaller register is used many times during each 1 msec repetition of the C/A code to process enough smaller samples of the data received so that within each msec all 1023 bits can be processed.

In the preferred embodiment described above particularly in FIGS. 3 to 9, a configuration using 11 bits registers was used so that each register is used 186 times per msec to process all 1023 bits of a C/A code repetition. Each $1/186$th of a msec is called a segment. The tracking of each SV is therefore multiplexed 186 times by processing the 11 bits in each register during each segment. In addition, in the preferred embodiment, 12 channels are used to track a maximum of 12 SVs. This requires that each 11 bit segment is multiplexed 12 times during that segment to apply a Doppler rotation for each SV.

Further, each channel is further multiplexed by a factor of 22 to provide a substantial plurality of different code delays. This requires that the Doppler rotated sample for each SV is correlated 22 times with different C/A Code delays before the Doppler rotated sample for the next channel is produced. In this manner, 22 different code phases may be tested for each of 12 SV during each of 186 segments to provide real time data with only 11 bit wide registers by processing each register 186 times per msec.

It is important to note that the processing of the present invention occurs during a particular segment, i.e. a $1/186$th of a repetition of the C/A code, during the length of time required for the segment to be collected. In this optimized manner, no data is lost during tracking or reacquisition or switching between these states because the data being processed in any particular segment is at most 11 half chips delays old.

Referring now to FIGS. 10 and 11, the output of Digital Filter 118 shown in FIG. 5 is sample data stream 119 at $2f_0$. The chip rate of the C/A modulation of the signals 100 from the SVs is at $f_0$. In order to avoid loss of any data, the SV signals must be sampled at least at their Nyquist rate, that is, at twice the chip rate of the modulation of interest which is $2f_0$. Although sample data stream 119 can be operated at a higher chip rate than the Nyquist rate, which is twice the chip rate, there is no advantage in doing so.

Sample data stream 119 is therefore a series of samples of the digitized and filtered SV data at twice the chip rate of the C/A code, that is, each sample in sample data stream 119 has a width equal to one half of a C/A code chip. The number of bits in each msec or cycle of code in sample data stream 119 is twice the number of bits in the modulation, i.e. 2046 bits each representing one half of a C/A code chip. In accordance with the multiplexing scheme of the preferred embodiment being disclosed, the data is processed in 11 bit segments, and sample data stream 119 is therefore applied serially to 11 bit (10:0) register value buffer 120. The time required to serially store 11 bits out of a total of 2046 bits in the $2f_0$ data stream is $1\div(2046\div11=186)$ or $1/186$th of a msec.

During the time the first set of 11 sample bits are being stored in 11 sample deep buffer 120, no bits are available for processing. After the first 11 sample bits are serially received and serially stored, the 11 sample bits are transferred in parallel to parallel block 122. This parallel operation therefore occurs every $1/186$th of a msec or at a rate of approximately $0.18f_0$. Each $1/186$th of a msec is called a time segment or segment and is the unit of processing for most of the operations. The 1023 chip C/A code of each of the satellites in the composite signal received is processed in 11 half chip bits. Dividing the msec repetition rate of the C/A code into 186 time segments multiplexes each of the 11 bit registers by a multiplexing factor of 186.

CACAPT Data output 123 from parallel block 122 is processed in Doppler Block 108 at a much faster chip rate, for example at $24f_0$. That is, the 11 bits of sample data in each segment of time is multiplexed by a factor of 12 to permit 12 different operations to be performed to that set of 11 bits of data. In particular, in Doppler Block 108, CapIOut and CapQout of CACAPT Data output 123 are multiplied in Doppler Register 124 by twelve different Doppler shifts so that within each segment twelve different Doppler rotations are performed.

Each different Doppler shift represents the predicted Doppler rotation required for each of the maximum of 12 different SVs that can be tracked. The increase in processing chip rate from $2f_0$ to $24f_0$ multiplexes the processing for each of 12 channels of data. It is important to note that the multiplexing to permit one channel to operate as 12 multiplexed or virtual channels each representing a different SV is applied only after the input signals are multiplexed, that is, broken into 186 time segments each including 11 half chip width bits. In this way, the multiplexing for 12 channels or satellites is easily accomplished with relatively inexpensive 11 bit registers without loss of time or data. The selection of the number of sampling to be an integer division of the number of code bits per period is important to achieve these goals. Multiplexer Block 129 in Carrier_NCO 125 controls the timing of this multiplexing under the direction of gpsCtl 182.

The output of Doppler Block 108, signals dopIOut and dopQOut, are applied to serial to parallel converter 166 within Correlator Block 110. Each rotated SV output signal 127 represents the rotated signal from a single SV and 12 such rotated SV output signals 127 are produced in each segment of time.

Rotated SV output signal 127 is loaded in parallel fashion into Holding Register 140 in Correlator Block 110. The input to Exclusive NOR gate correlator 74 is therefore an 11 bit wide signal which is retained for $1/12$th of a time segment as one input to Exclusive NOR gate correlator 74.

Correlator 74 is a series of 11 separate one bit correlators which all operate in parallel. One input is rotated SV output signal 127 while the other 11 bit input is provided by 11 one bit genSerOut 160 output bits from Coder Block 112. During the $1/12$ of a time segment provided for operation on the rotated SV output signal 127 for a particular satellite, the code for that SV is produced serially by Code Generator 138 and applied to Code Shift Register 170.

At the beginning of the correlation for a particular channel, 11 bits of the code for that SV have been shifted into Code Shift Register 170 and are available therein for correlation. Every $1/22$nd of a channel (that is, a $1/12$ of a segment) each of the 11 bits in Code Shift Register 170 are correlated in one of 11 one bit exclusive Nor gates in Exclusive NOR gate correlator 74. This produces 11 correlator output bits, the sum of which indicates the magnitude of the correlation between the rotated SV output signal 127 and that code phase. These 11 correlation sums produced in parallel are summed in parallel and stored in the first of 22 summers related to that SV in Accumulator Block 115.

During the next or second 1/22nd of a channel, Code Generator 138 produces the next bit for the C/A code for that SV. This next bit is applied serially to Code Shift Register 170. At this time, 10 bits from the first correlation remain in Code Shift Register 170 and together with the newest bit form another 11 bit sample of the expected code for that SV, delayed from the previous 11 bit sample by the time required to generate 1 bit, that is, one half chip width at the rate code is produced, $48f_0$. The second sample is therefore a one half chip delayed version of the code, delayed one half chip width from the previous 11 bit samples. It is important to note that the two 11 bit code samples just described differ only in that a new bit was shifted in at one end of the register to shift out the MSB at the other end of the register.

The 11 bit correlation product of the same rotated SV output signal 127 and the second 11 bit sample of code is then stored in the second of the 22 summers related to that SV in Accumulator Block 115. Thereafter, the remaining 20 serial shifts of the genSerOut 160 from Code Generator 138 are correlated against the same rotated SV output signal 127 to produce 20 more sums of 11 bit correlations for storage in Accumulator Block 115 for that SV. The result is that 22 values are then available within Accumulator Block 115 for processing, each value is a measure of the correlation of the signals from one SV with 22 different code phases or delays, each separated by one half chip width.

During the next 1/12 of a time segment, that is, during the processing of the second multiplexed channel, the rotated SV output signal 127 for the next SV, is applied to Holding Register 140 for correlation with 22 different one half chip delays of the code generated for that satellite. At the end of a segment, Accumulator Block 115 includes a matrix of 12 by 20 different sums. In one implementation of the present inventions it has been found to be convenient to save only 20 out of the 22 possible code delay correlation results. The 12 rows of 20 sums represent the measure of correlation for each of the 12 SVs at 20 code phases or delays.

In summary, the data path for the present invention is triply multiplexed in that (a) each msec, which represents 1023 bits of C/A code, is sliced into 186 to form the 186 segments in a msec of sample so that only 11 half chip wide sample bits are processed at one time;

(b) each segment is then multiplexed by 12 so that each such 11 bit sample is rotated for twelve different sources;

(c) the rotated 11 bit sample for each source is correlated against 20 sets of different code delays for that source to multiplex within each channel by 20; and (d) the sum of the correlation products for each delay in each channel are then summed to produce the accumulated correlation output.

Although 22 different delays are available, it is convenient to use 20 such delays, or code phase theories for testing the rotated satellite signal. The correlation product having the greatest magnitude for each channel after accumulation, that is, the largest of the 20 sums of 11 bits stored in Accumulator Block 115 for each channel may then be detected by its magnitude, for example by a peak detector, to determine which delay theory is the most accurate. The peak sum represents the on-time or prompt correlation for that SV.

Turning now specifically to FIG. 11, the triple multiplexing scheme of the present invention may easily be understood by looking at the slices of time resulting from each of the multiplexing operations. Within each msec, the C/A code for each particular satellite has 1023 bits. In order to preserve all necessary information, the satellite signals are sampled, in a digital composite of signals from all satellites, at the Nyquist rate at $2f_0$ to produce 2046 half chip wide sample bits.

Each sequential set of eleven sample bits are processed together as a segment of time, the length of which is equal to 1/(2046÷11) of a msec, i.e. one 1/186th of a msec. After processing of the 186th segment in a msec all necessary data has been extracted and the 11 bit sample for the next segment is available. Although the partial sums accumulated over each msec in Accumulator Block 115 may only be evaluated at the end of a msec, no data is lost and the results are only 1 segment late. That is, since it takes 1 segment to fill 11 sample deep buffer 120 and transfer the 11 bit sample to parallel block 122, the data from the first 11 bit sample is being processed while the data for the second 11 bit sample is being collected. Even if the system operated for a year, the sampled being processed to provide position information is still only one time segment old.

The 11 bits of each segment are multiplexed for each SV by being time division multiplexed during Doppler rotation. That is, the 11 bit sample of segment 1 is used to provide 12 different Doppler shifted outputs so that a single 11 bit segment sample is used 12 times to produce 12 different satellite specific Doppler rotated versions, assuming all 12 satellites are in view or being modeled. The operations for one channel then require one twelfth of a segment. It is critical to note that each segment only produces a partial result and that the 12 partial results during each segment must be summed at the end of each msec to provide valid output data.

Each of the operations on one particular channel in a segment are time division multiplexed by a factor of 22 so that 22 different code delays for that partial sum for that satellite can be tested. The peak sum of these 22 correlations can however be detected by magnitude immediately if necessary to select the most likely delay for that channel. In the present embodiment, the information for that channel is only valid once per msec when summed or accumulated so that there may not be a substantial advantage in peak detected with a particular segment. In some GPS applications and in other spread spectrum applications, such as wireless communications, it may be desirable if strong signals are present to accumulate and transfer the sum of the accumulations for each source from R3 to R4 more often than once per code repetition rate. The time required to evaluate a particular code phase delay or theory is only 1/22nd of the time required per channel per segment or 1/22nd of 1/12 of 1/186th of a msec. This speed of operation is more easily achieved because the 11 one bit correlations required are produced in parallel. Similarly, the speed of generation of the different code delays for a particular SV is more easily accomplished in accordance with the present invention because each 11 bit code delay sample is automatically produced when each single new bit, i.e. each new genSerOut 160, is shifted into Code Shift Register 170.

The selection of the magnitudes or multiplexing factors used in each level of multiplexing is not arbitrary. The larger the number of segments, the smaller the required size or depth of the registers need for each sample. By using a code repetition multiplexing factor of 186, that is, by dividing the 2046 bits of a $2f_0$ by 186, only 11 sample bit, need to be evaluated at a time.

The number of required channels is bounded pragmatically by the fact that at least 4 SVs must be in view at the same time to determine position accurately in three dimensions. Time is the fourth unknown which must be determined along with each of the three dimensions although provisions for estimating, modeling and/or updating the position information as described above so that position information may be accurately provided even during periods when less than 4 satellites are concurrently in view.

The constellation of 24 NAVSTAR satellites in use are arranged to cover the earth so that a maximum of 12 such satellites may be in view at any one location at any particular time. The maximum number of pragmatically useful channels is, for this reason, no less than about 12 channels. The selected channel multiplexing factor used in the channel level of multiplexing in the embodiment shown herein is therefore a factor of 12.

The number of different code delays is bounded at the low end by an absolute minimum of 1 so that if the exact delay can somehow be maintained, the only necessary correlation would be the on-time or prompt correlation. Conventional GPS receiver systems use at least 2 or 3 different code delays so that conventional tracking techniques, for example those which use early, prompt and late correlations to center the prompt correlation within ±1 delay, may be employed.

In accordance with the present invention, a substantially greater number of different code delays, or delay theories, are tested so that fast reacquisition may be accomplished as described above with regard to FIGS. 3 and 4. Although for the particular preferred embodiment described herein, it was determined that a total of 20 different delays, each separated in time by one half the width of a C/A code chip, i.e. ½ of $\frac{1}{2046}$ of one msec, a code delay multiplexing factor of 22 was selected because the relationship between each of the 3 multiplexing factors is also important.

The product of the three multiplexing factors, code repetition multiplexing factor, channel multiplexing factor and code delay multiplexing factor should optimally be an even integer multiple of the number of bits in each repetition of the spread spectrum modulation. An even integer multiple is required because samples must be taken at twice the chip rate, i.e. at the Nyquist rate, in order to avoid data loss from sampling at a slower rate. Although multiplexing factors can be used successfully even if the product is not exactly equal to an even integer multiple, data loss or unnecessary complexity and costs may result.

In the particular embodiment shown, the spread spectrum code of interest is the C/A code, each repetition of which includes 1023 bits. In accordance with the triple multiplexing product rule discussed above, the product of the three multiplexing factors must equal an even integer multiple of 1023, such as 2046. In the described embodiment, the code repetition multiplexing factor is 186, the channel multiplexing factor is 12 and the code delay multiplexing factor is 22. The product of 186 multiplied by 12 and then by 22 is 49104 which, when divided by 1023, equals 48. 48 is an even integer and therefore the particular set of multiplexing factors used in the present invention provides one of several optimized systems.

The reason this multiplexing factor product rule works well in a tri-level multiplexing configuration for C/A code is that there are three prime factors in 1023. That is, 1023 is the product of three prime numbers, 31, 11 and 3. Each of the three multiplexing factors is evenly divisible by one of these prime numbers. For example, 186 is divisible by 31 six times, 12 is divisible by 3 four times and 22 is divisible by 11 twice.

Using each prime factor of the number of bits in the sampled bit rate in one of the multiplexing factors yields two or more different families of multiplexing configurations for C/A code spread spectrum receivers. In the first family, if 11 channels are desired, then either the code repetition multiplexing factor or the channel multiplexing factor would have to be divisible by 31. Although it may be desirable in certain applications to use 31 or 62 different code delays, there is a substantial advantage in making the code repetition multiplexing factor as large as possible. This reduces the number of bits required to be saved and processed in each segment. By selecting the code repetition multiplexing factor to be a multiple of 31, the number of delays actually used can be more easily controlled because the code delay multiplexing factor could be any multiple of 3.

In the other convenient family, 6, 9, 12, 15 or 18 satellite channels are desired so that the channel multiplexing factor is an integral multiple of 3. This permits the code delay multiplexing factor to be a factor of 11 while the code repetition multiplexing factor is a factor of 31. The particular embodiment described in the specification above is in this family.

Another constraint on the selection of multiplexing factors is the speed of operation of the lowest level of multiplexing. In the embodiment disclosed, the third level of multiplexing operates at $48f_0$. The clock speed of the hardware implementation must be sufficient to permit operation at this speed. As faster and faster on chip components are developed, higher clock speeds may be used to accomplish the highest speed processing and larger multiples may be used. For example, with components in the high speed processing sections such as Correlator Block 110 capable of operation at higher rates at multiples of $f_0$, such as at $96f_0$, the code repetition multiplexing factor could be doubled to produce 24 channels with 20 delays or taps or 12 channels with 40 delays or taps or 11 channels with 6 bits and 22 taps.

The system configuration may also be viewed from the standpoint of a time or speed magnification. Operation at the third multiplexing level at $48f_0$ is 24 times faster than the chip rate of the $2f_0$ sample being processed. This amplification factor of 24 permits a hardware multiplexing or gate compression factor of 24. The number of gates on ASIC 102, or other devices for implementation the present invention, is reduced essentially in direct proportion to the magnification factor. All other factors being equal, the surface area of a chip operated at $48f_0$ is on the order of ¹⁄₂₄th of the surface area that would be required to operate at $2f_0$. Similarly, an increase in the magnification factor to 96 would permit a reduction in the required chip surface real estate required on the order of almost half.

The particular embodiment of the multiple level multiplexing spread spectrum receiver of the present invention which has been disclosed above is a GPS receiver. The same invention can be used for other spread spectrum signals such as wireless telephone signals with due consideration for the selections of multiplexing factors based on the bit rate of the spread spectrum code used and the environmental factors applicable to that application. The environmental factors for the present configuration, such as the pragmatic constraints on the number of channels and code phases, have been described above.

Figure 12:
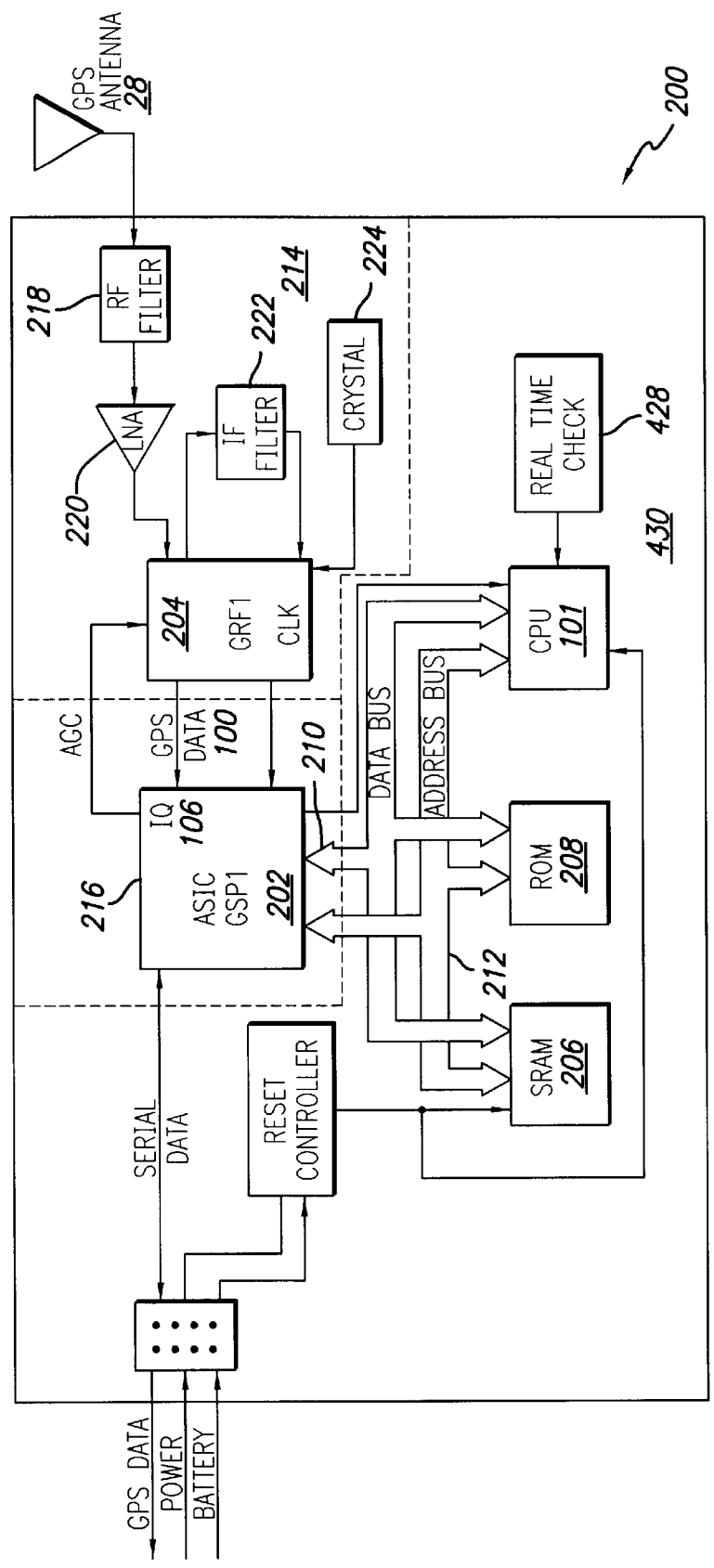
FIG. 12 is a block diagram overview of a GPS receiver system illustrating a complete receiver system according to the present invention including a more detailed view of the satellite receiver section shown in FIG. 2.

Referring now to FIG. 12, a block diagram overview of a GPS receiver system 200 including a preferred embodiment of the digital signal processing chip 102 described above, ASIC GSP1 202, and a radio frequency chip, GRF1 204, combined with other components to form a complete receiver system according to the present invention.

Associated with ASIC GSP1 202 are SRAM 206, ROM 208 and CPU 101, interconnected by data and address busses 210 and 212 to provide the functions of RAM R1 103, RAM R2 105 and Sat_Mem 186 and other required functions described above with regard, for example, to FIG. 5.

GRF1 204 is including within RF processing subsystem 214 which received satellite signals from GPS antenna 28 and provides sample or GPS data 100 to ASIC GSP1 202 which returns an automatic RF gain control signal, AGC 216, back to GRF1 204. Associated with GRF1 204 in RF processing subsystem 214 are RF filter 218 which applies the signals from GPS antenna 28 to low noise amplifier LNA 220 to output of which is applied to GRF1 204. In addition, GRF1 204 uses an outboard filter, IF FILTER 222 as well as crystal 224. It is important to note that IF FILTER 222 may be a low cost, external 2-pole LC (inductance-capacitance) type intermediate or IF filter, rather than a more expensive and complex 5 or 6 pole filter for the following reasons. GPS receiver system 200 uses a relatively wide IF band followed by a decimator or digital filter, Digital Filter 118, as shown for example in CACAPT 104 in FIG. 5.

In particular, the output of LNA 220 is processed by GRF1 204 using IF FILTER 222 to produce GPS data 100 which is applied to CACAPT 104 in ASIC GSP1 202. Within ASIC GSP1 202, GPS data 100 is separated into in phase and quadrature phase I and Q signals in I/Q splitter 106. The I signals are then applied to Digital Filter 118 and the Q signals are processed in the same manner as shown in FIG. 5 and described above.

Figure 15:
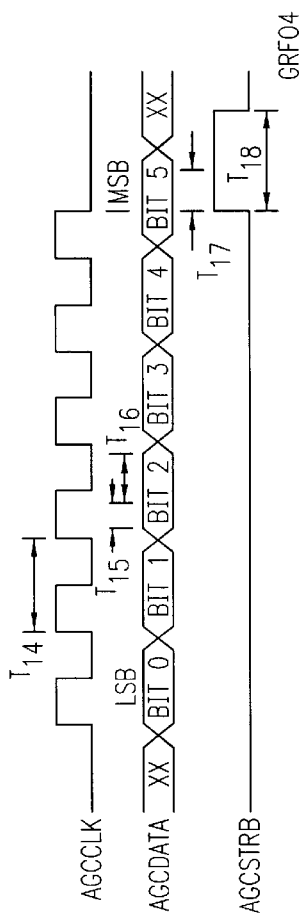
FIG. 15 is a timing diagram of the AGC interface.
Figure 16:
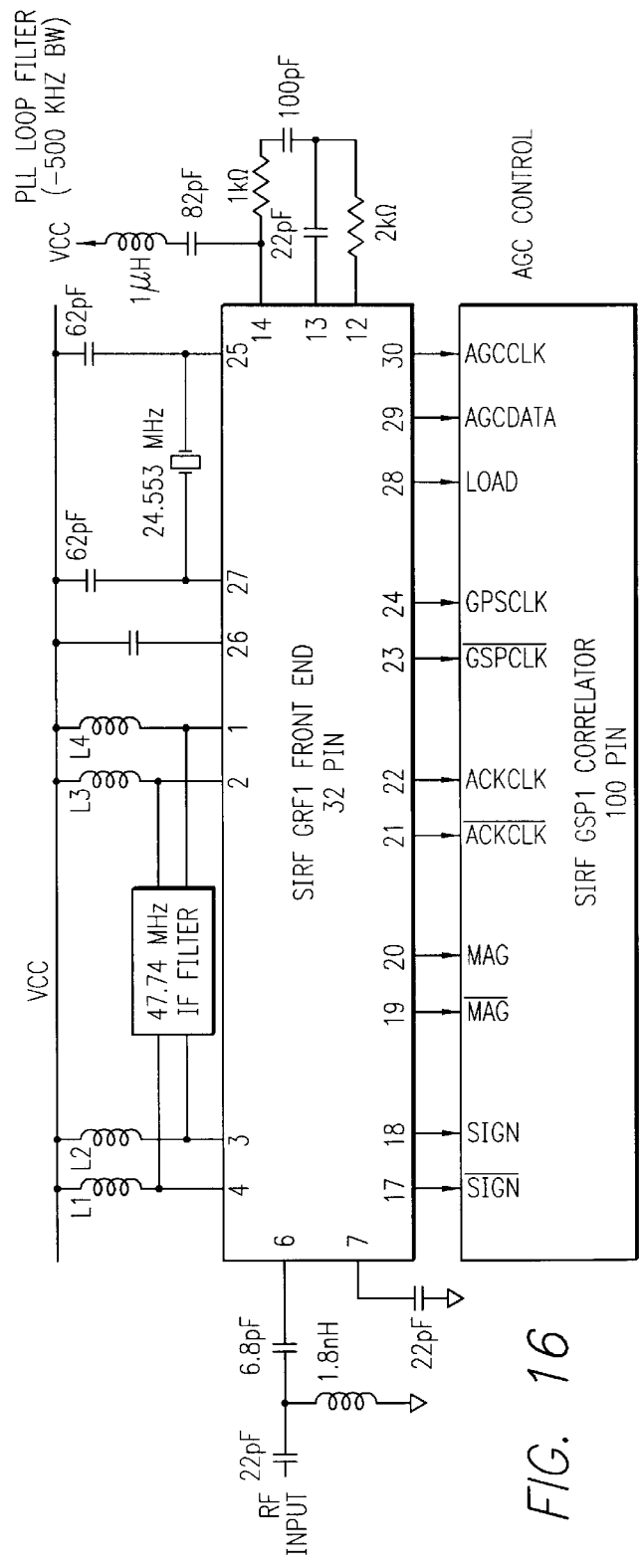
FIG. 16 is an connection diagram showing a preferred interconnection between ASIC GSP1 202, GRF1 204 and the related components.

FIG. 13 is a block diagram description of GRF1 204 and FIG. 14 is a pin out of GRF1 204. FIG. 15 is a timing diagram of the AGC interface. FIG. 16 provides additional details of a preferred embodiment of GPS receiver system 200, specifically the interconnections between ASIC GSP1 202 and GRF1 204 as well as the associated circuitry.

Referring now to FIGS. 13 through 16, the SiRFstar™ embodiment of GPS receiver system 200 may be described as follows:

| | |
|---|---|
| $ Front End for SiRFstar Architecture | $ Cost Effective MMIC Integration |
| SnapLock ™ 100 ms Reacquisition Oscillator | On-Chip VCO and Reference |
| SingleSat ™ Navigation Minimum Startup Time | Low Cost External 2-Pole LC IF Filter |
| | Single-Stage L1 to IF Downconversion |
| | External 25 ppm Reference Crystal |
| $ Seamless Interface | $ On-Chip 2-Bit A/D |
| Direct-Connect to GSP1 | Improved Weak Signal Tracking |
| Standard 3 or 5 V Supply | Improved Jam Immunity |
| Compatible with Standard Active Antennas | |

The SiRFstar GPS Architecture is designed to meet the demanding needs of mainstream consumer GPS products. The combination of the SiRFstar GSP1 signal processing engine, the SiRFstar GRF1 RF front-end and SiRFstar GSW1 software provides a powerful, cost effective GPS solution for a wide variety of products. SiRFstar-unique 100 ms SnapLock capabilities combined with the 12 channel all-in-view tracking provides maximum availability of GPS satellite measurements. The SingleSat navigation mode is able to use these measurements to produce GPS position updates even in the harshest, limited visibility urban canyons. Dual multipath rejection scheme improves position accuracy in these canyons. True 2-bit signal processing enables FoliageLock™ mode to acquire and track at lower signal levels for operation even under dense foliage.

The high performance firmware that accompanies the chipset takes full advantage of the SiRFstar hardware capabilities to provide a complete solution to our customers. The software is modular in design and portable across various processors and operating systems to allow fast time to market and maximum flexibility of design decisions for adding GPS capability to any product.

Chip Description

The GRF1 is a complete front-end frequency converter for Global Positioning System (GPS) receivers. The state-of-the-art design combines a Low Noise Amplifier (LNA), mixer, 1527.68 MHz Phase Locked Loop (PLL) synthesizer, on-chip frequency reference, IF stage with AGC, 2-bit A/D converter and control logic to perform the conversion from RF to digital outputs. The GRF1 receives the 1575.42 MHz signal transmitted by GPS satellites and converts the signal to 47.74 MHz PECL level complementary digital signals which can be processed by the GSP1 signal processor chip. The 2-bit interface provides superior tracking performance with weak and attenuated signal as well as improved jam immunity.

TABLE 1

Pin Identification

| Pin | Name |
|---|---|
| 1 | IF Input |
| 2 | $\overline{\text{IF}}$ Input |
| 3 | $\overline{\text{MIX}}$ Output |
| 4 | MIX Output |
| 5 | Vsa (LNA) |
| 6 | $\overline{\text{RF}}$ Input |
| 7 | RF Input |
| 8 | Vcc (LNA) |
| 9 | Vcc (VCO) |
| 10 | Vee (VCO) |
| 11 | Vee (CHP) |
| 12 | CPFB |
| 13 | CPSUM |
| 14 | CPOUT |
| 15 | Vcc (CHP) |
| 16 | Vcc (Digital) |
| 17 | $\overline{\text{SIGN}}$ |
| 18 | SIGN |
| 19 | $\overline{\text{MAG}}$ |
| 20 | MAG |
| 21 | $\overline{\text{ACQCLK}}$ |
| 22 | ACQCLK |
| 23 | $\overline{\text{GPSCLK}}$ |
| 24 | GPSCLK |
| 25 | REFIN |
| 26 | BYPASS |
| 27 | REFOUT |
| 28 | AGCSTRB |
| 29 | AGCDATA |
| 30 | AGCCLK |
| 31 | Vee (Digital) |
| 32 | Vco (IF) |

TABLE 2

PIN DESCRIPTION
GRF1 Signal Description

| Pin No. | Symbol | Type | Description |
|---|---|---|---|
| 1, 2 | IF, $\overline{\text{IF}}$ | Inputs | Differential IF inputs: balanced inputs to the IF stage; a filter should be placed between these inputs and the mixer outputs. DC bias to the positive supply must be applied to these pins. |

TABLE 2-continued

PIN DESCRIPTION
GRF1 Signal Description

| Pin No. | Symbol | Type | Description |
|---|---|---|---|
| 3, 4 | $\overline{\text{MIX}}$, MIX | Outputs | Differential IF Outputs; balanced outputs of the LNA/Mixer stage, a filter should be placed between these outputs and the IF inputs. DO bias to the positive supply must be applied to these pins. |
| 5 | VEE (LNA) | Input | LNA/Mixer ground pin. |
| 6, 7 | $\overline{\text{RF}}$, RF | Inputs | Differential LNA inputs. For best performance a balun should be used. Decouping should be to ground. |
| 8 | VCCLNA | Input | Postive supply input for LNA/Mixer block. Decoupling to ground via 0.01 µF or larger capacitors should be provided. |
| 9 | VCCVCO | Input | Postive supply input for VCO block. Decoupling to ground via 0.01 µF or larger capacitors should be provided. |
| 10 | VEEVCO | Input | VCO ground pin. |
| 11 | VEECHP | Input | Charge pump ground pin. |
| 12 | CPFB | Input | Charge pump feedback I/O pin. |
| 13 | CPSUM | Input | Summing input for the charge pump. |
| 14 | CPOUT | Output | Charge pump output. |
| 15 | VCCCHP | Input | Positive supply input for charge pump. Decoupling to ground via 0.01 µF or larger capacitors should be provided. |
| 16 | VCCDIG | Outputs | Positive supply input for Digital circuitry. For proper operation the digital and analog supplies should be provided by the same regulator. Decoupling to ground via 0.01 µF or larger capacitors should be provided. |
| 17, 18 | $\overline{\text{SIGN}}$, SIGN | Outputs | Differential SIGN bit Outputs. These outputs are PECL compatible. |
| 19, 20 | $\overline{\text{MAG}}$, MAG | Outputs | Differential MAGNITUDE bit Outputs. The magnitude bit is designed to produce a HIGH when the input level at the A/D is > +/− 50 mV. These outputs are PECL compatible. |
| 21, 22 | $\overline{\text{ACQCLK}}$, ACQCLK | Ouputs | Differential Acquisiton clock outputs. These outputs are PECL compatible. |
| 23, 24 | $\overline{\text{GSPCLK}}$, GSPCLK | Outputs | Differential x2 reference clock outputs. These outputs are PECL compatible. |
| 25 | REFIN | Input | Differential reference clock inputs. External input signals must be applied via AC coupling. |
| 26 | BYPASS | Bypass | Decoupling 10 Vcc via 0.01 pF or larger capacitor should be provided. |
| 27 | REFOUT | Output | Reference output. A crystal network may be placed between this output and the REFIN input in lieu of an external oscillator (see FIG. 5). |
| 28 | AGCSTRB | Input | Load control input. Data is latched into the AGC register on the rising edge of this input. The input is TTL compatible. |
| 29 | AGCDATA | Input | Data input. A six bit data byte is loaded serially via this data input LSB. The input is TTL compatible. |
| 30 | AGCCLK | Input | Clock input. Provides the clock function for the three wire AGC control. Data is loaded into a six bit shift register on the negative going edge of this clock. The input is TTL compatible. |
| 31 | VEEDIG | Input | Digital block ground pin. |
| 32 | VCCIF | Input | Positive supply input for IF block. Decoupling to ground via 0.01 µF or larger capacitors should be provided. |

All Vee and Vcc pins should be connected to ensure reliable operation.

Notes on Pin Descriptions

1. All bypassing should be to the positive supply unless otherwise specified. Capacitors with low dissipation factor should be placed as close as possible to all power pins.
2. Differential input and output signals should be used for optimal system performance.
3. Good RF practices must be followed in the PC board layout, ground and power planes should be used whenever possible.
4. Vee is commonly referred to as GND.

Functional Description

LNA/Mixer

The GRF1 receives the GPS L1 signal via an external antenna and suitable LNA. The L1 input signal is a Direct Sequence Spread Spectrum (DSSS) signal at 1575.42 MHz with a 1.023 Mbps Bi-Phase Shift Keyed (BPSK) modulated spreading code. The input signal power at the antenna is approximately −130 dBm (spread over 2.048 MHz), the desired signal is under the thermal noise floor. The front-end compression point is −30 dBm, given adequate external filtering in the IF section, rejection of large out-of-band signals is possible.

The LNA/Mixer is totally differential which significantly reduces common mode interference. With a noise figure of approximately 8 dB and 20 dB conversion gain, cheap relatively high insertion loss filters may be used in the IF. The LNA/Mixer and on-chip 1527.68 MHz PLL produce an IF output frequency of 47.74 MHz. The double balanced mixer outputs are open collectors and therefore require external dc bias to Vcc.

IF Stage

The IF stage provides approximately 75 dB small signal gain. An external IF filter is required between the LNA/Mixer and IF amplifier stages. The IF bandpass filter can have a bandwidth between 3 and 12 MHz without impacting performance. The inputs to the IF stage are double ended and require dc bias from Vcc. The double balanced I/O provides approximately 40 dB noise immunity; therefore, a balanced filter design is highly recommended.

A 6-bit register provides 48 dB of gain control (1 dB/bit) and is accessible via a three wire TTL level interface (AGCCLK, AGCDATA, AGCSTRB). The control bits are serially shifted into the chip LSB first on the falling edge of the AGCCLK. A unique voltage controlled source design in the IF gain stages provides extremely good gain linearity over temperature (<0.5 dB). Maximum gain is selected with all zeros loaded into the register (see FIG. 15 for timing details).

The IF amplifier output is fed to a 2-bit quantizer which provides sign and magnitude outputs. The sign and magnitude data bits are latched by the falling edge of the 38.192 MHz sample clock (see PLL Synthesizer). Differential outputs for this ACQCLK are also provided.

Phase-Locked Loop Synthesizer

The local oscillator, reference GPSCLK, and sample clock are derived from an on-chip PLL synthesizer block.

GSP1 provides a true 2-bit data path throughout the correlation process which enables tracking of extremely weak signals.

The input side of the GSP1 interface is an AGC block which controls the gain in the IF stage in the GRF1. The gain can be set to a fixed value or allowed to vary according to a software controllable threshold. GSP1 monitors the incoming signals and can adjust the gain every 1 millisecond, allowing rapid adaptation to a changing signal environment.

TABLE 3

AC Characteristics

| AC Characteristic | Min. | Value | Max. | Units | Conditions |
|---|---|---|---|---|---|
| LNA/Mixer | | | | | |
| Conversion Gain | 23 | 25 | 27 | dB | (Notes 1, 2) |
| Noise Figure | | 8 | 10 | dB | (Notes 1, 2) |
| Input Compression (1 dB) | −30 | −25 | | dBm | (Notes 1, 2) |
| Single Ended Input Impedance (Real) | | 80 | | Ω | (See Notes 1, 3, FIG. 4) |
| Single Ended Input Impedance (Imaginary) | | 2 | | pF | (See Notes 1, 3, FIG. 4) |
| Differential Output Impedance (Real) | | >50 | | KΩ | (Note 1) |
| Differential Output Impedance (Imaginary) | | 2 | | pF | (Note 1) |
| IF Strip | | | | | |
| Input Impedance min. (Real) | 5 | >5 | | KΩ | F = 47.74 MHz, (Note 1) |
| Input Compression | −60 | | | dBm | (Note 1) |
| Small Signet Gain | 75 | 78 | | dB | F = 47.74 MHz, Differential input, Zin = 2 KΩ |
| Gain Linearity | | +/−0.5 | | dB | F = 47.74 MHz |
| Gain Control Range | 40 | 48 | 52 | dB | |
| Gain Resolution | 0.5 | 1 | 1.5 | dB/Bit | |
| Bandwidth | +/−20 | | | MHz | Fc = 47.74 MHz, (Note 1) |
| A/D Clock Frequency | | 38.19 | | MHz | |
| Sign Bit Duty Cycle | 40 | 50 | 60 | % | |
| PLL Synthesizer | | | | | |
| Spurious | | −50 | | dBc | (Note 1, Note 4) |
| VCO Gain | 1 | 1.3 | 1.6 | GHz/V | |
| Phase Detector Gain | | 60 | | mV/RAD | (Note 1) |
| Reference Input Level | | | 200 | mVp-p | (Note 1) |
| Reference Input Impedence | | >5 | | KΩ | (Note 1) |
| Digital Interfaces | | | | | |
| GPSCLK, ACQCLK outputs | | | | | |
| Duty Cycle | 40 | 50 | 60 | % | |
| TDR, TDF | | 3 | | nS | Co = 15 pF |
| TACQCYC | | 28.21 | | nS | Co = 15 pF |
| TGPSEYE | | 20.36 | | nS | Co = 15 pF |
| TSATSU | | 52.42 | | nS | Co = 15 pF |
| ISINK, ISOURCE | 1 | 2 | | mA | |

The VCO, dividers, and phase detector are provided in the chip. All that is needed is an external 24.552 MHz reference clock and passive loop filter components.

FIG. 16 shows the chip in a typical configuration. The loop filter is provided using a charge pump. Two resistors and two capacitors set the loop filter bandwidth. The reference can be produced using a crystal, resistor, and two capacitors, or if better reference stability is required an external oscillator may be used. Differential inputs for the reference are available for use with an external oscillator which provides significant noise immunity. Differential GSPCLK and ACQCLK output signals are provided by the block.

GSP1 Interface

The output side of the GSP1 interface provides clocks and the 2-bit sample data to the GSP1. These signals are all differential to reduce noise and provide better performance. The 2-bit samples are digitally filtered which significantly reduces the filtering required in the RF circuit such that a simple 1 or 2 pole LC filter is sufficient for the IF filter. The

TABLE 4

AGC Interface Timing

| Parameter | Symbol | Min | Max | Units |
|---|---|---|---|---|
| AGCCLK cycle time | T14 | 161 | 163 | ns |
| AGCDATA setup time | T15 | 61.5 | 82.5 | ns |
| AGCDATA hold time | T16 | 79.5 | 80.5 | ns |
| AGCSTRB wait time | T17 | 79.5 | 80.5 | ns |
| AGCSTRB pulse time | T18 | 161 | 163 | ns |

Figure 17:
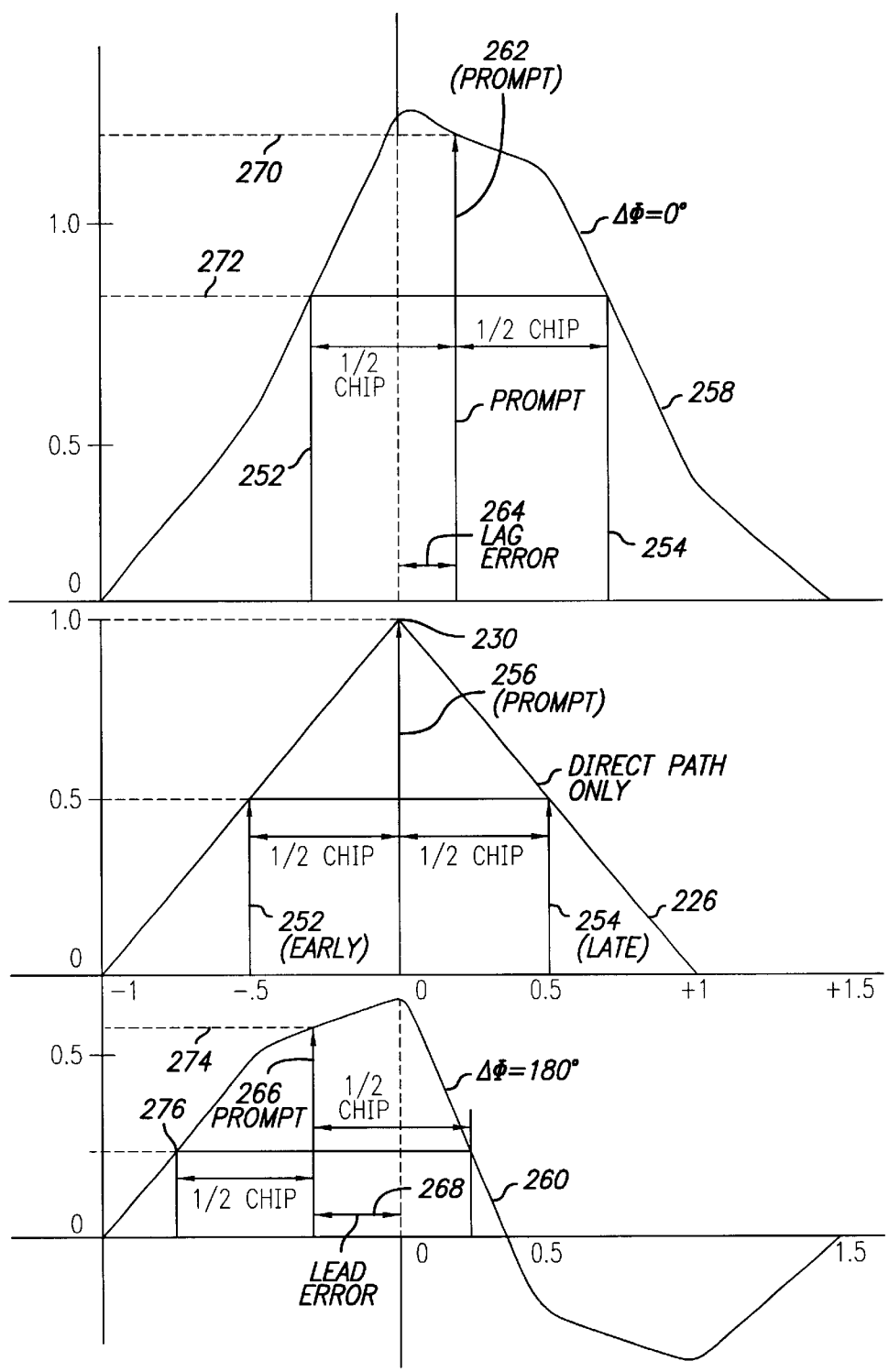
FIG. 17 is a graph of the correlation product of a direct path signal received without multipath interference, together with correlation products distorted by the presence of multipath signals whose carrier phase differs from the carrier phase of the direct path signal by about 0° and by about 180°.

Referring now to FIG. 17, a series of graphs of relative correlation amplitude as a function of time offset are shown for direct path and two types of multipath interference. These graphs are aligned at a time offset of zero, that is, at the time of arrival of the direct path signal.

Direct path correlation function 226, in the center of the figure, is the result of correlating a satellite signal received along a direct, line of sight, path, in the absence of multipath signal(s), with a replica of the C/A code modulation then present on the direct path signal. The peak 230 of direct path correlation function 226 is shown at the origin to represent the actual time of arrival or zero code phase. In practice, this point may be somewhat offset due to filtering and other biases. Peak 230 will be taken as the punctual code phase, that is, the time of arrival of the PN Code group from a particular satellite.

Direct path correlation function 226 may be produced for example by operation of Correlator Block 110 correlating the Doppler shifted satellite signals from Doppler Block 108 by the output of Coder Block 112 as shown in FIG. 9 while changing the estimated code phase. In particular, direct path correlation function 226 shows the shape of the correlation function that would result from adjusting the code phase, in the absence of multipath interference, from about one C/A code chip width early, a delay or time offset of −1 chip, to about one chip width late, a delay or time offset of about +1 chip.

The triangular shape of direct path correlation function 226 is conventionally understood to result from the following circumstances. There will be almost no correlation between the signal received and the internally generated code when the code phase offset is greater than about 1 to 1.5 chips in either direction. As the time offset is reduced from about 1 chip to about zero, in either direction, the correlation increases to a maximum at zero offset. That is, when the code phase of the internally generated code is exactly equal (less biases, offsets and the effects of filtering) to the code phase of the signal as received the correlation peaks.

A delay-locked loop is conventionally used for tracking the expected position of peak 230, by using a pair of early and late correlators with a fixed offset or time delay there between, performing early and late correlations to surround or straddle peak 230.

Figure 18:
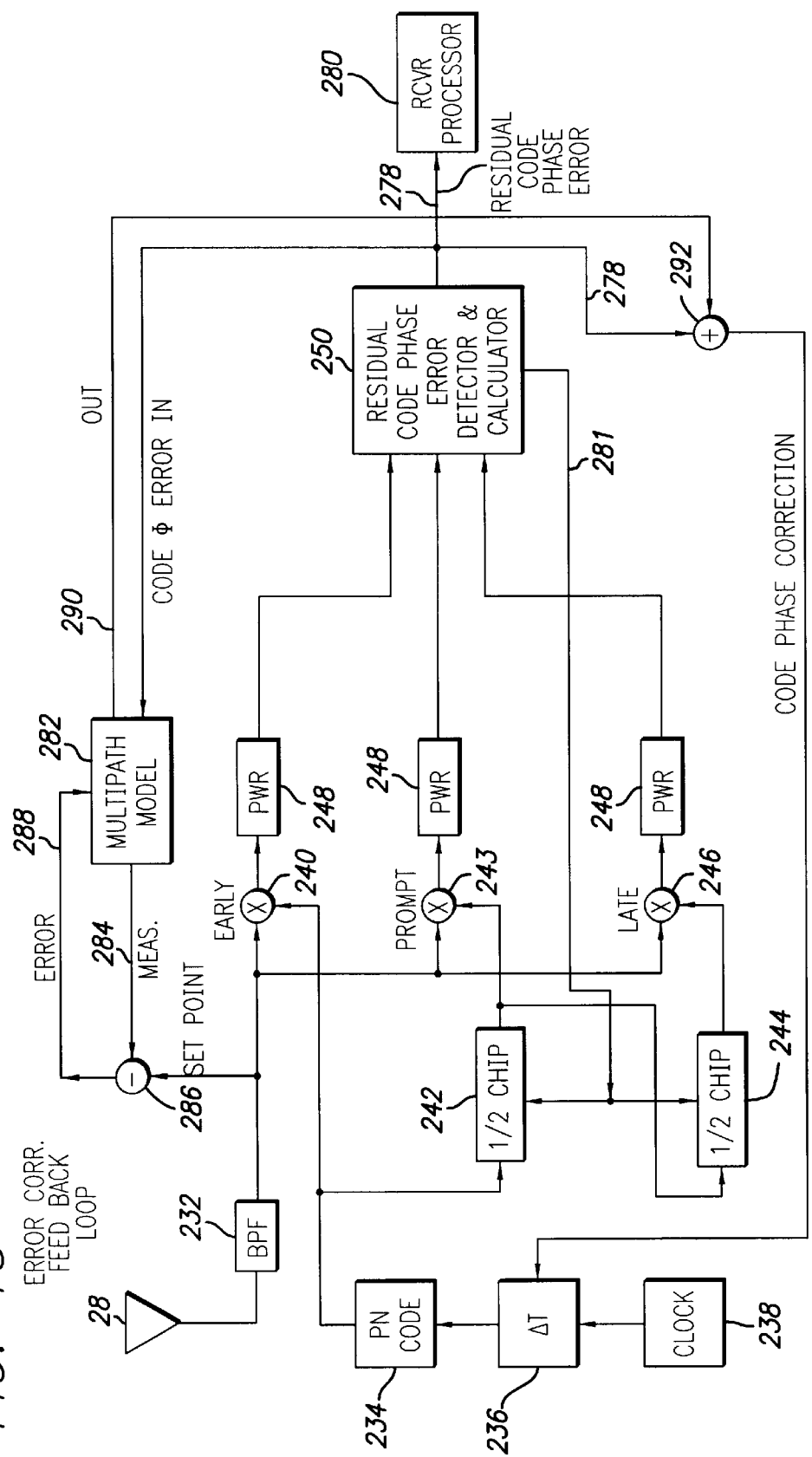
FIG. 18 is a schematic block diagram of portions of a GPS receiver illustrating the delay-locked tracking loop with multipath residual code phase error detection, calculation and/or correction according to the present invention.

As shown in FIG. 18, residual code phase errors resulting from multipath interference can be detected, determined and/or corrected in accordance with the present invention. In particular, satellite signals are received by GPS antenna 28 and processed by various components as described above, as well as by Band Pass Filter 232, before being correlated with a code replica produced by PN Code Generator 234. The time offset of the PN code produced by PN Code Generator 234 is controlled by the delay or offset of adjustable delay 236 driven by system clock 238.

The output of PN Code Generator 234, as offset, is applied to early correlator 240 for correlation with the satellite signals as processed by Band Pass Filter 232. The output of PN Code Generator 234 is applied through a pair of ½ chip delays 242 and 244 to late correlator 246, the other input of each of which is also provided by the output of Band Pass Filter 232. As a result, the satellite signals are correlated at two points with a fixed 1 chip delay, or separation, there between. The correlation functions are applied to detectors 248 which evaluates a characteristic of the correlation function, such as the power. It should be noted that other values or characteristics of the correlation function, typically a complex number including in-phase and quadrature phase components, can be used in place of power measurements including amplitude measurements.

In accordance with conventional techniques, a delay-locked loop is used for code tracking by adjusting the time offset of adjustable delay 236 so that the amplitude or power of the early and late correlation functions are maintained in a fixed relationship. In a preferred embodiment, the power of the early and late correlation functions are maintained equal by Code Phase Error System 250 which adjusts the code phase time offset to maintain this relationship. Code tracking is then performed in that the actual time of arrival of the code from the satellites is known to be within the one chip separation between the early and late correlations while their powers remain equal.

Referring again to FIG. 17, when the delay-locked loop of FIG. 18 is shown to be properly tracking the code phase so that the early and late correlation amplitudes are equal, the relative magnitudes of early and late correlations 252 and 254 are half of the magnitude of peak 230. That is, when the time phase offset is adjusted so that correlation amplitudes of equal value are tracked, these values symmetrically surround, in time, the actual time of arrival of the signals shown in the figure as prompt correlation 256. In other words, for a direct path signal, prompt correlation 256 is caused to occur midway between early and late correlations 252 and 254 so that prompt correlation 256 occurs at zero time offset, i.e. at the actual time of arrival of the code. As shown in FIG. 17, the amplitude of prompt correlation 256 is a relative amplitude given a value of 1.0. The amplitudes of early and late correlations 252 and 254 have equal values of 0.5.

As shown in FIG. 18, to cause the prompt correlation to occur midway between the early and late correlations, the 1 chip delay between early and late correlation is provided by a pair of ½ chip delays 242 and 244. The output of ½ chip delay 242 is applied to prompt correlator 240 to produce prompt correlation 256, one half chip offset from early correlator 240, for evaluation by detector 248. The input of ½ chip delay 244 is provided by ½ chip delay 242 so the output of ½ chip delay 244, applied to late correlator 246, is separated from the input to early correlator 240, by one full chip offset. The outputs of detectors 248 are then applied to complete the delay-locked loop.

Multipath distortion, if present, causes the prompt correlation to be offset from the actual time of arrival of the satellite signals by an error, described herein as the code phase residual error. The sign of the error between the prompt correlation and the actual time of arrival, either leading or lagging, has been determined to depend upon the relationship between the carrier phases of the direct and multipath signals. When the difference in phase between the carrier phases of the direct and multipath signals approaches 0°, as shown for example as lagging multipath correlation function 258, the direct and multipath signals tend to reinforce, increasing the relative amplitude of the correlation products. When the difference in phase between the carrier phases of the direct and multipath signals approaches 180°, as shown for example as leading multipath correlation function 260, the direct and multipath signals tend to cancel, decreasing the relative amplitude of the correlation products.

More importantly, the relationship between the location of the actual time of arrival, and the points of equal correlation amplitude, also changes. Without multipath, as discussed above, the points of equal magnitude of early and late correlations separated by a fixed delay are symmetrical about the correlation peak, that is, the actual time of arrival, so that the point midway there between tracked as the punctual correlation is in fact the actual time of arrival of the code.

In accordance with the present invention, however, it has been determined that multipath interference, by reinforcement or cancellation, causes the points of equal amplitude early and late correlations to no longer be symmetrical about the correlation peak. For example, as can easily be seen by inspection of lagging multipath correlation function 258, the points of equal amplitude early and late correlation 252 and 254 are shifted to the right, that is to a positive or lagging delay, with respect to the points of equal amplitude early and late correlation for direct path correlation function 226.

When the midway point in time offset between the early and late correlation is tracked, for lagging multipath correlation function 258, lagging prompt correlation 262 is offset in time from direct path prompt correlation 256 by multipath reinforcement interference lag error 264. That is, lagging prompt correlation 262 is offset from the actual time of arrival of the direct path signal by a positive or lagging delay time. Similarly, when the midway point in time offset between the early and late correlation is tracked, for leading multipath correlation function 260, leading prompt correlation 266 is offset in time from direct path prompt correlation 256 by multipath cancellation interference lead error 268. That is, multipath cancellation interference lead error 268 is offset from the actual time of arrival of the direct path signal by a negative or leading lagging delay time.

In addition, the relationship between the early, prompt and late correlation product amplitudes are changed by multipath interference. As can be seen by inspection of lagging multipath correlation function 258, when the midway point in time offset between the early and late correlation is tracked, for lagging multipath correlation function 258, lagging prompt correlation 262 is greater in amplitude than direct path prompt correlation 256. The amplitudes of early and late correlations 252 and 254 for lagging multipath correlation function 258 are also greater than for direct path correlation function 226.

In particular, lagging prompt amplitude 270 is greater than 1.0 and equal early and late lagging correlation amplitudes 272 are greater than 0.5. However, as can be seen by inspection and as demonstrated by simulation, equal early and late lagging correlation amplitude 272 is greater than one half of lagging prompt amplitude 270. Similarly, leading prompt amplitude 270 is less than 1.0 and equal early and late leading correlation amplitudes 276 are less than 0.5. Further, equal early and late leading correlation amplitude 276 is less than one half of leading prompt amplitude 274.

In accordance with the present invention, these relationships are used to determine the sign and magnitude of the offset errors multipath reinforcement interference lag error 264 and multipath cancellation interference lead error 268. Code Phase Error System 250, shown in FIG. 18, receives as inputs, the correlation amplitudes (or other characteristics as determined by detectors 248) of the correlation products from early correlator 240, prompt correlator 243 and late correlator 246.

If Code Phase Error System 250 determines that the amplitude of the prompt correlation performed midway between the early and late correlations is less than twice the amplitude of the equal early and late correlations, then multipath reinforcement interference lag error 264 exists. If Code Phase Error System 250 determines that the amplitude of the prompt correlation performed midway between the early and late correlations is more than twice the amplitude of the early and late correlations, then multipath cancellation interference lead error 268 exists.

If, however, Code Phase Error System 250 determines that the amplitude of the prompt correlation performed midway between the early and late correlations is equal to twice the amplitude of the early and late correlations, then no multipath interference error exists.

That is, the existence of a multipath interference error may be detected, and if detected the sign of the error may be determined by comparison of the ratio of the amplitude of the prompt correlation to the equal amplitudes of the early and late correlations offset symmetrically from the prompt correlation.

The relative magnitude of the multipath interference error may be estimated in several different manners. Depending upon the relative amplitude of the multipath signal to the direct path signal, and the differences in carrier phase there between, an appropriate, empirically determined scale factor, such as −0.5, multiplied by either the sum of the early and late correlation amplitudes divided by the amplitude of the punctual correlation, or by the square root of the sum of the squares of the early and late correlation amplitudes divided by the square of the amplitude of the punctual correlation, will provide a suitable correction factor under most circumstances.

In other words, a computation correction to the pseudorange can be made proportional to the amplitude of the (Early+Late)÷Punctual correlations to reduce or eliminate the effect of multipath errors when the multipath delay is less than about 1.5 PRN chips.

As shown in FIG. 18, there are three uses for residual multipath code phase error 278, which includes both the sign and estimated magnitude of the error. This error may simply be used in the rest of the receiver, shown as receiver processor 280, to computationally refine the pseudorange and therefore the position determination without changing the operation of the delay-locked loop used for tracking the code phase.

Alternately, or in addition thereto, residual multipath code phase error 278 may be applied to adjustable delay 236 which changes the time offset of PN Code Generator 234 to control the offset of early correlator 240. The two ½ chip delays 242 and 244 maintain the separation from early correlator 240 to late correlator 246 at one full chip width with prompt correlator 243 centered there between. In this manner, prompt correlator 243 may be made to more accurately track the time of arrival of the direct path signal. In addition, separation control signal 281, produced for example by Code Phase Error System 250, may be used to narrow or otherwise control the separation of the early and late correlations as well as the symmetry around the prompt correlation to better track the actual time of arrival of the code.

Further, residual multipath code phase error 278 can be used in multipath model 282 to enhance or provide a synthesized model of the interfering multipath signal(s) used, for example, for multipath cancellation. Replica 284 produced by multipath model 282 may be applied as a measurement input to error correcting feedback loop 286 which receives the signals from Band Pass Filter 232 as set point input 287 to produce error signal 288 applied to multipath model 282. Error signal 288 is used to control replica 284 to reduce any differences between the replica and the signal received until the replica is an accurate representation of the multipath signals. Multipath model 282 may then provide additional code phase correction 290, added by summer 292 to residual multipath code phase error 278, for adjustment of PN Code Generator 234.

As noted above with respect to separation control signal 281, it may be desirable under certain circumstances to reduce the separation, or time offset, between early correlator 240 and late correlator 246 for improved tracking. This technique of reducing the separation has also been used in attempts to minimize residual error from multipath interference by straddling the peak of the correlation function. It should be noted from inspection of FIG. 17 that the peak of the correlation function is easiest to select by straddling direct path correlation function 226 because a relatively steep slope occurs on both sides of peak 230, making the peak easier to distinguish.

As the separation between the early and late correlations is reduced in the presence of multipath, however, at least one of the sides of the peak becomes less steep. For example, the slope of the lagging edge of lagging multipath correlation function 258 is substantially less steep than the leading edge thereof. Similarly, the slope of the leading edge of leading multipath correlation function 260 is also less steep than the slope of its lagging edge. As the slope becomes less steep in the neighborhood of the peak and the prompt correlation, it becomes more difficult to detect or straddle the peak, particularly in the presence of noise. In accordance with one embodiment of the present invention, the sign and magnitude of the error may first be determined in order to reduce multipath effects before reducing the separation for tracking purposes.

It should also be noted from FIG. 17 that two correlation peaks are produced by the cancellation interference. Although it might be possible to track the wrong peak by accident, it is only necessary to determine if another, earlier and perhaps larger correlation peak exists within a small separation to cause the delay-locked loop to track the correct peak.

In order to provide an accurate assessment of the multipath error, the baseline due to noise must be removed. Referring now to FIG. 3, the present invention permits the convenient and accurate assessment of the baseline due to noise as a result of the use of a relatively large number of correlators, such as Exclusive NOR gate correlators 74. In particular, a correlator 74 at a substantial earlier correlation time or delay than the prompt tap can be used to assess the baseline due to noise. In this way, the noise can be determined without interference by any correlation with the desired signal.

Figure 19:
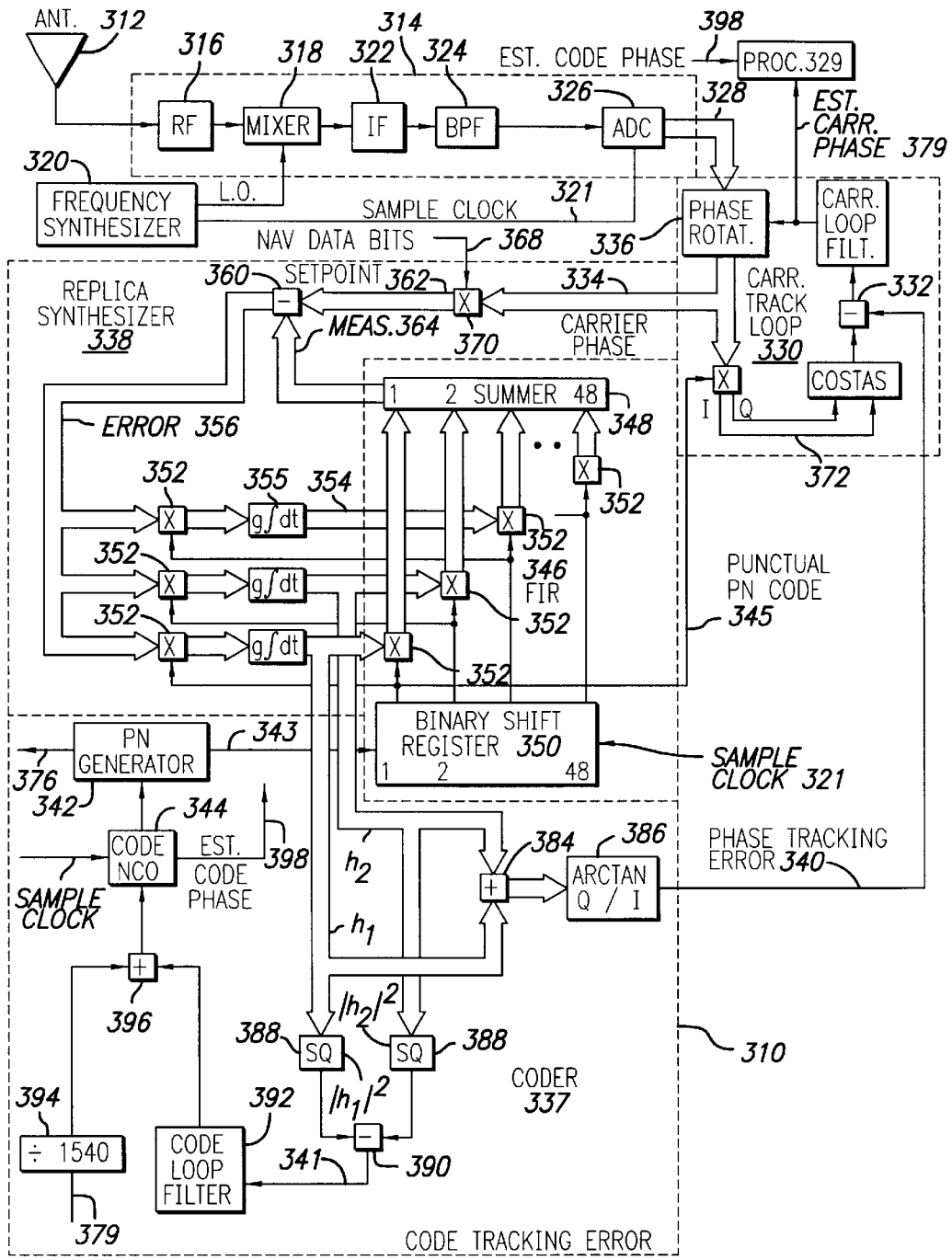
FIG. 19 is a block diagram schematic of a portion of a GPS receiver showing another embodiment of the present invention in which multipath signal replicas are produced in an error tracking loop for later cancellation in a carrier tracking loop.

FIG. 19 is a block diagram schematic of GPS receiver 310 constructed in accordance with another embodiment of the present invention. Conventional omni-directional, half-hemispherical GPS antenna 312 receives PRN encoded signals from a plurality of GPS transmitters, not shown. The signals as received may, or may not, include multipath signals which if present are to be canceled by the operation of GPS receiver 310 in accordance with the present invention. In the particular implementation of GPS receiver 310 shown in FIG. 19, the signals are received, downconverted, bandpass filtered and converted to digital signals for further processing, in receiver front end 314. This particular implementation of front end 314 works particularly well in the receiver of the present invention, but many other front end configurations may well be used with the present invention.

In particular, within front end 314, the signals received by omni-directional GPS antenna 312 are applied to RF receiver 316 after which they are downconverted in mixer 318 by being mixed with a known local oscillator (LO) signal produced by LO frequency synthesizer 320. Thereafter, the downconverted signals are processed in intermediate frequency processor 322 and filtered in band pass filter (BPF) 324. The downconverted and bandpass filtered received signals are finally converted to digital signals in analog to digital converter (ADC) 326 to produce a digitized version 328 of the signals as received. The double lines used in FIG. 19 for digitized version 328 represent that the signal information included therein has a complex value. It should also be noted that known direct conversion techniques could also be used.

ADC 326 is controlled by Sample Clock 321 from frequency synthesizer 320 at a particular rate, typically faster than the chip rate at which the signals transmitted by the GPS receivers are encoded. In this particular embodiment, sample clock 321 runs 32 times faster than the chip rate and is applied to ADC 326 so that information related to each 1/32nd of each chip may be determined.

Digitized version 328 of the signals as received is applied to Carrier Tracking Loop 330 which may be a conventional carrier tracking loop modified by the addition of cancellation subtractor 332 as well as the provision for tracking loop raw measurement signal 334 at the output of phase rotator 336. The operation of Carrier Tracking Loop 330 will be described below in greater detail after the details of operation of non-encoded replica signal synthesizer 338.

Replica signal synthesizer 338 provides Phase Tracking Error 340 to cancellation subtractor 332 in Carrier Tracking Loop 330 for cancellation of multipath signals in cancellation subtractor 332. As shown in FIG. 19, the components included within replica signal synthesizer 338 are somewhat arbitrarily included in FIG. 19 in that many such components, such as PRN generator 342, Coder NCO 344 and other components may also be present for use in other parts of GPS receiver 310. For ease in description of the current invention, the operation of such components within replica signal synthesizer 338 will be described herein.

The primary operation of replica signal synthesizer 338 is performed by Finite Impulse Response (FIR) Filter 346 which includes summer 348 and Binary Shift Register 350. In the preferred embodiment shown in FIG. 19, a 48 channel summer 348 and a 48 channel Binary Shift Register 350 were selected in order to evaluate about 1.5 C/A code chips widths of signal at one time for multipath cancellation. That is, Sample Clock 321 operates at 32 times the C/A code chip width so that 48 such samples would capture about 1.5 C/A code chips. Inaccuracies of greater than about one or one and one half chip widths, resulting for example from multipath, are conveniently handled elsewhere in the GPS receiver using, for example, conventional techniques.

A series of 48 switches 352, one in each channel between Binary Shift Register 350 and Summer 348, are controlled by the channels of Binary Shift Register 350 to apply a series of 48 channel error signals 354, to be described below in greater detail, to a corresponding channel of Summer 348.

During a progression of 48 pulses from Sample Clock 321, which represents on the order of 1.5 chips of encoded PRN modulation in digitized version 328 of the signals as received, the satellite specific PRN code 343 for the satellite of interest is applied to Binary Shift Register 350. Satellite specific PRN code 343 may be produced in a generally conventional manner, as shown for example in coder subsystem 337, by clocking the output of satellite specific Code Numerically Controlled Oscillator (NCO) 344 into conventional PRN Code Generator 342. Satellite specific PRN code 343 is applied to Binary Shift Register 350 under the control of Sample Clock 321 so that the leading edge of each PRN code pulse is applied to stage 1 of Binary Shift Register 350 while the remaining stages contain the remainder of the 1.5 chip sample discussed above.

Punctual PRN code 345, derived from the application of satellite specific PRN code 343 to Binary Shift Register 350 by computing from stage 1 or perhaps stage 2, is applied to Carrier Tracking Loop 330 to produce in phase or I component 372, as will be described below in greater detail with respect to Carrier Tracking Loop 330. Coder sub-system 337 also produces Code Tracking Error Signal 341 from replica signal synthesizer 338, as will be described below in greater detail.

The 48 channel error signals 354 are each derived from complex error signal 356 by correlating with the corresponding output from Binary Shift Register 350 and are individually weighted and integrated, in channel gain/signals conditioning systems 355, in a manner tending to reduce the magnitude of complex error signal 356 by adjusting Measurement Signal 364 to better approximate Set point signal 362, that is, to better match and therefore cancel the signals as received, including multipath errors, if any. In the preferred embodiment, as shown in FIG. 19, a complex form of the Least Mean Square, or LMS, approximation algorithm is used although many other known approximation techniques could be used. The error tracking loop serves to condition and weight complex error signal 356 to force measurement signal 364 to equal Set point signal 362.

Set point signal 362 is applied to tracking loop subtractor 360 as the Set point signal to be maintained and is derived from digitized version 328 of the signals as received while measurement signal 364 is the output of Summer 348 in replica signal synthesizer 338 representing the replica of the signals as received. A zero value for complex error signal 356 indicates that measurement signal 364 must have been equal to Set point signal 362 from which it was subtracted.

Set point signal 362 is derived from digitized version 328 of the signals as received after phase rotation by phase rotator 336 in Carrier Tracking Loop 330 and subsequent demodulation in Data Bit Demodulator multiplier 370 by being multiplied by an estimate, or measured value, of the 50 bits per second (bps) navigation modulation applied to the C/A signal of each GPS satellite transmitter, shown in FIG. 19 as Nav data bits 368. The removal of the effect of the navigation modulation is necessary so that the C/A code modulation may be tracked directly. The bi-phase navigation message modulation, at 50 bps, may be removed as shown in FIG. 19 by stripping the modulation from raw measurement signal 334 in data bit multiplier 370 or by mod-2 adding the modulation to satellite specific PRN code 343 as will be described below in greater detail with reference to FIG. 20.

Referring now again to FIG. 19, during operation, the data message and therefore Nav data bits 368, may already be known. Since this data message may normally be expected to not change very quickly, the data bits may be stripped from raw measurement signal 334 by multiplying Nav data bits 368 with raw measurement signal 334 in data bit multiplier 370. Even if the full data message is not exactly known, portions of the message may be known or assumed because the message changes very slowly compared to the bit rates of the signals being processed. The position within the navigation message may be known and used, such as the header or protocol information indicating the type of information to follow, that is, the header for the time and date information. It is only necessary to know enough about the data message to properly model the multipath signals for cancellation.

Figure 20:
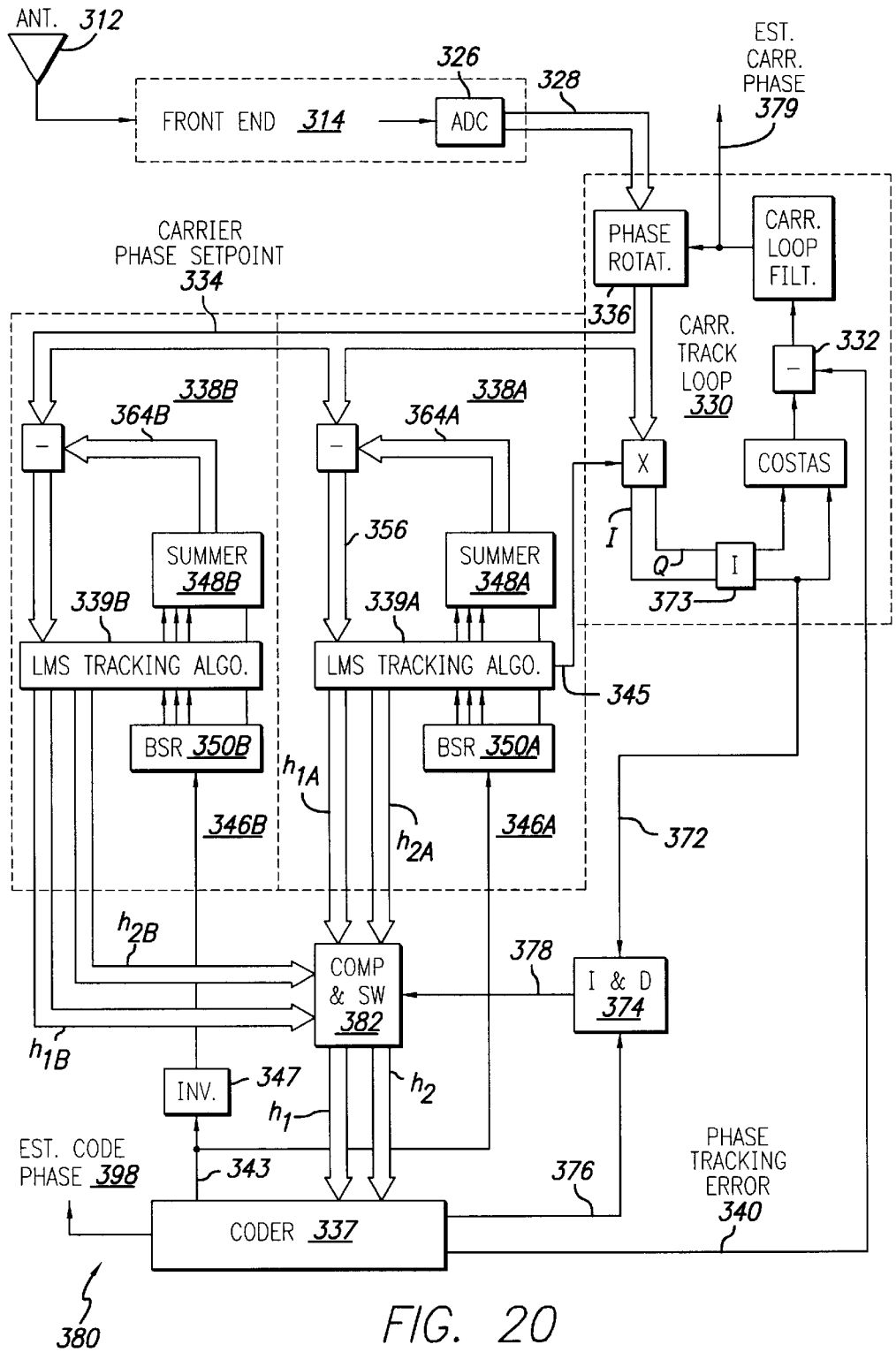
FIG. 20 is a block diagram schematic of a portion of a GPS receiver showing still another embodiment of the present invention in which parallel processing paths are used to track predicted values of an unknown Nav Data Modulation bit until the bit is demodulated for comparison and selection.

Referring now also to FIG. 20, if the data bit message is not currently known, it may be estimated by demodulation as shown or in any other convenient fashion. For example, the In Phase or I component 372 of the Costas Loop demodulation associated with the punctual or on-time correlation in Carrier Tracking Loop 330 in response to punctual PRN code 345, may be integrated over each 20 ms duration of a 50 bps nav data bit to indicate the polarity, and therefore the binary amplitude of 1 or 0, for that data bit. In accordance with the embodiment of the present invention shown in FIG. 20, in phase or I component 372 is applied to 20 ms Integrator and Digitizer 374, and synchronized with the GPS C/A code as received. This synchronization may be accomplished by clocking the integration in 20 ms Integrator and Digitizer 374 with data bit timing signal 376, derived from PRN Code Generator 342 in coder 337, or in any other convenient fashion.

In the preferred embodiment, Integrators 373 (shown in FIG. 20) included in both the I and Q signal paths in the Costas Loop in Carrier Tracking Loop 330 already provide integration of at least 20 ms, so that further integration in 20 ms Integrator and Digitizer 374 is not required. If the integration provided by Integrators 373 is less than 20 ms, a 20 ms integration time is provided by 20 ms Integrator and Digitizer 374.

The output of 20 ms Integrator and Digitizer 374 is in the form of Demodulated Data Bits 378. The time ambiguity as to which 1 msec repetition of the C/A code modulation marks the start of the data bit may be resolved in any one of the many conventional techniques known.

However, this estimate of the data bit information provided by 20 ms Integrator and Digitizer 374 is not available until the end of the 20 ms. bit duration of the 50 bps Nav Data modulation. This 20 ms. lag is acceptable for many replication synthesizers, such as the complex LMS feedback adaptation used in replica signal synthesizer 338. An elegant but simple solution of this problem of the lag of the estimate for Demodulated Data Bits 378 is to use each of the two possible values for Nav data bits 368 in one of a pair of replica signal synthesizers and then select the synthesizer outputs from the synthesizer determined, at the end of the 20 ms. period, that happened to have used the correct bit value.

As shown in FIG. 20, in one implementation of this approach, raw measurement signal 334 from Carrier Tracking Loop 330, and satellite specific PRN code 343, are both applied in parallel, both to first FIR 346a as well as to second FIR 346b. As an alternative to stripping the Navigation Message Data Bits from raw measurement signal 334 to form Set point signal 362, the data bit is mod-2 added to satellite specific PRN code 343, to represent the 180° possible phase shift due to the Navigation Message Modulation, in inverter 347 before the code is applied to second FIR 346b.

In particular, a predicted data bit value of bit=0 is accomplished by applying satellite specific PRN code 343 directly to first Binary Shift Register 350a in first FIR 346a. First replica signal synthesizer 338a includes first FIR 346a which uses complex LMS Tracking Algorithm 339a to synthesize measurement signal 364 in Summer 348a in response to first Binary Shift Register 350a. A predicted data bit value of bit=0 is applied to first Binary Shift Register 350a in first FIR 346a by applying satellite specific PRN code 343 directly to first Binary Shift Register 350a. The outputs of complex LMS Tracking Algorithm 339a include $h_{1a}$, and $h_{2a}$ which represent the weightings of the first two time segments of first FIR 346a.

A predicted data bit value of bit=1 is applied to second Binary Shift Register 350b in second FIR 346b by applying satellite specific PRN code 343 through inverter 347 to second Binary Shift Register 350b. FIR 346b uses complex LMS Tracking Algorithm 339b to form to synthesize measurement signal 364b in summer 338b of second FIR 346b in response to second Binary Shift Register 350b. The outputs of complex LMS Tracking Algorithm 339b include $h_{1b}$ and $h_{2b}$ which represent the weightings of the first two time segments of second FIR 346b.

In order to determine which of the predicted Nav Data Bit Modulation values, 1 or 0, was correct, at the end of a 20 ms. integration time, the actual value of the Nav Data Message Modulation is applied to bit comparator and data switch 382 by Demodulated Data Bit 378 from 20 ms Integrator and Digitizer 374, together with $h_{1a}$ and $h_{2a}$ from first FIR 346a and $h_{1b}$ and $h_{2b}$ from second FIR 346. If the actual data bit had a data bit value of bit=0, i.e. no phase shift, then bit comparator and switch 382 applies $h_{1a}$ and $h_{2a}$ from first FIR 346a are applied as $h_1$ and $h_2$ to coder sub-system 337. In addition, $h_{1b}$ to h48b in second FIR 346b are replaced by $h_{1a}$ to h48a from first FIR 346a. If however, Demodulated Data Bit 378 indicates a data bit value of bit=1, then bit comparator and switch 382 applies $h_{1b}$ and $h_{2b}$ from second FIR 346b as $h_1$ and $h_2$ to coder sub-system 337. In addition, $h_{1a}$ to h48a in first FIR 346a are replaced by $h_{1b}$ to h48b from second FIR 346b. In this manner, the system is updated every 20 ms even if the Nav Data Bit Modulation is not known a priori.

With reference again in detail to FIG. 19, the use of $h_1$ and $h_2$ in coder sub-system 337 will now be described in greater detail. As noted above, these two values represent the weightings of the first two time periods used in the successful replication of the signal as received, including multipath effects. $h_1$ and $h_2$ are combined in adder 384 for conversion by ArcTangent converter 386 into Phase Tracking Error 340 which is then applied by coder sub-system 337 to Carrier Tracking Loop 330.

In addition, the magnitudes of $h_1$ and $h_2$ are squared in squarers (or alternatively absolute values) 388 for subtraction by subtractor 390 to produce Code Tracking Error Signal 41 for use by Code Loop Filter 392 which drives coder NCO 344. Estimated Carrier Phase 379 is produced by Carrier Tracking Loop 330 and may be used for dynamic aiding, especially for a moving platform such as an automobile, by being scaled to the PRN chip rate in Divide by 1540 Scaler 394 for combination with the output of Code Loop Filter 392 in adder 396 before application to Coder NCO 344 which drives PRN Code Generator 342 and produces Estimated Code Phase 398.

Estimated Carrier Phase 379 and Estimated Code Phase 398 are used in a conventional GPS data processor, such as Processor 29 shown in FIG. 19, to derive the required position information.

Referring now again to data bit multiplier 370 in FIG. 19, one advantage of stripping the Navigation Data Bit Modulation from raw measurement signal 334 to form Set point signal 362 is related to the need to replicate Binary Shift Register 350 when the Nav Data Modulation is not known. An alternate approach is to add the Navigation Data Bit Modulation to measurement signal 364 by, for example, appropriately inverting satellite specific PRN code 343 as applied to FIR 346. That is, when both possible Data Bit Modulation values of the Navigation Message must be tested, stripping Nav data bits 368 from (FIR) Filter 346 in data bit multiplier 370 of FIR 346, as shown in FIG. 19, permits replication of parallel FIRs 346 driven by a single Binary Shift Register 350. This configuration is shown below in FIG. 21.

As shown in FIG. 20, however, when testing for the Navigation Message Data in a configuration in which the two possible Navigation Message bits are created by inverting to one of a pair of FIRs 346, duplicate Binary Shift Registers 350a and 350b are required. Stripping of the Navigation Message before application to FIR 346 therefore provides the advantage of reducing the component count in a parallel system by Binary Shift Register 350b.

Figure 21:
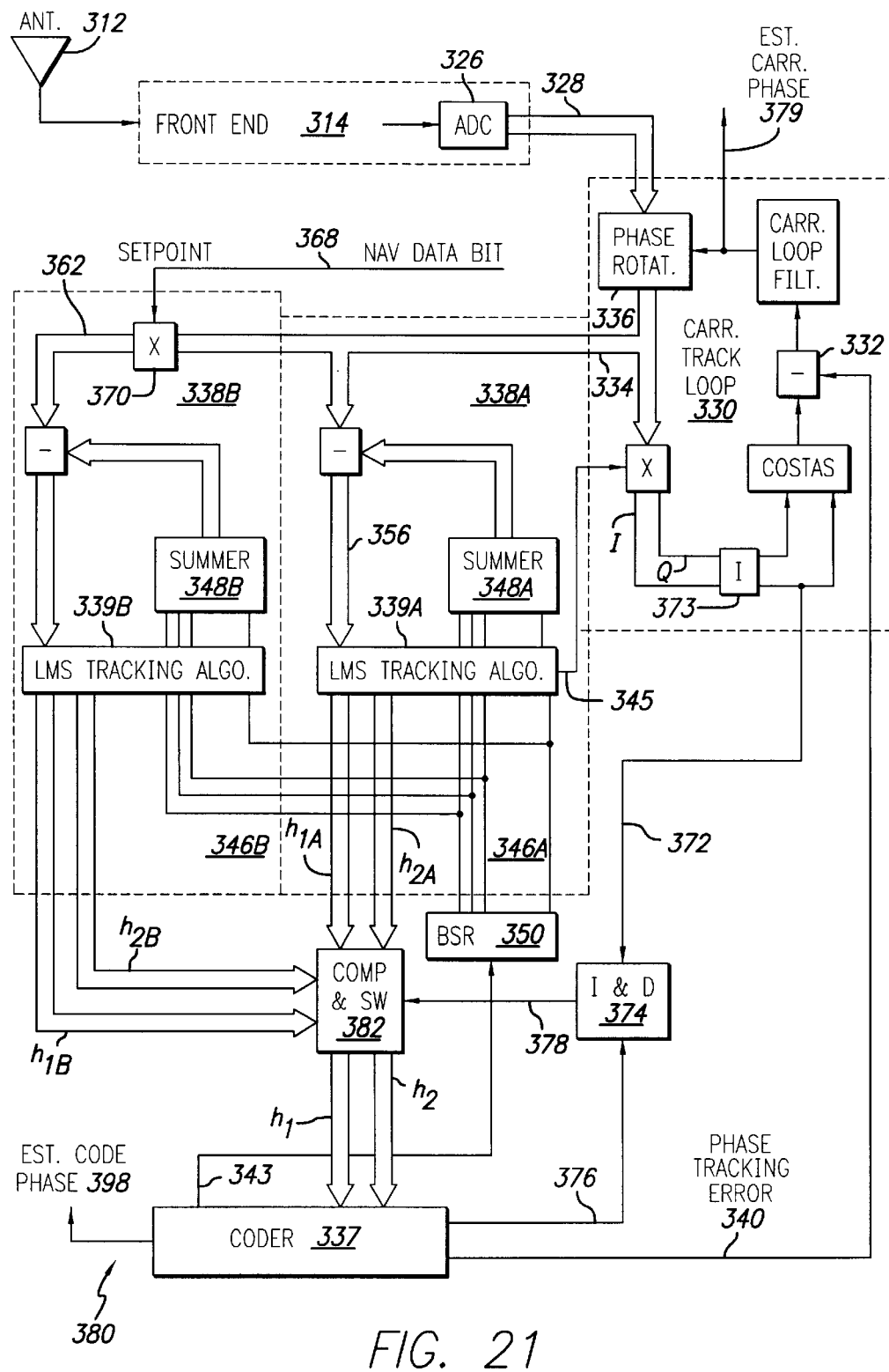
FIG. 21 is a block diagram schematic of a system similar to that shown in FIG. 20 in which the predicted Nav Data Bit Modulation is stripped from the raw signals to be processed rather than being added to the code phase applied to the error tracking loops.

Referring now to FIG. 21, digitized version 328 of the signals as received are applied to Carrier Tracking Loop 330 for phase rotation by phase rotator 336 to form raw measurement signal 334 which is stripped of Nav data bits 368 by data bit multiplier 370 in the same manner as in FIG. 19. Raw measurement signal 334 is then applied to first replica signal synthesizer 338a to represent a Nav Data Bit modulation of bit=0. Resultant set point signal 362 represents a Nav Data Bit modulation of bit=1 for application to second replica signal synthesizer 338b. It is important to notice that contrary to the configuration shown in FIG. 20, both first FIR 346a and second FIR 346b are driven by a single Binary Shift Register 350, the outputs of which are applied in parallel to both filters. Complex LMS Tracking Algorithm 339a receives the prompt code signal satellite specific PRN code 343 via Binary Shift Register 350 and applies punctual PRN code 345 to Carrier Tracking Loop 330.

The remaining outputs of the error tracking loops are $h_{1a}$ and $h_{2a}$ from first FIR 346a and $h_{1b}$ and $h_{2b}$ from second FIR 346b which are compared with Demodulated Data Bit 378 from 20 ms Integrator and Digitizer 374 in bit comparator and switch 382 to determine which of the filter outputs is applied to coder sub-system 37 as $h_1$ and $h_2$. The operation of the embodiment of FIG. 21 is therefore much like that of FIG. 20 except that the Nav Data Bit Modulation is stripped from raw measurement signal 334 rather than added to satellite specific PRN code 343. As noted above and apparent from FIG. 21, one of the beneficial results of this configuration is the use of a single Binary Shift Register 350 rather than first Binary Shift Register 350a and second Binary Shift Register 350b as required in the configuration shown in FIG. 20.

Referring now to the operation of the embodiments shown in FIGS. 19–21, the use of Nav Data Bit Modulation derived from the signals as received, which may include substantial multipath errors, does not substantially degrade the operation of a typical receiver. In particular, a typical receiver may be assumed to operate, for example, at a signal level of 38 dB-Hz, $E_b/N_0$=21 dB at the 50 bps data rate of the Navigation Data Bits where $E_b$ represents the energy per bit and $N_0$ represents the watts per hertz. The bit error rate would then be $10^{-3}$ at approximately $E_b/N_0$=7 dB. Thus the punctual correlation can be severely degraded by the multipath without significantly introducing errors into the data bit estimates, as verified by simulations. In other words, the relative greater magnitude of the signal and its error rate over the magnitude and estimate of the Navigation Data Bits means that multipath errors in the Navigation Data Bits don't significantly effect the processing of the receiver signals.

In order to mathematically analyze the operation of the cancellation approach of the present invention, the received signal, with K multipath components, can be modeled as $$s(t) = b(t)\sum_{k=0}^{K} a_k e^{j\phi_k} PN(t - \tau_k) = b(t)\sum_{k=0}^{K} \alpha_k PN(t - \tau_k) \quad (1)$$

using a complex representation of magnitude and phase on the carrier. For each multipath component, $\tau$ is the delay in PRN chips, a is the magnitude, and $\phi$ is the carrier phase. For mathematical convenience, the magnitude and phase can be combined into the single complex value $\alpha$. The direct component corresponds to $\alpha_0$, and its time of arrival and phase are the desired measurements for purposes of navigation. Only multipath components delayed by less than roughly one PRN chip are of concern in Eq(1), since the PRN code is uncorrelated for longer multipath delays.

Injecting the known PRN code into a binary shift register as shown in FIG. 19, the general estimate $$est(t) = \sum_{m=1}^{M} h_m PN(t - \tau - mT) \quad (2)$$

is synthesized, where T denotes a design time spacing in PRN chips and the $h_m$ values are complex values to be determined. A plot of $h_m$ versus mT is the multipath profile estimate in the receiver, ideally, would match the actual profile. The $h_m$ values may be called the "tap weights", and T is the tap spacing. The shift register in FIG. 19 shifts every T.

In order to accurately model the input signal as distorted by multipath, it is necessary to make τ in Eq(2) approximate $τ_0$ in Eq(1). The receiver processing adjusts τ, and the $h_m$ values, to minimize the mean square value of $$\epsilon = b_e(t)[s(t)+n(t)]-\text{est}(t) \quad (3)$$

where $b_c(t)$ is an estimate of the data bits. As discussed above, the data bits can be effectively stripped off. Then, a straightforward approach to adjusting the $h_m$ is the well-known complex LMS algorithm to minimize the mean square error of a weighted sum compared to a desired result. In Eq(3), s(t) is the desired result, and ε is the complex error. Applied to the present task, the complex LMS algorithm is described by the feedback adaption $$\Delta h_m = g\text{PN}^*(t-mT)\epsilon \quad (4)$$

which adjusts each $h_m$ value to minimize the mean square error. The gain constant g sets the time constant of the adaption. A small g reduces the error due to noise and ensures stability of the feedback loops. Eq(4) shows a complex conjugate is to be taken of the PRN code in general, but this is unnecessary in the present application where PRN(t) is real (±1 values).

The value of τ can be estimated by determining the earliest significant value of $h_m$ when the receiver is tracking conventionally either by differencing early and late correlation powers (delay-lock tracking) or by forming the dot product between an early-late correlation and a punctual correlation (dot-product tracking). This approach views the computation of the multipath profile estimate as a providing a correction to conventional PRN tracking.

In accordance with the present invention, an alternate and preferable approach to estimate a is now described. To begin, assume there is no multipath, only the direct component. Ideally, only one $h_m$ would be non-zero in the multipath profile estimate; however, because of the effect of the finite receiver bandwidth, the multipath profile estimate actually has a non-zero width. Then, a restoring force for adjusting tau can be obtained by differencing two adjacent $h_m$ values, e.g., $$\text{Tracking Restoring Force} = |h_1|^2 - |h_2|^2 \quad (5)$$

In effect, τ is adjusted by this method of tracking towards a tracking null so that the direct component falls midway between the earliest two adjacent taps of the multipath profile estimate. (Note, it may be preferable to displace the two adjacent taps used in Eq(5) to a little later in the multipath profile estimate.) Then, a tracking loop for τ can be closed to force the restoring force of Eq(5) to the tracking null.

Now suppose that a multipath component suddenly appears. The LMS feedback adaption to estimate the multipath profile causes other values of $h_m$ for m>2 to develop non-zero values, but, ideally, $h_1$ and $h_2$ are not affected. Thus, ideally, τ continues to be tracked without a significant error.

The carrier phase of the direct component is contained in the complex values of $h_1$ and $h_2$ when tracking τ as described above. Since the direct component falls between these two taps, an estimate of carrier phase is given by the phase of $h_1+h_2$. Ideally, when a multipath component suddenly appears, the estimate of carrier phase of the direct component is affected only slightly.

A practical concern of carrier tracking is being able to track during vehicle dynamics. For this reason, FIG. 19 shows the usual punctual correlation to generate I and Q components that are used to compute the error for standard Costas loop tracking of the dynamics. The carrier phase determined from $h_1$ and $h_2$ for the direct component is subtracted from the Costas error so the Costas loop is tracking the estimated phase of the direct component.

The estimated carrier phase is scaled by 1540, in Divide by 1540 Scaler 394, which represents the ratio of carrier frequency to PRN chip rate, and injected into the code tracking in Coder NCO 344 to remove the effect of dynamics from the code loop.

Figure 22:
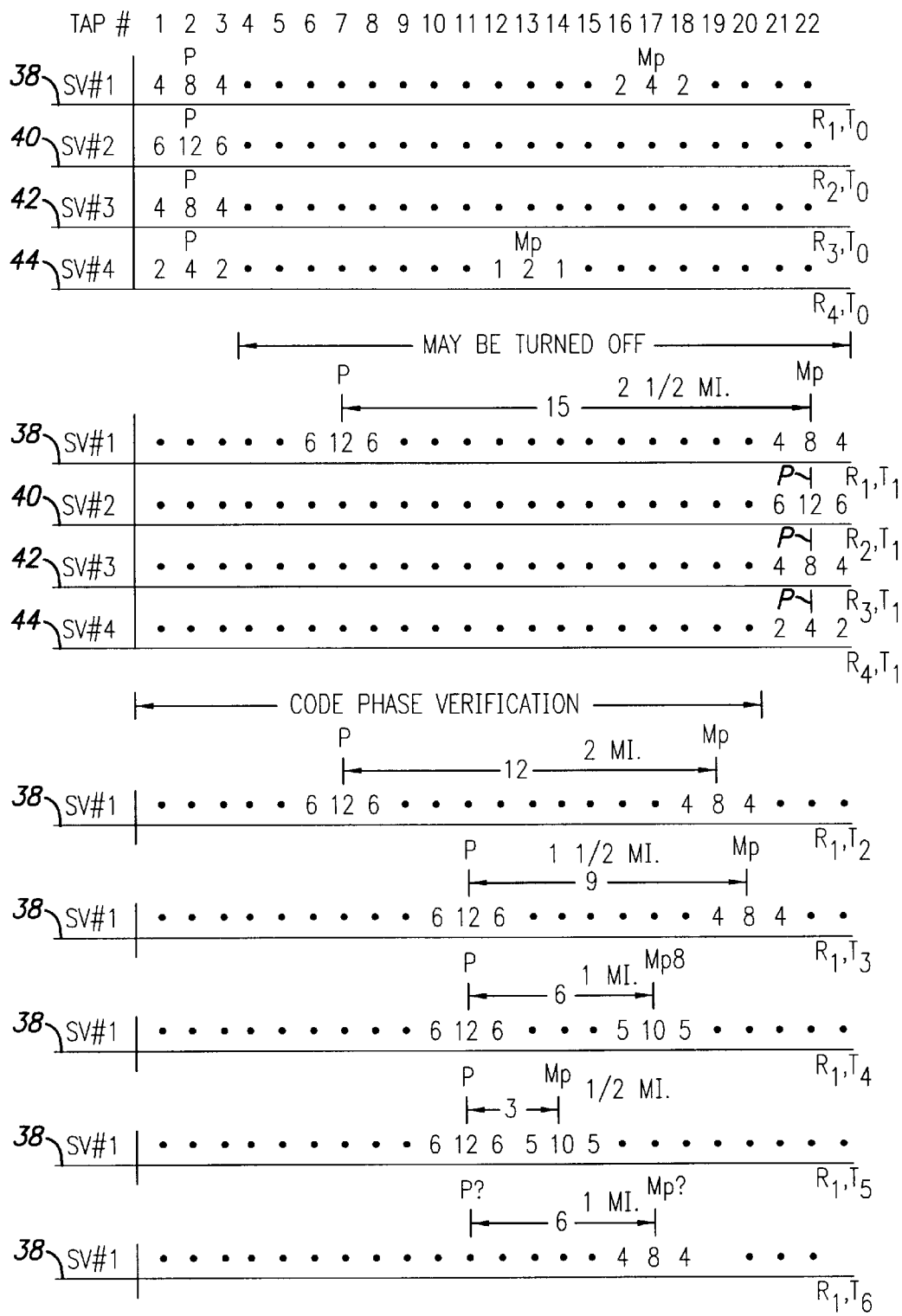
FIG. 22 is a schematic representation of the matrix of accumulated correlation products for several SVs at several times showing the placement of the early, prompt and late correlation products for the direct and multipath signals at various location within the 22 tap delay line illustrating code phase verification and direct and multipath signal modeling.

Referring now to FIG. 22, the operation of an alternate embodiment of the present invention is shown in which multipath errors at delays greater than about 1.5 C/A code chips can be detected and corrected. This technique for the correction of long delay, non-interfering multipath signal errors (i.e. delay greater than about 1.5 chips) may be used in combination with techniques for short delay, constructive or destructively interfering multipath signal errors (i.e. delay less than about 1.5 chips) such as those shown in FIGS. 17 through 18 and FIGS. 19–21, or may be used alone.

In an urban environment, or any other in which there are substantial potential signal blocking and reflecting objects, GPS and other spread spectrum receivers occasionally lock onto and track a reflected or multipath signal. Although tracking of a multipath signal may begin when the direct path signal from the transmitter is blocked, tracking of the multipath signal will often continue even when the direct path signal later becomes available, thereby losing potentially valuable navigation information.

This multipath problem may also occur in sites selected for differential GPS transmitters as a result of reflections, for example from a black asphalt parking lot adjacent the transmitter, as the angle of the incoming signal changes because of satellite motion.

If the direct path signal thereafter becomes available, it would be advantageous to force the receiver to lock onto the direct path signal and ignore the reflected signal that had been tracked. To do this, direct path and multipath reflection signals must easily be distinguished from each other. In accordance with the operation of the embodiment depicted in FIG. 22, the greater than conventional number of correlators available to track the incoming signals for each satellite in order to provide fast reacquisition are advantageously used to verify that the signal being tracked is in fact the direct signal rather than a later arriving multipath signal. If an un-tracked direct path signal, or even a shorter path multipath reflection signal, is detected, the tracking is immediately moved to the better signal.

During satellite tracking, in addition to performing early, prompt and late correlations to maintain tracking accuracy, the present invention utilizes a plurality of progressively earlier correlations to detect the presence of a satellite signal substantially earlier than the signal currently being tracked as the prompt signal. When an earlier signal is detected it is assumed to be a more valuable signal, such as the direct path signal or at least a shorter path multipath reflection signal, especially when the magnitude of the earlier correlation is larger than the magnitude of the prompt correlation for the signal being tracked. When an earlier, more valuable signal is detected, the code delay or code phase is adjusted so that the earlier signal is tracked as the new prompt correlation signal. A related phenomenon has been discovered, related to the rate of change of drift of a reflected path signal towards, or away from, the direct path signal. For example, in a receiver located above a black asphalt parking lot, the reflected path signal is later than the direct path signal but the delay is not constant. As the angle of incidence of the signals received from the satellite changes, the delay changes. The rate of change of the delay, that is, the speed of progression, provides substantial information about the reflector including its physical qualities such as angle and distance.

In addition to using this information for other purposes, the speed of progression may be helpful in those cases in which the difference in amplitudes of the direct and reflected paths cannot be used to distinguish between the direct and reflected signals. That is, the reflected path signal will change in time of receipt from the desired signal and will also change in a manner distinguishable from direct path signals. Many characteristics of the desired, direct path signals are known from the ephemerides even when the exact time of arrival is not yet known. The rate of progression of a reflected signal will differ from that expected from progression of the direct path signal caused by satellite motion and may therefore be used to identify the direct path signal. In some situations, particularly in fixed locations such as differential GPS transmitting stations, the receiver may be calibrated for known reflectors, such as the black asphalt parking lots described above.

In other situations, such as in a moving vehicle in an urban environment in which there are rapid changes of reflectors and the direct path may be blocked several times, the information from a strong multipath signal may be corrected on the basis of the rate of progression, perhaps by separately tracking the reflected path signal, so that the "dead reckoning" or modeling of the direct path signal may be improved by tracking the reflected path in the interims when the direct path is blocked.

In operation, as shown in FIG. 22 and as previously described with regard to FIG. 11, each 11 ½ chip sample or segment is Doppler rotated to provide a satellite specific sample for each SV being tracked. Segment #1 is first processed in SatTRAK channel 38 for SV 1 with a Doppler rotation specific for that SV at that time and then processed in SatTRAK channels 40, 42 and 44 SV's 2–4 (and so on for all 11 SV's) by Doppler rotating the segment for each SV in each channel. Each Doppler rotated version of Segment #1 is then, in turn, delayed by each of 22 satellite specific code delays to determine the correlation magnitudes for each of the 22 delay theories for that SV.

Thereafter, the 11 ½ chip samples of each of the remaining 185 segments in each ms code repetition period are processed in the same manner. The results of the correlation for each delay for each of the 12 SVs are accumulated in a matrix of correlation magnitudes for SVs as a function of tap number or delay. For example, the accumulation of correlation amplitudes for correlations of the signals from SV #1 in SatTRAK channel 38 is shown in FIG. 22 in Row 1 for time T0. The magnitudes are shown on an arbitrary scale. It is convenient to use a magnitude representing the power of the correlation product, rather than the magnitudes of the individual I and Q quadrature phase signals which may be used in the tracking mode. The I and Q correlation products may be thereafter converted to power in accordance with the conventional conversion formula in which the power is the square root of the sum of the squares of I and Q or power measurements and peak detection may be accomplished within each channel. An alternate approach is described below with regard to FIG. 23 in which a fast reacquisition channel, which already includes power conversion and peak detection, may be used as a separate code phase verification channel.

In either event, the prompt correlation delay would be normally adjusted so that the results of the prompt correlation are accumulated in tap column #2 (or at some other fixed location such as the center of the delay line).

In the example shown for SV #1, the early correlation is accumulated in column #1 which shows a magnitude of 4 for the 186 segments representing a full repetition of the C/A during 1 ms. The prompt and late correlation accumulations as shown in columns #2 and #3 with magnitudes of 8 and 4, respectively. Similarly, the accumulated magnitudes for the early, prompt and late correlations in SatTRAK channels 40, 42 and 44 are shown in columns 1, 2 and 3 of rows R2, R3 and R4 with magnitudes of 6, 12 and 6 for SV #2; 4, 8 and 4 for SV #3 and 2, 4 and 2 for SV #4. For the purpose of illustration, a multipath reflection of the signal from SV #1 is indicated in SatTRAK channel 38 centered at column #17 with magnitudes of 2, 4 and 2 while a multipath signal from SV #4 is indicated in SatTRAK channel 44.

In this configuration in which the early, prompt and late correlations are performed with delays or tap weights of 1, 2 and 3 respectively, the remaining correlations with tap weights greater than 3 may be superfluous during the tracking mode. In order to save battery energy or increase the speed of multiplexing, these correlations may be turned off.

In accordance with the present invention, the early, prompt and late correlations may also be processed at the greatest delays, at tap weights at or near 20, 21 and 22. At Row 1, time $t_1$, the correlation magnitudes for SV #1 in SatTRAK channel 38 are shown with the prompt correlation being performed at column #21. If, as is shown, the prompt correlation has been locked in error onto a multipath reflection, the SatTRAK channel 38 is inadvertently tracking a multipath reflection rather than the desired direct path signal. The direct path signal if visible will reach the receiver along a shorter path and therefore at an earlier time, that is, at an earlier tap or delay number. As an example, the correlation magnitudes accumulated for SV #1 in SatTRAK channel 38 in columns 6, 7 and 8 shown magnitudes of 6, 12 and 6 indicating that the direct path signal is present at a time corresponding to tap or delay #7. As shown in FIG. 17, the correlation shape for a direct path signal, such as direct path correlation function 226, is expected to be an equilateral triangle.

When the accumulated magnitudes in SatTRAK channel 38 are analyzed, the direct path signal at tap #7 is detected and thereafter the correct prompt correlation is made at this time. This may be accomplished by shifting the delays of the taps so that the delay associated with tap #7 is thereafter present at tap #21. Thereafter, any other earlier signals occurring and accumulated for tap weights #1 through #19 may again be used to look for and detect a direct path signal if the currently selected prompt delay is inaccurate. Similarly, the early, prompt and late correlation accumulations for SVs #2, #3 and #4 are shown in Rows 2–4 at time $t_1$.

With regard to SatTRAK channel 38, the detection of the direct signal path at tap #7 rather than tap #21 indicates that the multipath signal path length was 15 ½ chips longer than the direct path or about 2½ miles longer, assuming about 6 ½ chips represents one mile.

In accordance with another aspect of the present invention, it may be advantageous to continue to track the multipath signal to obtain additional information for the correction of multipath interference when the multipath signal path length is only about 1.5 ½ chips (or less) greater than the direct path. Similarly, tracking the multipath signal may be useful in order to model the direct path signal if the direct path signal is temporarily obscured. In particular, obscuration of the direct path signal may lead to locking onto the multipath signal so that when an earlier direct path signal is detected, it is reasonable to assume that the direct path signal may later be obscured again.

In particular, as shown for SatTRAK channel 38 in row 1, $t_2$, the direct path signal may be maintained at tap #7 where detected and the progress of the multipath reflection monitored. In the short run, the change in path length due to vehicular motion may well be substantially greater than the change in path length due to satellite motion. In either event, however, if the multipath signal path length grows with respect to the direct path length, it is likely that the multipath signal will not cause additional tracking difficulties. If however, as shown, the difference in path length is decreasing, the magnitude of the correlations of the multipath signal may well increase.

At time $t_2$, the multipath signal path length has decreased to be only about 2 miles longer than the path length of the direct path so that the multipath correlations are accumulated in columns about 12 ½ chip delays from the corresponding magnitudes of the direct path correlations. In order to track both the multipath and direct path signals within the same 22 tap delay line, the direct path signal must be correlated between taps 2 and 10. In the example shown, the direct path remains at tap 17 so that the multipath signal can be tracked at tap #19.

At a later time shown as time $t_3$, the additional path length for the multipath signal has been reduced to about 1.5 miles which is represented by only 9 ½ chip delays. When the path length difference is less than or equal to half of the number of taps, it may be convenient to relocate the prompt correlation for the direct path signal to the midpoint of the row, that is, to tap #11. The multipath signal at a differential path length of about 9 ½ chip delays is then accumulated at tap #20.

At a still later time shown as time $t_4$, the path length differential has been reduced to about 6 ½ delays and the multipath signal correlation is therefore accumulated at tap #17. As an example, the magnitude of the strongest multipath correlation is shown as 10, a substantial increase over the magnitude at the larger path length differential. This increase is consistent with the changes in multipath reflection which occur when the vehicle containing the GPS receiver moves toward a multipath reflector, such as a building or mountain.

Similarly, at a still later time $t_5$, the path length differential has been reduced to about one half mile so that the multipath signal correlation magnitudes are accumulated in taps #13, #14 and #15. At this stage, the multipath correlation is within about 1.5 ½ chip delays from the direct path correlation accumulated at taps #10, #11 and #12. As noted above with respect to FIG. 17, when the path length differential is within about 1.5 ½ chip delays, the correlation products may constructively or destructively interfere, making it more difficult to accurately track the direct path signal.

However, as may be seen from an inspection of FIG. 22, the progressive change in the path length differential may be modelled as a function of time. Although shown as a somewhat linear progression, the actual progression may take any form depending upon the location and type of reflector as well as the relative path and changes of direction of the receiver, all of which may be modeled to provide a relatively accurate representation of the multipath signal during the period of interference with the direct path signal. The correlation products modelled for the multipath signal may then be subtracted from the direct path correlation, or otherwise compensated for, in order to more accurately track the direct path.

In addition, as shown in FIG. 17, the shape of the distorted correlation caused by the multipath interference may be taken into account in the correction or compensation of the direct path correlation for tracking purposes.

Further, referring now specifically to time $t_6$, after the path length differential has reached a minimum (which may be zero as the multipath signal disappears if the vehicle approaches the reflector), the multipath path length differential may begin to increase again. It may be advantageous to track the multipath signal, while the differential path length is decreasing as noted above, in order to compensate for multipath interference. In addition, it may be advantageous to track a multipath correlation, or at least the multipath signal with the greatest signal magnitude, whether the path length differential is increasing or decreasing, in order to model the direct path signal during periods of obscuration.

At time $t_6$, the path length differential has increased to about 1 mile, but the direct path signal has been obscured by the environment, that is, by a building, by foliage, by a hill or the like. By tracking the progress of a major multipath signal, if available, including changes of the direction of progression of the path length differential, an accurate model of the direct path may be maintain during brief, or not so brief, periods when the direct path signal is obscured. The model of the direct path signal may be maintained in any convenient manner, such as in a matrix of modelled correlation products.

Figure 23:
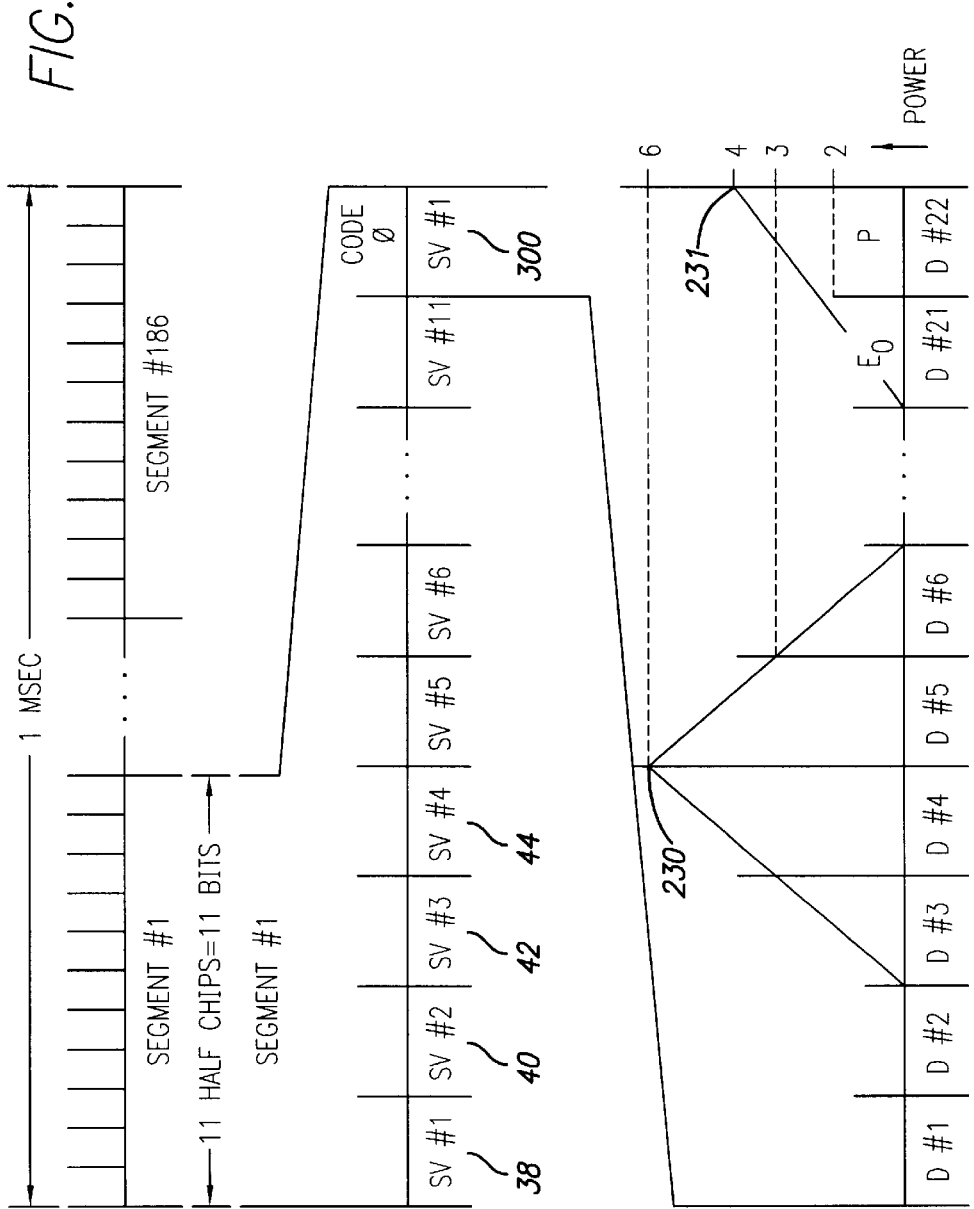
FIG. 23 is a schematic representation of the operation of one embodiment of the system according to the present invention in which a separate channel is used in a fast acquisition mode for code phase verification for all SVs sequentially.

Referring now to FIG. 23, the code verification function described above may be configured in a different fashion to take advantage of some of the functions of the fast reacquisition embodiment discussed above with respect to FIG. 3. In one embodiment of the present invention, each satellite tracking channel may be operated in either a satellite tracking mode, in which quadrature correlation of the I and Q signals from a satellite are performed at each of 22 tap delays to track that SV, or in a fast reacquisition mode in which the correlation power at each of 22 tap delays are determined and the peak power is selected in the same manner as used during reacquisition.

In the particular embodiment of the fast reacquisition mode currently being contemplated, the correlation power for each tap is immediately measured. In this configuration, it is advantageous to use a separate independent channel for code phase verification.

In particular as shown in FIG. 23, Segment #1 is applied to multiple satellite tracking channels including SatTRAK channels 38, 40, 42 and 44 and so on for tracking SVs 1 through 11. Segments #2 through #186 are processed in sequence in the same manner.

CodePhase Verification SatTRAK channel 300, which was shown above in FIG. 11 as the SatTRAK channel used for tracking SV 12, is used in the fast reacquisition mode rather than the tracking mode to verify the code phase for each SV in turn. The task of verifying the code phase is described above and refers to search for a direct path signal received along a shorter path than the path of the signal being tracked.

In operation, during the first ms, the 11 ½ half bit sample of Segment #1 is processed in turn in CodePhase Verification SatTRAK channel 300 with the code phase adjusted so that the prompt correlation for the satellite signal currently tracked is correlated at one of the larger delays, such as at tap #22. The delay theories being tested at taps #1 through #21 are then the conventional early correlation at tap #21 and progressively earlier times from tap #21 back to tap #1.

As an example, multipath signal 231 from SV #1 may inadvertently be tracked in SatTRAK channel 38. In SatTRAK channel 38, the code phase delays for the 22 taps in SatTRAK channel 38 would be adjusted so that the prompt correlation would occur at tap #2. During an 1 ms time period, the repetition period for a full 1023 bit sequence of the C/A code, CodePhase Verification SatTRAK channel 300 would be used to verify that no earlier, potentially direct path signal, was also available.

In operation, the code phase of CodePhase Verification SatTRAK channel 300 is adjusted so that the peak of the signal being tracked, in this example the peak of multipath signal 231, is tracked in tap #22. As shown in FIG. 23, after accumulation over 186 segments, a correlation power magnitude of 4 m representing the peak of multipath signal 231, is accumulated at tap #22 and the half power point is shown as a magnitude of 2 at tap #21. In addition, peak 230 of the direct signal is accumulated at tap #4 with a magnitude of 6, while the half power points are shown at magnitudes of 3 for the early and late correlation powers at taps 3 and 5, respectively.

During the next ten ms time periods, the powers for the correlation products at each tap for each of the remaining SVs 2 through 11 are tested. For each SV, the earliest peak is selected as the direct path signal and the code phase for that SV is adjusted according. The process may then be repeated.

As noted above with regard to FIG. 22, it may be advantageous to track the multipath reflection signal in order to model the direct or multipath signal to either minimize interference when the differential path delay is on the order of about 1.5 ½ chips or less or to continue to track a temporarily obscured direct path signal. These tasks may also be conveniently accomplished in CodePhase Verification SatTRAK channel 300, for one SV per ms.

Figure 24:
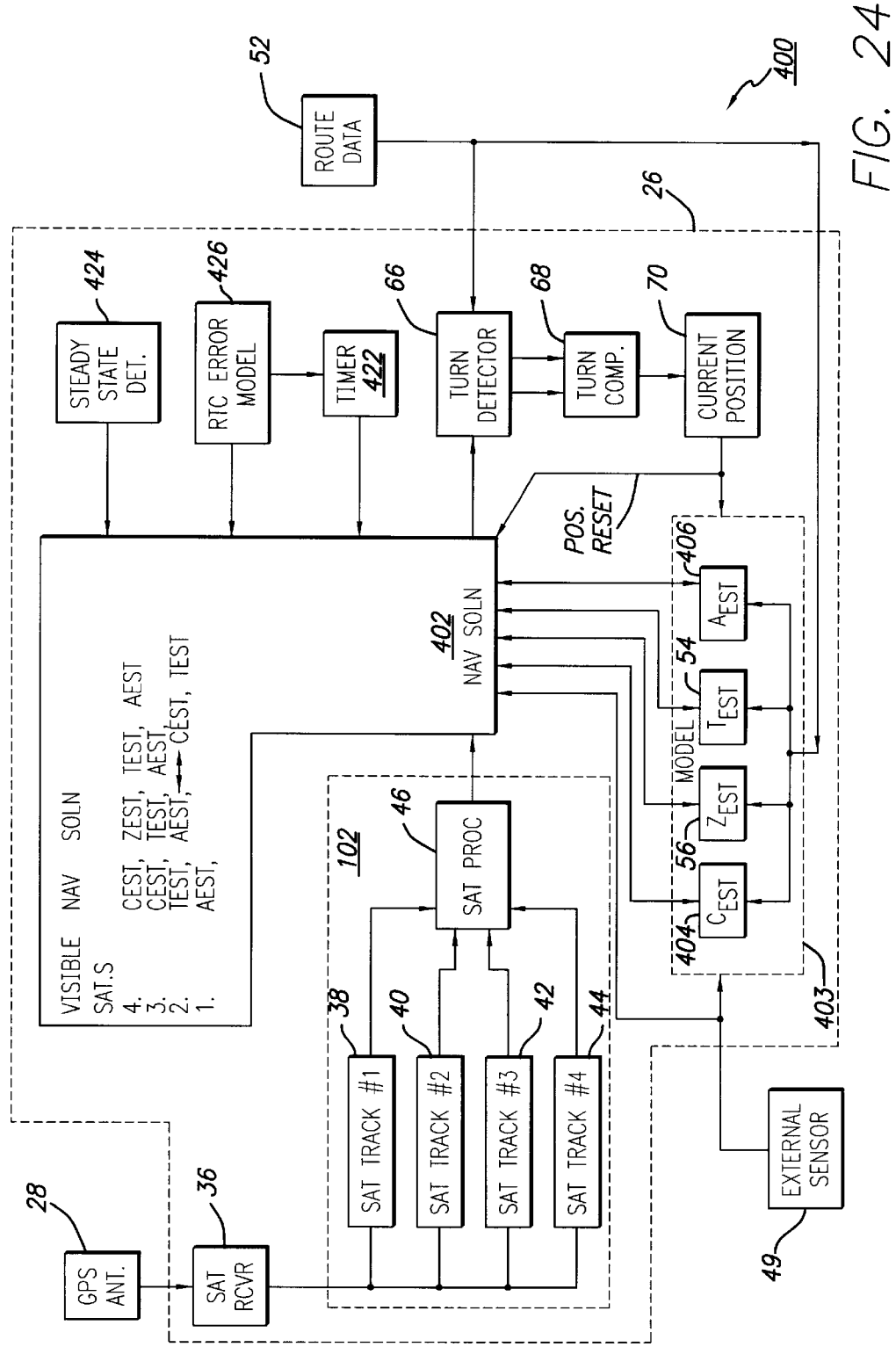
FIG. 24 is a block diagram of an alternate embodiment of the GPS car navigation system depicted in FIG. 2 used for improved navigation during reduced satellite visibility.

Referring now to FIG. 24, a block diagram of an alternate embodiment of the GPS car navigation system depicted in FIG. 2 used for improved navigation during reduced satellite visibility is shown.

As noted above, GPS receivers are preferably operated with a minimum of 3 or 4 satellites distributed across the visible sky in order to determine, or at least estimate, the four necessary unknowns typically including $x_{user}$, $y_{user}$ and $z_{user}$ which provide three orthogonal coordinates to locate the user as well as $t_{user}$ which provides the required satellite time. In the embodiment shown in FIG. 24, the four unknowns are specified as $a_{user}$, $c_{user}$, $z_{user}$ and $t_{user}$. The three orthogonal user coordinates are $a_{user}$, which locates the user in terms of the distance along the currently identified heading or track, $c_{user}$, which locates the user in terms of the cross track distance of the user from the currently identified heading or track, and $z_{user}$ which represents the altitude of the user, conventionally in terms of the vertical distance above or below sea level.

As depicted in FIG. 24, GPS car navigation system 400 processes satellite signals in ASIC 102 received in satellite receiver section 36 from GPS antenna 28 to track all currently visible satellites in satellite specific tracking channels such as SatTRAK channels 38, 40, 42 and 44, the outputs of which are applied to SatProcessor 46. A navigation solution may then be produced in NavProcessor 402 which creates position model 403 of the four unknowns, such as internal clock model 54, altitude estimate 56, $c_{est}$ 404 and $a_{est}$ 406. The use of $c_{est}$ 404 and $a_{est}$ 406 has been found to be advantageous even when more than one satellite is in view.

GPS car system module 26 is also provided with data related to the then current—and expected future—physical environment of car 10 from, for example, Route Data Base 52 which includes information about the routing in the form of roadways and turns between roadways, as well as actual or estimated roadway width. The estimated roadway width may simply be a default value representing a common roadway width such as the width of a two lane city street or highway if no other information is then available.

Solutions for all 4 unknowns of position information may be derived when signals from 4 satellites in a proper geometric configuration are view. When signals from only 3 visible satellites are available for suitable processing, the $z_{user}$ solution may be replaced by $z_{user}$ 56 solution derived from an elevation estimate or default in what is conventionally called the altitude hold mode of processing. Changes in elevation occur relatively slowly in terrestrial navigation so that the degradation of position accuracy during altitude hold is often acceptable.

When signals from only 2 suitable satellites are available, the $c_{user}$ position information is replaced by $c_{est}$ which may be derived from Route Data Base 52 or otherwise estimated in what has been referred to herein as the cross track hold mode of processing. The maximum physical cross track distance, that is, the width of the roadway, is typically smaller than the position accuracy currently available with the GPS system and therefore any position information degradation resulting from cross track hold is usually acceptable as long as the vehicle is progressing along a known track or direction.

Referring now to FIG. 25A, if route data from Route Data Base 52 or another source is being used, predicted track 408 may represent actual roadway 409, which is shown to extend for example in a first direction from point 410 to turn 412 after which actual roadway 409, and therefore predicted track 408, turns about 30° toward the right. A similar situation occurs when an intentional turn is made, for example, when exiting a highway.

Referring now to FIG. 25B, if detailed roadway or track data is not being used, the default estimate for predicted track 408 may simply be the current heading. That is, as long as the vehicle including GPS car navigation system 400 is proceeding along actual roadway 409 from point 410 to turn 412, predicted track 408 follows actual roadway 409 and no cross track error occurs. After turn 412, however, if predicted track 408 is merely estimated from the heading of the vehicle between point 410 and turn 412, predicted track 408 would continue along the same original direction while actual roadway 409 turns toward the right.

In the situation shown in FIG. 25A, cross track hold may successfully be used, without substantial accuracy degradation, both before and after turn 412. However, in the situation depicted in FIG. 25B after turn 412, the actual path of actual roadway 409 is not known and is merely estimated by the previous vehicle heading so that substantial cross track error may occur. In particular, the cross track error at turn 412 is zero but increases to cross track error distance 414 when the vehicle reaches point 416 along actual roadway 409. Thereafter, when GPS car navigation system 400 reaches point 420 on actual roadway 409, the cross track error reaches cross track error distance 418.

One way to effectively continue to use cross track hold in the situation depicted in FIG. 25B, in which predicted track 408 is merely estimated from the current heading, is to utilize turn detector 66 shown in FIG. 2, to detect the occurrence of a turn. The turn detection indication may be used in conjunction with turn comparator 68 and Route Data Base 52 to correct or update predicted track 408 to correspond to the actual path of actual roadway 409 or merely to require a re-estimation of predicted track 408 by using the then current heading after the turn. Similarly, a less desirable but simpler approach is to use timer 422 to cause predicted track 408 to be periodically re-estimated from the then current heading.

A better alternative is shown in FIG. 24 in which steady state detector 424 may be used as an alternative to, or in addition to, turn detector 66. Steady state detector 424 may be simply a type of turn detector, such as a magnetic compass, or a more sophisticated device such as an inertial navigation system. In any event, steady state detector 424 serves to indicate that the vehicle is no longer maintaining steady state conditions, that is, no longer following a straight line or continuing along a smooth curve. The output of steady state detector 424 is applied to NavProcessor 402 to indicate that predicted track 408 is no longer accurate because the vehicle has changed direction.

In accordance with a preferred embodiment of the present invention, upon an indication from steady state detector 424 that a change from steady state conditions has occurred during cross track hold, if more than one satellite signal is in view NavProcessor 402 automatically switches from cross track hold to clock hold. In other words, upon an indication that a cross track error may exists, the current clock estimate is maintained during a brief period in which the cross track estimate is updated.

The length of time during which clock hold may be maintained without substantial degradation of position accuracy is a function of the accuracy, or drift, of the real time clock used in GPS car navigation system 400. This accuracy may be predicted and is probably good enough to use for periods at least on the order of about 30 to 60 seconds. A first step in increasing the length of time during which clock hold may be maintained without unacceptable position degradation is to maintain a model of the error of the real time clock.

Real time clock error model 426 serves to monitor the drift of real time clock 428 shown in FIG. 12. The clock drift, compared to the actual time as determined from the satellites, is determined as a function of time so that further drift may be predicted. Some of the factors which contribute to this drift are linear and predictable so that some portions of the clock drift may be accurately modeled and the clock adjusted to compensate for that drift. Other factors which contribute to the clock drift are unpredictable. That is, even after correcting the clock for errors detectable in comparison to satellite time, the accuracy of real time clock 428 may only be improved to a certain level. The inaccuracy of the clock model, resulting from the random and unpredictable factors, determines the length of time that clock hold may be used without an unacceptable level of accuracy degradation.

Real time clock error model 426 may then be used to set the length of the period during which clock hold may be used so that cross track hold can be released and cross track error minimized or eliminated. In operation, real time clock error model 426 monitors real time clock 428 to determine the level of unpredictable, that is uncorrectable, clock drift while SatProcessor 46 corrects real time clock 428 in response to signals from the GPS satellites. Thereafter, when there are only two visible satellites, the cross track hold mode is instituted and steady state detector 424 monitors the progress of the vehicle to determine when a turn or other even changes is indicated by a change from steady state conditions.

Thereafter cross track hold is released and clock hold is instituted to correct any cross track error. Thereafter, in accordance with timer 422, clock hold is released and cross track hold is re-instituted. Cross track hold is then maintained while only two satellites are visible with usable signals until the next time that steady state detector 424 indicates the possible existence of a substantial cross track error. Alternatively, during long periods of cross track hold, clock hold may be used periodically in accordance with timer 422 to permit reduction of any accumulated cross track error. In this manner, the best possible navigation solution may be obtained from signals from two satellites by cycling between two hold states such as cross track and clock hold. The time in each hold state is limited in accordance with indications or predictions of unacceptable deviation from the held or modeled value.

In most typical operating conditions in terrestrial navigation, the width of the roadway, waterway or airway—and the likelihood of steady state motion—both contribute to a preference for cross track hold over clock hold, especially in light of the drift errors in currently available real time clocks used for GPS receivers. The periodic cycling between cross track and clock hold provides the most accurate and dependable navigation solutions for two visible satellites. If the second satellite also becomes unavailable so that signals from only a single satellite remain useful, clock hold may be used in conjunction with cross track hold for single satellite navigation.

Referring now again to FIG. 12, power consumption is a critical issue for many terrestrial spread spectrum receivers, including GPS receivers, particularly for battery powered receivers. Many battery powered receivers will be used in environments in which the battery drain due to the receiver is nominal, and/or may be conveniently replenished, such as in a vehicle. Many other battery powered receivers, referred to herein as hand held units for convenience, must rely solely on their batteries for power and be re-powered on a regular basis by recharging the batteries or replacing them. In addition, the nature of the use of devices of this type makes a reasonably long battery life important.

Conventional devices may be powered down, that is turned off, so that battery drain in minimal. However, the time required to power up and provide a reasonable navigation solution is often unsatisfactory. For example, when a conventional receiver is powered up after just being powered down it may be able to easily reacquire the satellites it was previously tracking but such reacquisition takes at least 2 to 3 seconds. This time lag is too long to permit powering down between position fixed in most applications. In a vehicle, a user would prefer not to wait several seconds after requesting a position fix for the receiver to provide an updated navigation solution.

Further, if a receiver has been powered down for more than a few seconds, the accumulated time errors will often result in the need for a search in order to lock onto the satellite signals unless a high quality (and therefore expensive) real time clock, or other source of accurate time information, is provided. A satellite signal search may take 15 minutes if the receiver has not been powered up for awhile.

In accordance with the present invention, however, energy saving techniques have been employed to permit battery operated, hand-held or similar receivers to be operated with minimal battery energy requirements and to provide instantaneous, or at least perceptibly instantaneous, position fixes and navigation solutions when the unit is powered up or when a position fix is requested. By the term instantaneous, or perceptibly instantaneous, what is meant is a relatively short delay time on the order of one quarter to one half of a second between the time that the unit is activated and the time the user receives the position fix so that the user is not made aware of a response time delay.

There are two primary battery saving modes of operation, the push to fix or sleep mode and the reduced power continuous navigation mode.

In the push to fix mode, when a navigation solution or position fix is required, the user pushes a button on the unit and a position fix is displayed in a sufficiently short time that the user is not bothered by the time required to reacquire and provide the navigation solution. The push to fix mode may therefore provide a perceptually instantaneous navigation solution when the push to fix control is activated. During the remainder of the time, the receiver operates in a sleep mode in which minimum power is used. During the sleep mode, however, the effective clock error has been modelled so that clock accuracy maintenance is performed automatically to keep the unpredictable clock error below a predetermined magnitude so that the receiver may be re-energized to perform clock maintenance with a minimum of wasted energy.

In the reduced power continuous operation mode, a perceptually constantly updated navigation solution is provided. The majority of the energy using portions of the receiver system are not powered for a substantial fraction of each second. For example, as will be described below, the present invention may be operated in a mode in which the full operation of the receiver is used for only 200 milliseconds per second, saving about 80% of the battery energy that would otherwise be used during the remaining 800 milliseconds of each second.

As shown in FIG. 12, GPS receiver system 200 may be dividing up into several major subsystems including, for example, RF processing subsystem 214 including the antenna input and RF signal preconditioning filtering and pre-amp stages, an IF filter as well as the crystal oscillator for an accurate clock or counter, together with a signal processing stage based on ASIC GSP1 202 and digital section 430 which includes the digital computer facilities such as SRAM 206, ROM 208 and CPU 101, interconnected by data and address busses 210 and 212, as well as real time clock 428.

In accordance with the present invention, RF processing subsystem 214 and ASIC GSP1 202 are powered down into a so-called sleep mode for a substantial portion of the time while digital section 430 remains powered to maintain the operation of real time clock 428. In many systems, it may be desirable to maintain crystal 224 in a ready to operate condition during the "off" or sleep state, by for example, keeping it warm in a temperature controlled environment.

In the push to fix mode, the duration of the permissible power down or "off" time during the sleep mode, that is the time interval between clock accuracy maintenance operations, is dependent upon the level of unpredictable, or un-modelable, drift of real time clock 428. In a typical application, the crystal used in real time clock 428 will be a relatively inexpensive crystal on the order of the quality of crystals used in a personal computer. Such crystals may provide a time resolution of 30 micro seconds or better and be modelable to hold time to within one half millisecond in perhaps 50 seconds.

In order to maximize the sleep or "off" time in a push-to-fix mode of operation, the drift of real time clock 428 is measured and modeled against a more accurate time base as provided by crystal 224 in RF processing subsystem 214 and/or from the signals from the satellites. It may be convenient to model the clock error of real time clock 428 so that the elapsed time during which the unpredictable changes in real time clock 428 occur can be determined. This modeling may be accomplished a priori, by estimating, or in accordance with a preferred embodiment of the present invention, be continuously determined during operation so that the full accuracy of real time clock 428 is used.

If it is determined that real time clock 428 drifts in a predictable fashion, real time clock 428 may be updated by digital section 430 on a regular basis to compensate for the drift. The period for updating may then be lengthened so that the unpredictable (and therefore un-modelable) error never exceeds a predetermined amount, for example, one half millisecond. That is, if the maximum permissible error is selected to be one half millisecond, then the determined period for the maximum off time depends on how long it takes the clock to drift by one half millisecond in an unpredictable way.

In the sleep mode, at the end of the off time, CPU 101 causes the power to be reapplied to RF processing subsystem 214 and to ASIC GSP1 202. RF processing subsystem 214 attempts to continue tracking and/or reacquire a selected satellite. The selected satellite may conveniently be the satellite with the strongest, or otherwise most usable, signal as determined from the previous "on" time. The "off" time has been selected so that the signals from the selected satellite are within a known time offset and are therefore easily reacquired.

In accordance with a preferred embodiment of the present invention, approximately 240 correlations may be performed, accumulated and completed during each millisecond, that is, during each repetition of the C/A code. These 240 correlations each represent one half chip of time. If the clock error represents less than about plus or minus 60 chips, which may be on the order of plus or minus 10 miles in pseudorange, tracking occurs during the first millisecond. That is, usable data is immediately collected. In particular, if the clock error is within plus or minus 120 half chips, one of the 240 correlations will in fact be the prompt correlation. At the end of the first millisecond, the data from the prompt correlation may be used in the usual way to track the selected satellite and thereby determine the clock error. Therefore, at the end of the first millisecond of clock maintenance operation, the clock error may be corrected and the pseudorange to the "best" or selected satellite redetermined.

During the next and subsequent 1 ms periods, normal tracking of all, or at least most, of the other satellites remaining visible may be resumed because the error in real time clock 428 has been corrected.

In this manner, clock maintenance is automatically performed at least as often as required by the actual drift of the clock so that the length of operating time required to resume tracking may be controlled. The duration of the "off" time can be controlled in general as a function of the quality of real time clock 428. For any particular level of clock error, the amount of power required for resumption of tracking may be controlled in part by the number of correlations used. As more correlations are used, more energy is consumed, but longer "off" times may be employed.

In the presently preferred embodiment it has been determined that a 50 second off time would be appropriate with a convenient quality level of clock crystal for real time clock 428. The exact length of off time may be determined by clock error modeling during action operation of the receiver, as noted above. At the end of the 50 second "off" period, GPS receiver system 200 is powered up and can immediately resume tracking at least the first satellite during the first millisecond and all available satellites thereafter. If GPS receiver system 200 was powered up as a result of the need for clock accuracy maintenance, no further tracking is required and the "off" or battery energy save state may be resumed as soon as the clock error is corrected by tracking the first satellite.

If satellite tracking of the selected satellite is not resumed during the first millisecond for clock accuracy maintenance, the total time required to reacquire the best satellite will typically be less than 9 milliseconds because all 1023 possible delay theories can be tested with about 9 passes of the 240 delays per pass.

If, in addition to clock error maintenance, a navigation solution is required, normal operation of GPS receiver system 200 may be continued for as long as required after a clock maintenance operation to complete the navigation solution.

In operation, after normal satellite tracking, push to fix operation may be instituted and the receiver will enter the sleep mode for the period determined by the clock error model to permit the clock to remain accurate to within a fix amount, say half a millisecond. At the end of the sleep mode period so determined, clock maintenance occurs in which the receiver wakes up long enough to correct real time clock 428. Thereafter, the sleep mode is resumed.

Upon receipt of a push to fix request for a navigation solution, a clock maintenance operation is performed to correct real time clock 428 and then normal tracking is resumed for all satellites being tracked. The navigation solution may then be determined in the usual manner and the sleep mode resumed.

In the reduced energy, continuous operation mode, the sleep mode is engaged on a periodic basis, such as for 800 milliseconds in each second. The modeled clock drift is sufficiently small at the end of the sleep mode so that normal tracking may be automatically resumed. During the next 200 milliseconds, satellite tracking is then resumed, clock corrections are made, and the navigation solution determined.

During the next succeeding seconds, the 800 millisecond sleep mode continues to be alternated with a 200 millisecond tracking mode, thereby substantially reducing the energy requirements for apparently normal, continuous operations. During the 800 millisecond sleep period, digital section 430 or at least a substantial portion thereof remains active. Assuming for convenience that the energy used by the RF, signal processing and digital processing subsystems are approximately equal, the energy savings is therefore on the order of about two thirds of 80% of the full operation energy budget for an approximate savings of about half while updating the position fix once per second.

In many hand held applications, continuous operation may require a position fix at time intervals of substantially greater than one second, say for example 5 seconds. The operation of the RF and signal processing sections for only about 200 ms each 5 seconds provides a tremendous increase in operating life for any particular set of batteries.

Figure 26:
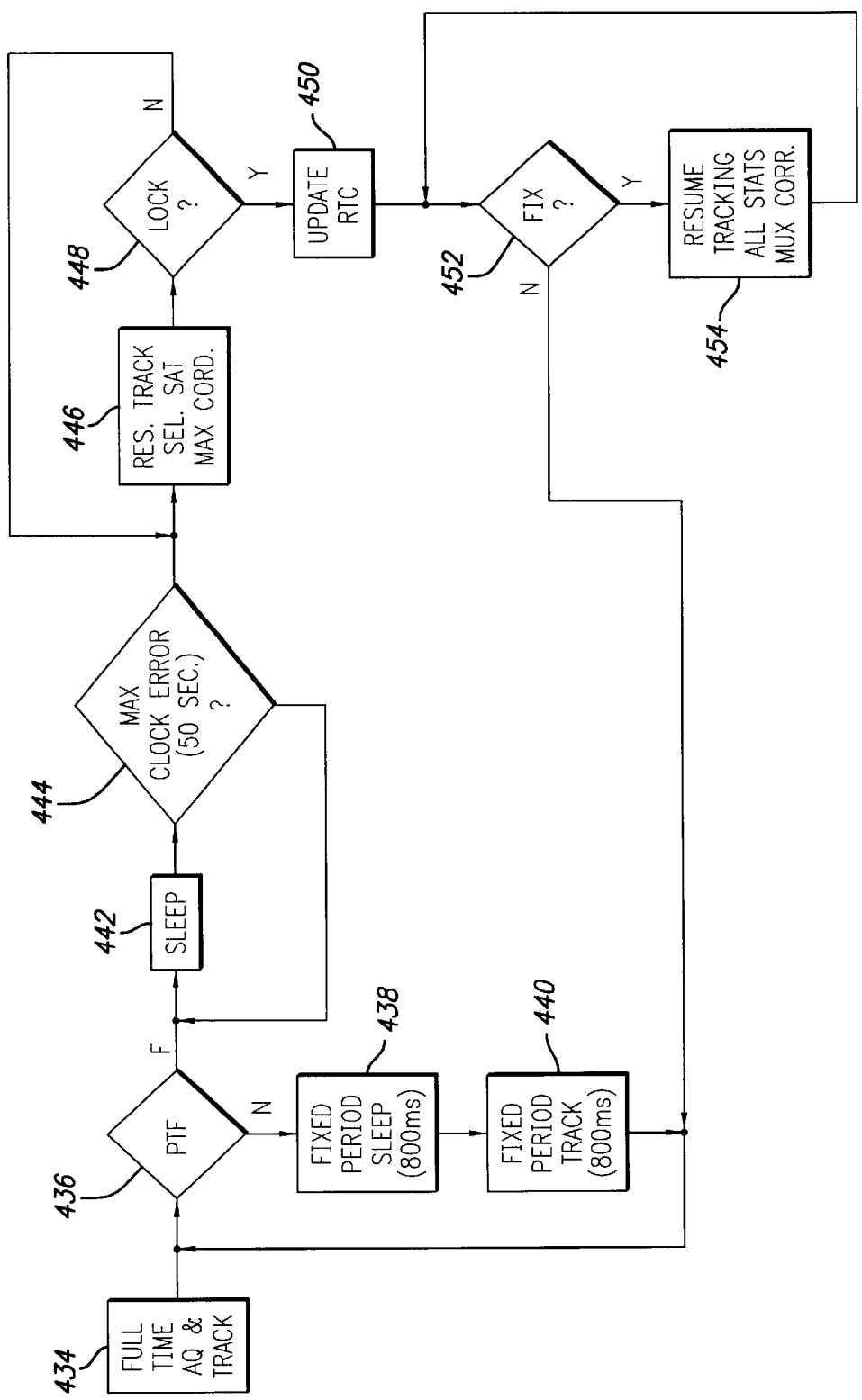
FIG. 26 is a flow chart diagram of an energy reducing sleep mode of operation in accordance with the present invention.

Referring now to FIG. 26, these modes of operation may be combined in low power consumption receiver 432 which operates in an energy conserving continuous, as well as push to fix, modes. Operations begin as described above in full time acquisition and then tracking modes, indicated as step 434. In the preferred embodiment, push to fix inquiry 436 is made. If push to fix operation is not required, the receiver is operated in a sleep mode for a fixed period of time, such as 800 ms, under the direction of step 438. Thereafter a fixed period of tracking, for example 200 ms, is accomplished under step 440. Operation cycles between steps 438 and 440 until push to fix operation is required.

When push to fix operation is begun, sleep mode 442 is entered until inquiry 444 determines that maximum allowable clock error has occurred. As noted above, the period of time in which this clock error occurs, or is modelled to occur, depends upon the maximum allowable error which in turn depends upon the number of correlations available per unit time as well as the length of time permitted for resumption, or reacquisition, of tracking. In the presently preferred embodiment using 240 correlations per millisecond and requiring clock drift to be limited to plus or minus one half millisecond, a sleep period of up to 50 seconds may be allowed.

When the sleep period based on maximum allowable clock error is over, the resumption of tracking in step 446 is begun for the selected satellite using the maximum number of correlators available. When a lock 448 on the selected satellite's signal has been achieved, the real time clock and/or the corrected clock model is updated under step 450. If a fix (inquiry 452) is required, tracking is then resumed under step 454 for all satellites using the correlations in a time division multiplexed fashion as described above. If a fix is not presently required, and inquiry 436 indicates that the push to fix mode is to continue, the receiver resumes the sleep mode under step 442 until maximum clock error reoccurs or is predicted to reoccur, for example, at the expiration of an additional 50 seconds.

Having now described the invention in accordance with the requirements of the patent statutes, those skilled in this art will understand how to make changes and modifications in the present invention to meet their specific requirements or conditions. Such changes and modifications may be made without departing from the scope and spirit of the invention as set forth in the following claims.

What is claimed is:

1. A system for operating a GPS C/A code receiver comprising:
   a plurality of channel means, each comprising,
     means for forming x multibit digital segment values per C/A code period, each multibit digital segment value representing a sequential code segment of a received composite of satellite signals; and
     a plurality of correlating means for correlating each digital segment value with n satellite specific sets of in differently time delayed segments of C/A code modulation to form at least n times in time delay specific correction values, wherein x, m, and n are each prime factors of a number of code chips per C/A code period.

2. The system of claim 1 wherein m is greater than the number of bits in each multibit of claim 1 wherein each bit of the multibit digital.

3. The system of claim 1 wherein each bit of the multibit digital segment value represents an integer fraction of a C/A code chip.

4. The system of claim 1 wherein the correlating means comprises means for tracking different satellites by selecting the satellite specific sets to represent n different satellites.

5. The system of claim 1 wherein the correlating means comprises means for tracking different satellites by selecting more than one of the satellite specific sets to represent the same satellite.

6. The system of claim 5 wherein the lime delay segments of the satellite specific sets representing the same satellite are sequential.

7. The system of claim 5 wherein the time delay segments of the satellite specific sets representing the same satellite are interlaced.

8. The system of claim 5 wherein the differential time delay of the segments of the satellite specific sets representing the same satellite represent less than a maximum expected time delay error for a temporarily obscured satellite in an urban environment.

9. The system of claim 1 wherein the correlating means comprises means for tracking different satellites by selecting the satellite specific sets to represent an integer fraction of n different satellites.

10. The system of claim 1 wherein the correlating means comprises means for tracking n/2 satellites by selecting the satellite specific sets to represent n/2 different satellites.

11. The system of claim 1 wherein the con-elating means i8 adapted to:
   acquire a satellite by selecting the satellite specific sets to represent the same satellite; and
   repeat the correlation for the same satellite with a different set of time delayed segments.

12. The system of claim 1 further comprising means for forming series of m/2 differently time delayed segments by sequentially changing one bit of a previous segment to faint the next segment.

13. The system of claim 1 wherein the forming means comprises:
   means for sampling the received composite at a first bit rate; and
   means for digitally filtering the first composite to form the digital segment values at a bit rate substantially lower than the first bit rate.

14. The system of claim 1 further comprising means for interrupting the correlating means for a series of code periods to reduce receiver energy consumption.

15. A system for tracking the movement of an object, said system comprising:
   a multi-channel GPS C/A code receiver associated with the object, wherein each of a plurality of channels is adapted to,
      form x multibit digital segment values per C/A code period, each multibit digital segment value representing a sequential code segment of a received composite of satellite signals; and
      correlate each digital segment value with a satellite specific sets of in differently time delayed segments of C/A code modulation to form at least n times m time delay specific correlation values, wherein x, m, and n are each prime factors of a number of code chips per C/A code period; and
   means for determining navigation information from the correlation values.

16. The system of claim 15 wherein the determining means comprises means for comparing the magnitudes for two equal correlation values to the magnitude of a correlation value therebetween to select a prompt delay.

17. The system of claim 16 wherein the comparing means comprises means for selecting the prompt delay to be more than halfway between the time delays represented by the equal correlation values when the magnitude of the equal correlation products is equal to less than the half of a peak correlation value therebetween.

18. The system of claim 16 wherein the comparing means comprises means for selecting the prompt delay to be less than halfway between the time delays represented by the equal correlation values when to magnitude of the equal correlation products is equal to more than half of a peak correlation value therebetween.

19. A method of operating a GPS C/A code receiver comprising, in each of a plurality of receiver channels:
   forming x multibit digital segment values per C/A code period, each multibit digital segment value representing a sequential code segment of a received composite of satellite signals;
   correlating each digital segment value with n satellite specific sets of m differently time delayed segments of C/A code modulation to form at least n times m time delay specific correlation values, wherein x, m, and n are each prime factors of a number of code chips per C/A code period; and
   accumulating the correlation values in a n times m matrix.

* * * * *